United States Patent
Nosaka et al.

(10) Patent No.: US 10,540,525 B2
(45) Date of Patent: Jan. 21, 2020

(54) INFORMATION CODE, INFORMATION CODE PRODUCING METHOD, INFORMATION CODE READER, AND SYSTEM WHICH USES INFORMATION CODE

(71) Applicant: DENSO WAVE INCORPORATED, Chita-gun, Aichi (JP)

(72) Inventors: Kazuto Nosaka, Chita-gun (JP); Shin Nakayama, Nagoya (JP); Masami Tanaka, Handa (JP); Takuya Yoda, Obu (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 14/654,198

(22) PCT Filed: Dec. 18, 2013

(86) PCT No.: PCT/JP2013/083921
§ 371 (c)(1),
(2) Date: Jun. 19, 2015

(87) PCT Pub. No.: WO2014/098136
PCT Pub. Date: Jun. 26, 2014

(65) Prior Publication Data
US 2015/0347889 A1 Dec. 3, 2015

(30) Foreign Application Priority Data

Dec. 19, 2012 (JP) .................................. 2012-276910
Nov. 19, 2013 (JP) .................................. 2013-238417
Dec. 10, 2013 (JP) .................................. 2013-255504

(51) Int. Cl.
*G06K 7/10* (2006.01)
*G06Q 30/00* (2012.01)
(Continued)

(52) U.S. Cl.
CPC ............ *G06K 7/10* (2013.01); *G06F 16/9554* (2019.01); *G06K 19/06103* (2013.01); *G06Q 30/018* (2013.01); *H04L 63/083* (2013.01)

(58) Field of Classification Search
CPC ...... G06F 17/30879; G06K 7/10; G06K 1/12; G06K 7/1417; G06K 7/1439;
(Continued)

(56) References Cited

U.S. PATENT DOCUMENTS 4,091,394 A * 5/1978 Kashioka ................. G06K 9/00
382/151
5,304,787 A * 4/1994 Wang .................... G06K 7/1093
235/462.09
(Continued)

FOREIGN PATENT DOCUMENTS

CN 101667256 A 3/2010
CN 102799920 A 11/2012
(Continued)

OTHER PUBLICATIONS

Feb. 25, 2014 International Search Report issued in International Patent Application No. PCT/JP2013/083921.
(Continued)

*Primary Examiner* — Sharon S Lynch
(74) *Attorney, Agent, or Firm* — Oliff PLC

(57) ABSTRACT

There is provided a system that uses a two-dimensional information code. The system administers an information code which is provided with a data recording region and an image region. The system is provided with a specific information acquisition section that acquires specific information of a subject or an object, as information recorded in the data recording region, or as information to be correlated to the information recorded in the data recording region. Further, the is provided with a unique image acquisition section that
(Continued)

acquires a unique image of a subject or an object, or a unique image for specifying the subject or the object, as information indicated in the image region. Further, the system is provided with a registration section that registers specific information acquired by the specific information acquisition section, being correlated to a unique image acquired by the unique image acquisition section.

16 Claims, 38 Drawing Sheets

(51) Int. Cl.
  *H04L 29/06* (2006.01)
  *G06F 16/955* (2019.01)
  *G06K 19/06* (2006.01)
(58) Field of Classification Search
  CPC ........... G06K 9/00281; G06K 9/00288; G06K 19/06103; G06K 19/06112; G06Q 10/00; G06Q 30/018; H04L 63/083
  See application file for complete search history.

(56) References Cited

U.S. PATENT DOCUMENTS

| | | | | |
|---|---|---|---|---|
| 6,718,075 | B1* | 4/2004 | Yamamoto | G06F 16/51 382/305 |
| 7,950,589 | B2* | 5/2011 | Oouchi | G06F 8/36 235/462.1 |
| 8,757,477 | B2* | 6/2014 | Do | G01C 21/005 235/375 |
| 8,997,241 | B2* | 3/2015 | Terwilliger | G06F 21/36 713/155 |
| 9,163,945 | B2* | 10/2015 | Do | G01C 21/005 |
| 9,208,397 | B2* | 12/2015 | Scipioni | G06T 1/0021 |
| 9,306,944 | B2* | 4/2016 | Terwilliger | G06F 21/36 |
| 9,390,305 | B2* | 7/2016 | Scipioni | G06T 1/0021 |
| 9,547,786 | B2* | 1/2017 | Scipioni | G06T 1/0021 |
| 2002/0112177 | A1* | 8/2002 | Voltmer | G06F 21/32 726/26 |
| 2006/0163357 | A1* | 7/2006 | Kim | G06K 7/0163 235/462.1 |
| 2006/0226229 | A1* | 10/2006 | Kim | G06K 7/0163 235/462.1 |
| 2007/0277150 | A1* | 11/2007 | Oouchi | G06F 8/36 717/109 |
| 2009/0242649 | A1 | 10/2009 | Mizukoshi et al. | |
| 2012/0132721 | A1 | 5/2012 | Mizukoshi et al. | |
| 2012/0138694 | A1 | 6/2012 | Mizukoshi et al. | |
| 2012/0138695 | A1 | 6/2012 | Mizukoshi et al. | |
| 2013/0043302 | A1* | 2/2013 | Powlen | G06Q 50/01 235/375 |
| 2013/0048707 | A1* | 2/2013 | Do | G01C 21/005 235/375 |
| 2013/0179692 | A1* | 7/2013 | Tolba | H04L 63/08 713/179 |
| 2013/0305329 | A1* | 11/2013 | Zhang | G06F 21/00 726/6 |
| 2014/0056526 | A1* | 2/2014 | Scipioni | G06T 1/0021 382/192 |
| 2014/0115708 | A1* | 4/2014 | Terwilliger | G06F 21/36 726/26 |
| 2014/0119647 | A1* | 5/2014 | Cheong | G06T 9/00 382/166 |
| 2014/0217168 | A1* | 8/2014 | Do | G01C 21/005 235/375 |
| 2015/0006672 | A1* | 1/2015 | Morel | G06Q 30/0269 709/217 |
| 2015/0125046 | A1* | 5/2015 | Ikenoue | G06F 21/32 382/115 |
| 2015/0125047 | A1* | 5/2015 | Ikenoue | G06K 9/00288 382/118 |
| 2015/0172288 | A1* | 6/2015 | Terwilliger | G06F 21/36 726/7 |
| 2015/0248394 | A1* | 9/2015 | Morel | G06Q 30/0269 715/226 |
| 2016/0086009 | A1* | 3/2016 | Scipioni | G06T 1/0021 235/462.11 |
| 2016/0191496 | A1* | 6/2016 | Zhang | G06F 21/00 726/9 |
| 2016/0321489 | A1* | 11/2016 | Scipioni | G06T 1/0021 |

FOREIGN PATENT DOCUMENTS

| | | |
|---|---|---|
| JP | 2001-256501 A | 9/2001 |
| JP | 2004-206674 A | 7/2004 |
| JP | 2007-241327 A | 9/2007 |
| JP | 2008-152334 A | 7/2008 |
| JP | 2009-129410 A | 6/2009 |
| JP | 2012-164236 A | 8/2012 |
| TW | 201135619 A | 10/2011 |

OTHER PUBLICATIONS

Jul. 2, 2015 International Preliminary Report on Patentability issued in International Patent Application No. PCT/JP2013/083921.
May 25, 2015 Office Action issued in Taiwan Patent Application No. 102147240.
"Information technology-automatic identification and data capture techniques—QR code 2005 bar code symbology specification;" International Standard ISO/IEC 18004; Second Edition; Sep. 1, 2006; Annex M.

* cited by examiner

FIG.12

| | | | |
|---|---|---|---|
| PERSONAL REGISTRATION INFORMATION | | | |
| LAST NAME | | FIRST NAME | |
| SEX | | | |
| DATE OF BIRTH | | | |
| COUNTRY | | | |
| SOCIAL SECURITY NUMBER | | | |
| POSTAL CODE | | | |
| ADDRESS | | | |
| PHONE | | | |
| EMAIL | | | |
| MOBILE PHONE | | | |
| MOBILE TEXT-MESSAGING | | | |
| CREDIT CARD 1 | | | |
| CREDIT CARD 2 | | | |
| PLACE OF WORK | | | |
| COMPANY MEMBER NUMBER | | | |
| COMPANY POSTAL CODE | | | |
| COMPANY ADDRESS | | | |
| COMPANY PHONE | | | |
| COMPANY EMAIL | | | |

FIG.13

(A)
| PERSONAL INFORMATION 1 | REGISTRATION IMAGE 1 |
|---|---|

(B)
| CODE NUMBER 1 | PERSONAL INFORMATION 1 | INFORMATION CODE IMAGE 1 |
|---|---|---|

(C)
| CODE NUMBER 1 | PERSONAL INFORMATION 1 | INFORMATION CODE IMAGE 1 |
|---|---|---|
| CODE NUMBER 2 | PERSONAL INFORMATION 2 | INFORMATION CODE IMAGE 2 |
| CODE NUMBER 3 | PERSONAL INFORMATION 3 | INFORMATION CODE IMAGE 3 |
| CODE NUMBER 4 | PERSONAL INFORMATION 4 | INFORMATION CODE IMAGE 4 |
| CODE NUMBER 5 | PERSONAL INFORMATION 5 | INFORMATION CODE IMAGE 5 |
| ⋮ | ⋮ | ⋮ |

FIG.15
(A)
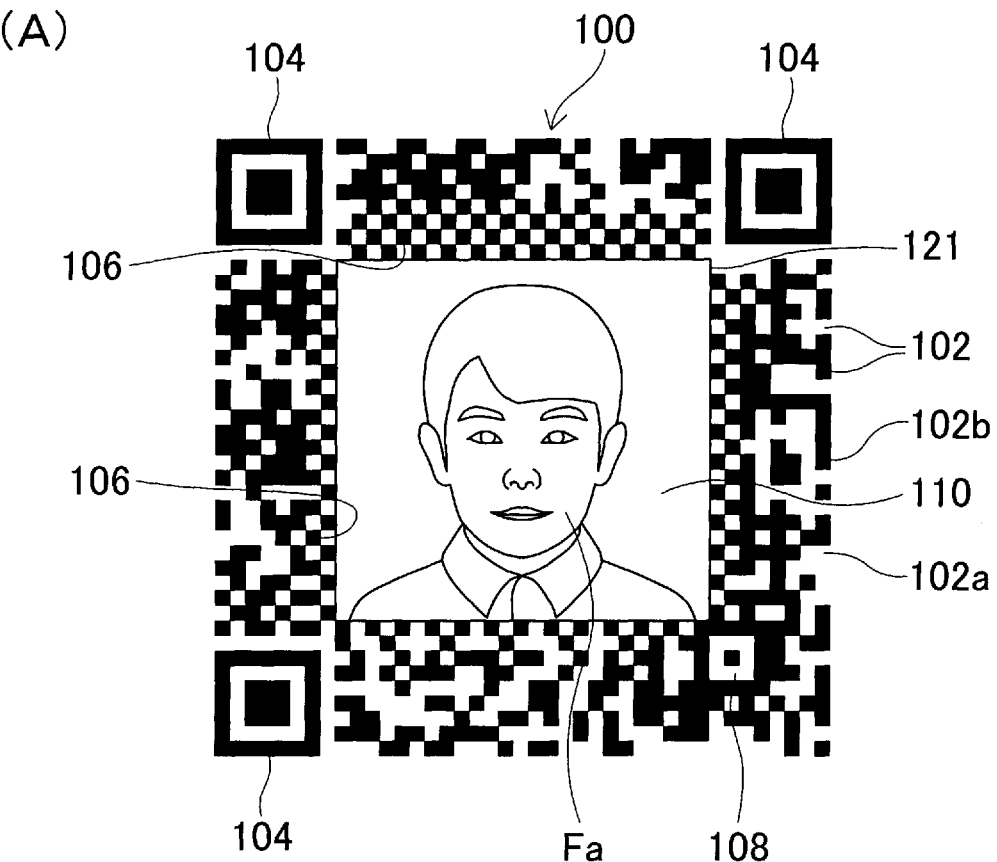
(B)
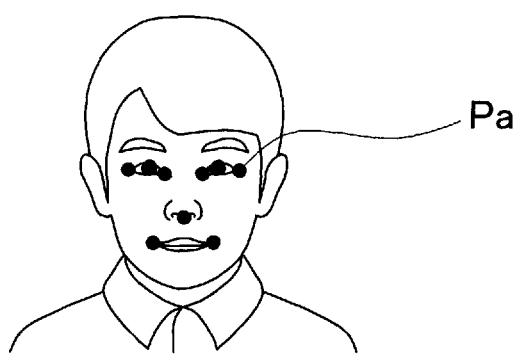

FIG.16

CORPORATE REGISTRATION INFORMATION

| Field | |
|---|---|
| COMPANY NAME | |
| ENGLISH NAME (COMPANY) | |
| COUNTRY OF RESIDENCE OF HEADQUARTER | |
| CORPORATE CODE | |
| POSTAL CODE | |
| ADDRESS | |
| PHONE | |
| EMAIL | |
| PHONE 2 | |
| EMAIL 2 | |
| CREDIT CARD 1 | |
| CREDIT CARD 2 | |
| PRESIDENT | |
| CHAIRMAN | |
| AMOUNT OF SALES | |
| OPERATING INCOME | |
| ORDINARY INCOME | |
| AUDIT CORPORATION | |

FIG.17
(A)
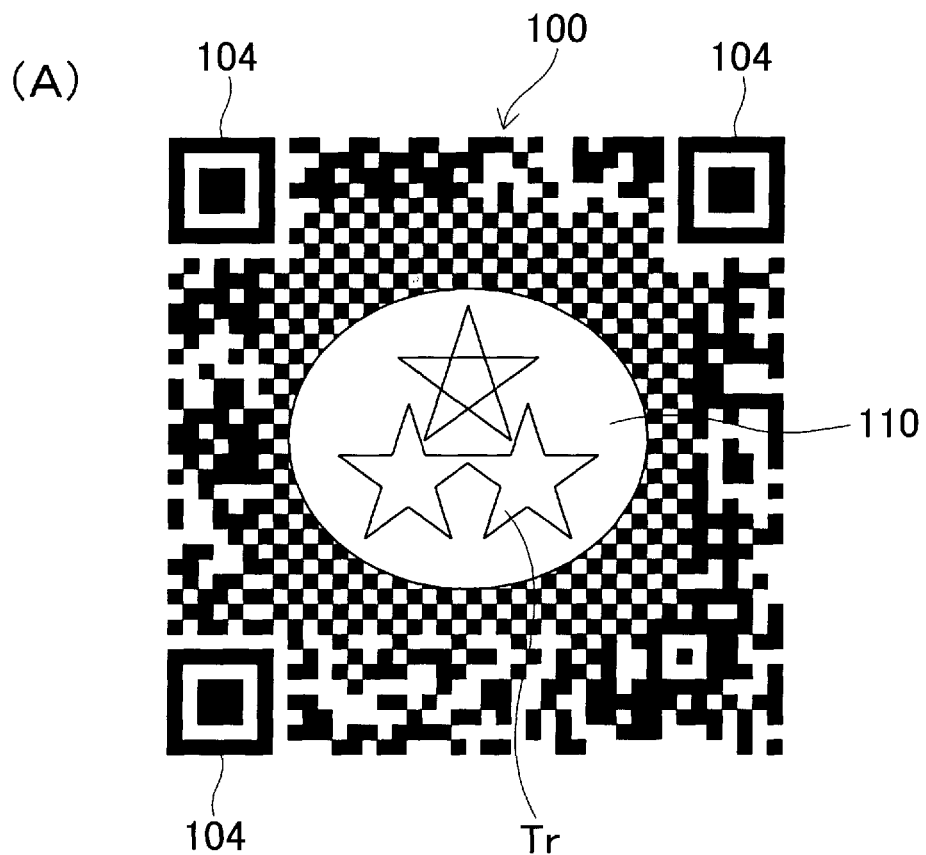
(B)
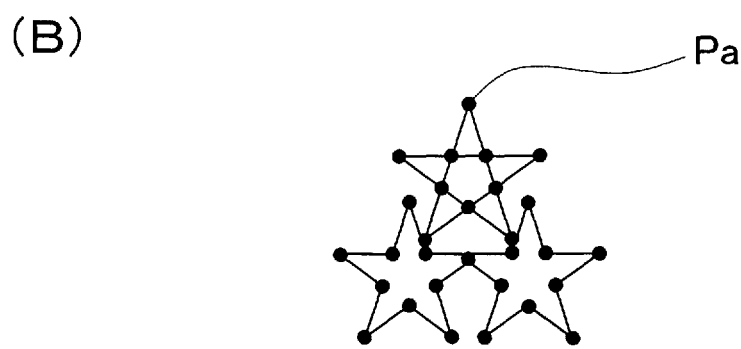

FIG.22
(A)
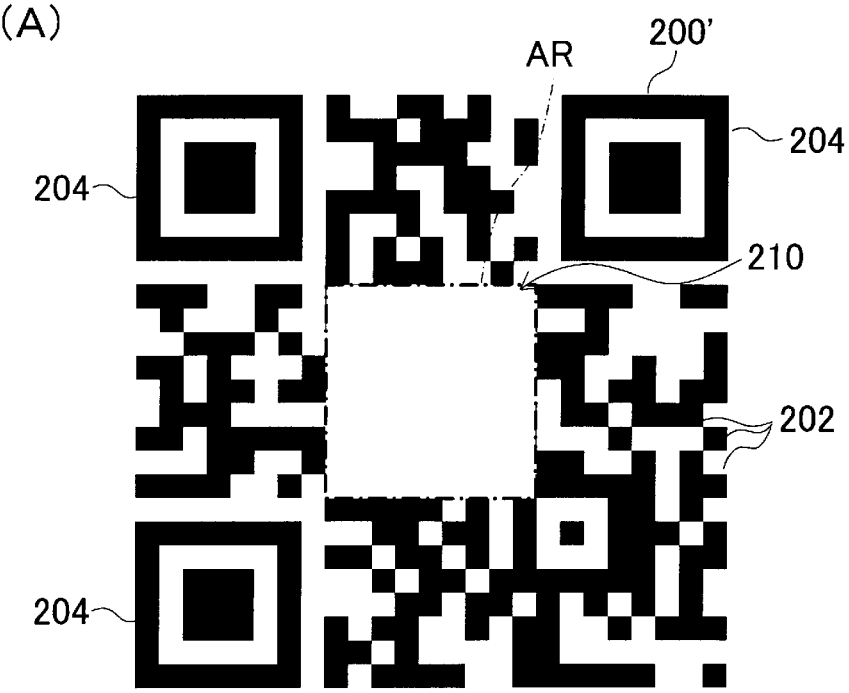
(B)
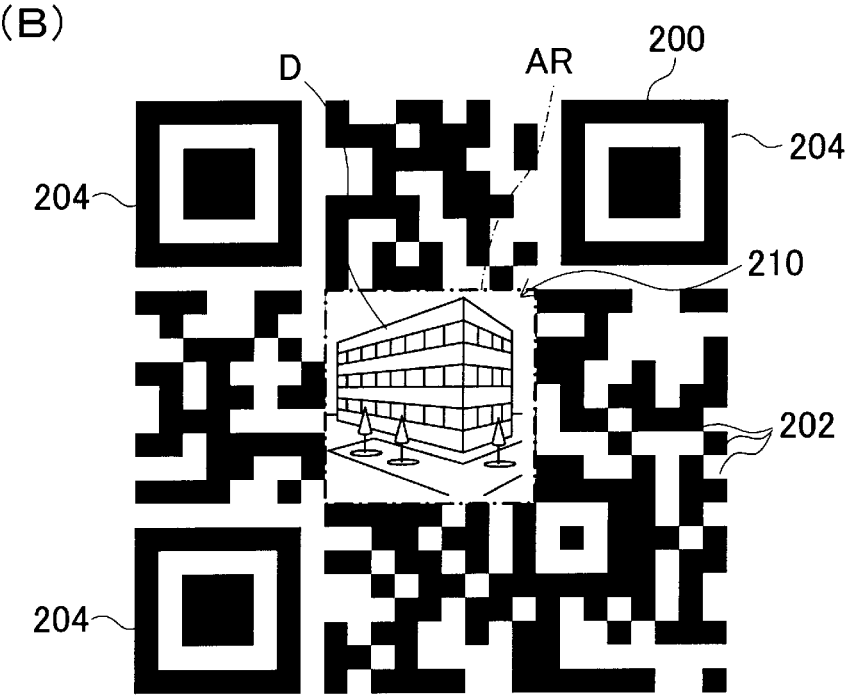

FIG.23
(A)
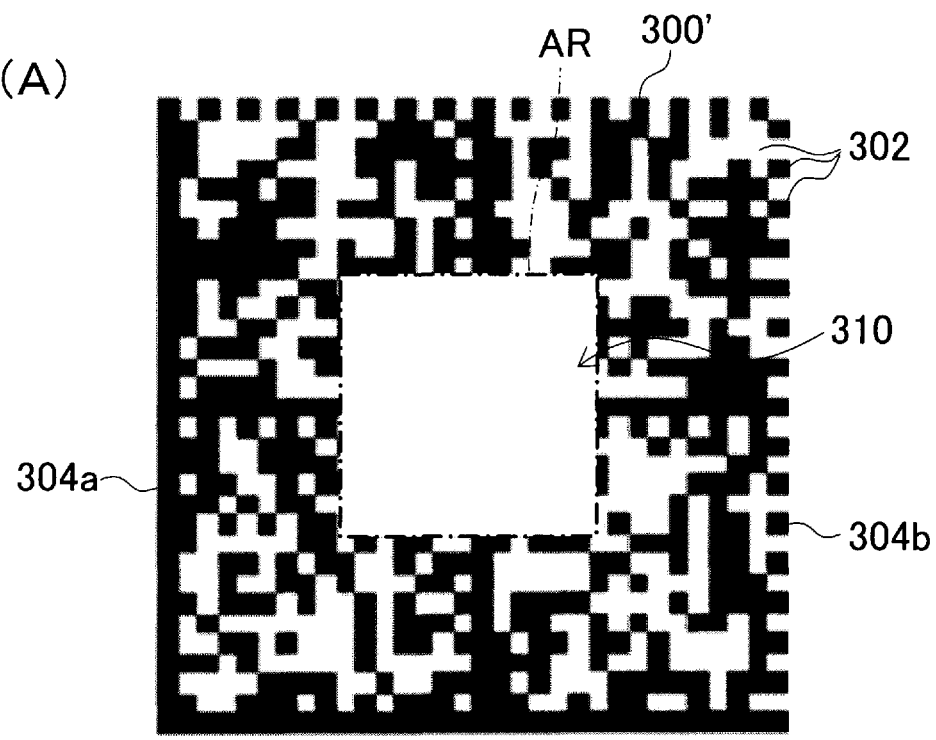
(B)
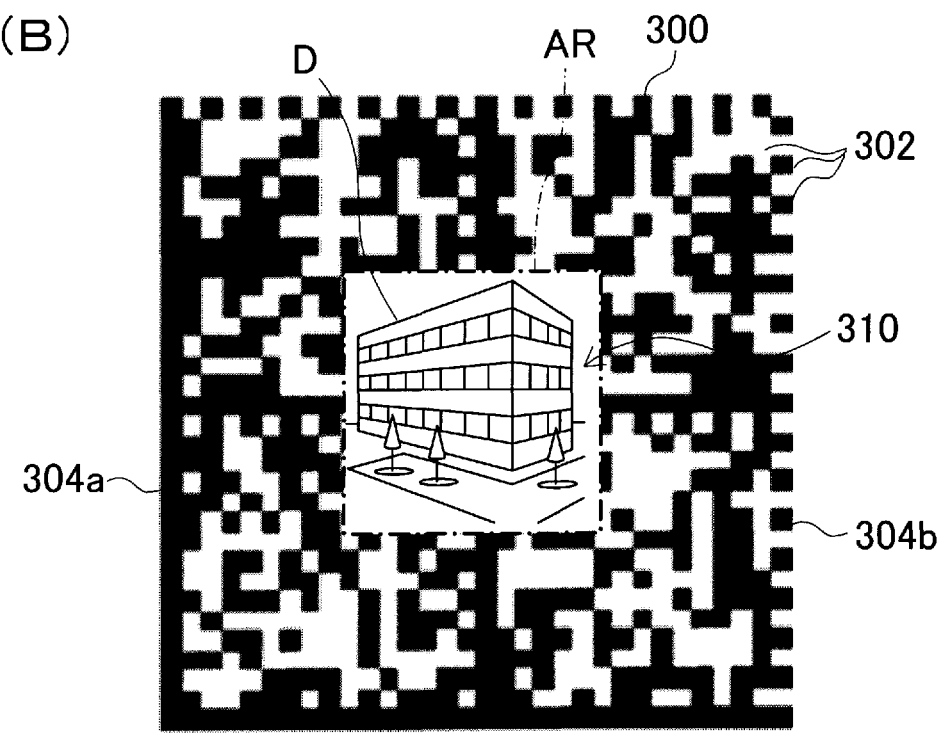

FIG.28

| |
|---|
| LAST NAME |
| FIRST NAME |
| COUNTRY |
| POSTAL CODE |
| EMAIL |
| ADDRESS |
| PHONE |
| MOBILE PHONE |
| MOBILE TEXT-MESSAGING |
| SEX |
| DATE OF BIRTH |
| ACCOUNT1 |
| ACCOUNT1 PASSWORD |
| ACCOUNT2 |
| ACCOUNT2 PASSWORD |
| ACCOUNT3 |
| ACCOUNT3 PASSWORD |
| CREDIT CARD1 |
| CREDIT CARD2 |
| PLACE OF WORK |
| COMPANY MEMBER NUMBER |
| COMPANY POSTAL CODE |
| COMPANY ADDRESS |
| COMPANY PHONE |
| COMPANY EMAIL |
| SOCIAL SECURITY NUMBER |

FIG.36

|  | | EXECUTION PURPOSE LIST | | |
|---|---|---|---|---|
|  | | 1 | 2 | 3 |
| APPLICATION LIST | A | A1 | A2 | A3 |
| | B | B1 | B2 | B3 |
| | C | C1 | C2 | C3 |
| | D | D1 | D2 | D3 |
| | E | E1 | E2 | E3 |
| | F | F1 | F2 | F3 |

INFORMATION CODE, INFORMATION CODE PRODUCING METHOD, INFORMATION CODE READER, AND SYSTEM WHICH USES INFORMATION CODE

CROSS-REFERENCE TO RELATED APPLICATION

This application is based on and claims the benefit of priority from earlier Japanese Patent Application Nos. 2012-276910 filed on Dec. 19, 2012, 2013-238417 filed on Nov. 19, 2013 and 2013-255504 filed on Dec. 10, 2013 the descriptions of which are incorporated herein by reference.

BACKGROUND

[Technical Field]

The present invention relates to an information code such as two-dimensional codes, a production method for producing the information code, an information code reader that reads the information code, and a system that uses the information code.

[Background Art]

Recently, as means for identifying persons, data media, such as driver's licenses or Basic Resident Registration cards, are widely used. Since these data media accompany photographs of the respective holders, it is easy to check each data medium against the person who holds it to confirm whether the data medium is of the person in question. Further, the data media, which are issued by public agencies, such as a police department or a municipal government, have high reliability.

CITATION LIST

[Patent Literature]

[Patent Literature 1] JP-A-2001-256501

[Technical Problem]

It is true that the readily available public data media, such as driver's licenses or Basic Resident Register cards, can identify persons. However, to use the indicated personal information for a certain purpose, such as checking of the personal information, the personal information desired to be used has to be individually inputted, which leads to a problem of tending to increase the work burden.

On the other hand, in a recently proposed system, persons are identified using information codes. For example, according the technique of Patent Literature 1, data, such as a palm print, are recorded in advance into a two-dimensional code. In performing authentication, a two-dimensional code which is stuck to an article is read, followed by reading the palm of the person to be authenticated, thereby checking the data recorded in the two-dimensional code against the data of feature points of the palm print. Through such checking, the two-dimensional code is ensured to be distinguished as to whether the code is a valid code allocated to the person to be authenticated.

However, according to this technique, personal biological information is simply registered in a two-dimensional code and thus there is no means for proving the correctness of the biological information. This raises a problem that the information recorded in the two-dimensional code cannot be confirmed as to the correctness. In the context of such a problem, an unauthorized third person, for example, can improperly produce a two-dimensional code using the unauthorized person's own biological information. Such an improperly produced two-dimensional code, as far as it is used by the third person in question, can be treated as a valid two-dimensional code. This technique cannot enhance the reliability of the information code.

SUMMARY

Thus it is desired to provide a configuration which uses a distinctive information code provided with an image region in a code area, the information code in use being easily and reliably confirmed as to whether the information code is authentic.

A first aspect according to the present disclosure relates to a system that administrates an information code having a code area of a medium which is configured being provided therein with a specific pattern region where a specific pattern of a predetermined shape, including a pattern indicating a position of the code area, is arranged, a data recording region where data are recorded by various types of cells, and an image region configured as a region for indicating an image that is different from an image in the cells and having a size larger than that of each of the cells. The system is characterized in that the system includes:

a specific information acquisition section that acquires specific information of a subject or an object, as information recorded in the data recording region, or as information to be correlated to the information recorded in the data recording region;

a unique image acquisition section that acquires a unique image of the subject or the object, or a unique image for specifying the subject or the object, as information indicated in the image region; and a registration section that registers the specific information acquired by the specific information acquisition section and the unique image acquired by the unique image acquisition section.

A second aspect according to the present disclosure relates to a system that administers an information code having a code area of a medium which is configured being provided therein with a specific pattern region where a specific pattern of a predetermined shape, including a pattern indicating a position of the code area, is arranged, a data recording region where data are recorded by various types of cells, and an image region configured as a region for indicating an image that is different from an image in the cells and having a size larger than that of each of the cells. This system is characterized in that the system includes:

a registration information input section that receives an input of predetermined input items and an image;

an information code producing section that produces the data recording region using at least a part of an input of the input items received by the registration information input section, and produces the information code by allowing all or a part of the image to reside in the image region; and a registration section that registers the information code.

A third aspect relates to an information code producing method that produces an information code in which data are recorded by various types of cells. The producing method is characterized in that the method provides, inside a code area of a medium, a specific pattern region where a specific pattern of a predetermined shape, including a pattern indicating a position of the code area, is arranged, a data recording region where data administered being registered in a unit external of the information code are recorded by the various types of cells, and an image region that indicates an image different from an image in the cells, that is, an image administered being registered in a unit external of the information code, with a size larger than that of each of the cells.

A fourth aspect relates to an information code having data recorded by various types of cells. The information code is characterized in that the information code includes, inside a code area of a medium, a specific pattern region where a specific pattern of a predetermined shape, including a pattern indicating a position of the code area, is arranged, a data recording region where data administered being registered in a unit external of the information code are recorded by the various types of cells, and an image region that indicates an image different from an image in the cells, that is, an image administered being registered in a unit external of the information code, with a size larger than that of each of the cells.

A fifth aspect relates to an information code reader that reads an information code having data recorded by various types of cells. The reader is characterized in that:

the reader reads the information code provided, inside a code area of a medium, with a specific pattern region where a specific pattern of a predetermined shape, including a pattern indicating a position of the code area, is arranged, a data recording region where data administered being registered in a unit external of the information code are recorded by the various types of cells, and an image region that indicates an image different from an image in the cells, that is, an image administered being registered in a unit external of the information code, with a size larger than that of each of the cells; and the reader includes:

an imaging section that is able to pick up an image of the information code;

a data recording region reading section that reads data recorded in the data recording region when an image of the information code is picked up by the imaging section; and an image processor that performs an extraction process for an image in the image region or a predetermined analysis process for an image in the image region, in a code image of the information code picked up by the imaging section.

A sixth aspect relates to a system that uses an information code having a code area of a medium which is configured being provided therein with a specific pattern region where a specific pattern of a predetermined shape, including a pattern indicating a position of the code area, is arranged, a data recording region where data are recorded in various types of cells, and an image region configured as a region for indicating an image that is different from an image in the cells and having a size larger than that of each of the cells. The system is characterized in that:

the system includes:

a specific information acquisition section that acquires specific information of a subject;

a registration section that registers the specific information acquired by the specific information acquisition section;

an information code producing section comprising a first input section that is able to input at least a part of the specific information of any first subject registered in the registration section, and producing the information code with a configuration in which, when the specific information of the first subject is inputted by the first input section, the inputted specific information is recorded in the data recording region;

an output terminal comprising an output section that outputs the information code produced by the information code producing section;

a reading terminal that is able to read the information code outputted by the output section of the output terminal;

an administration unit configured to include the registration section or configured to be able to read information from the registration section, and configured to be able to communicate with at least the reading terminal; and an information processor configured to be able to communicate with at least the administration unit and the reading terminal;

the reading terminal includes:

a reading section that reads the information code outputted to the output section of the output terminal;

a second input section that is able to input at least a part of the specific information of any second subject registered in the registration section; and a transmission section that transmits the specific information of the first subject interpreted from the information code by the reading section, and the specific information of the second subject inputted by the second input section;

the administration unit performs an authentication process for authenticating information from the reading terminal, on the basis of data registered in the registration section, and when authentication is successful in the authentication process, outputs predetermined request information that can specify the first subject and the second subject to the information processor; and the information processor performs a predetermined setting process for the first subject and the second subject, according to the request information from the administration unit.

Advantageous Effects

The first aspect of the present disclosure provides the specific information acquisition section which is ensured to be able to acquire specific information of a subject or an object, as information recorded in the data recording region of the information code, or as information to be correlated to the information recorded in the data recording region. Further, the first aspect of the present disclosure provides the unique image acquisition section which is ensured to be able to acquire a unique image of a subject or an object, or a unique image for specifying the subject or the object. The specific information of a subject or an object, and the unique image of the subject or the object acquired in this way can be registered in the registration section. Accordingly, the information code that enables visual identification via an image can be administered, while the reliability of the information code to be administered is enhanced owing to the presence of such registration information.

Further, according to the second aspect of the present disclosure, an image in the data recording region based on data of the input items can be registered, being correlated to an image in the image region in the information code. Thus, reliability of the information code can be enhanced.

The third and fourth aspects of the present disclosure can realize the information code that is provided with the data recording region recorded with data that are registered in an external unit, and the image region indicating an image registered in the external unit. In particular, not only the data in the data recording region, but also the image indicated in the image region, are administered being registered in the external unit. Thus, referring to the external unit, reliability of both the recorded data and image can be confirmed.

The fifth aspect of the present disclosure can realize a reader that reads an information code including a data recording region, the data recording region containing data that was previously obtained from an external unit, the image region indicating an image registered in the external unit to enhance the reliability of both the recorded data and the image. The reader is able to use both of the recorded data and the image as objects to be read.

According to the sixth aspect of the present disclosure, when at least a part of specific information of any first subject registered in the registration section is inputted by the first input section, the information code can be produced with a configuration in which the inputted specific information is recorded in the data recording region, and the produced information code can be inputted to the output section. Accordingly, a person who uses the output terminal is able to transmit the specific information of the first subject to the outside using the information code as a medium.

On the other hand, the reading section is able to read specific information of the first subject from the information code outputted from the output terminal. When specific information of any second subject registered in the registration is inputted by the second input section, the reading terminal is able to transmit the specific information of both the first subject and the second subject to the administration unit for the grant of authentication.

Then, the administration unit performs the authentication process for authenticating the information from the reading terminal, on the basis of data registered in the registration section. When authentication in the authentication process is successful, the administration unit outputs the predetermined request information that can specify the first subject and the second subject to the information processor. On the other hand, in response to the request information from the administration unit, the information processor is configured to perform the predetermined setting process concerning the first subject and the second subject.

In this way, an administration unit side can attempt authentication on the basis of the specific information of both of the first and second subjects transmitted from the reading terminal, and, when the authentication is successful, can make a request to the information processor, specifying the first and second subjects. With this configuration, when requesting a setting associated with the first and second subjects to the information processor, it is no longer necessary to individually make access to the information processor from a plurality of terminals. Thus, this can easily suppress the increase of work time and trouble ascribed to such individual access. Further, the administration unit acts over a request process referring to the registration section to conduct authentication. Thus, this can make a confirmation as to the reliability of not only the personal information of the second subject inputted by the reading terminal, but also the specific information of the first subject which is transmitted together with the specific information of the second subject. In other words, the administration unit indirectly confirms whether or not the highly reliable information code that includes registered information has been used, in transmitting information from the output terminal to the reading terminal. Upon the indirect confirmation, the administration unit can request setting regarding the first and second subjects to the information processor. Therefore, in the event that any fraud is committed, such a fraud can be effectively and easily eliminated, the fraud being, for example, that a person who could not know the personal information of the first subject operates the reading terminal to make a setting request regarding the first subject without permission.

BRIEF DESCRIPTION OF DRAWINGS

In the accompanying drawings:

FIG. 12 is an illustration conceptually explaining an input format in the case of performing personal registration:

FIG. 13(A) is an illustration conceptually explaining personal information and registered image, which are acquired by an administrative server from a person to be registered, FIG. 13(B) is an illustration conceptually explaining a state where a code number has been allocated to the personal information, and FIG. 13(C) is an illustration conceptually explaining a data structure of registration data to be registered in the administrative server;

FIG. 15(A) is an illustration explaining an example of an information code of a person to be produced and registered through the registration process of FIG. 11, and FIG. 15(B) is an illustration conceptually explaining feature points extracted in a facial image of the person;

FIG. 16 is an illustration conceptually illustrating an input format in the case of performing corporative registration;

FIG. 17(A) is an illustration explaining an example of an information code to be produced and registered through the registration process of FIG. 11, and FIG. 17(B) is an illustration conceptually explaining feature points extracted in a unique image of the corporate body;

FIG. 22 shows illustrations explaining information codes used in a system which uses an information code, according to a second embodiment, in which FIG. 22(A) is an illustration showing a state where a free space has been blanked, and FIG. 22(B) is an illustration showing a state where a unique image has been arranged in a free space;

FIG. 23 shows illustrations explaining information codes used in a system which uses an information code, according to a third embodiment, in which FIG. 23(A) is an illustration showing a state where a free space has been blanked, and FIG. 23(B) is an illustration showing a state where a unique image has been arranged in a free space;

FIG. 28 is an illustration exemplifying registration items in a registration section, in the system according to the fifth embodiment;

FIG. 36 is an illustration explaining a correlation between information allocated to each SNS and information allocated to each setting purpose;

DESCRIPTION OF EMBODIMENTS

[First Embodiment]

Figure 1:
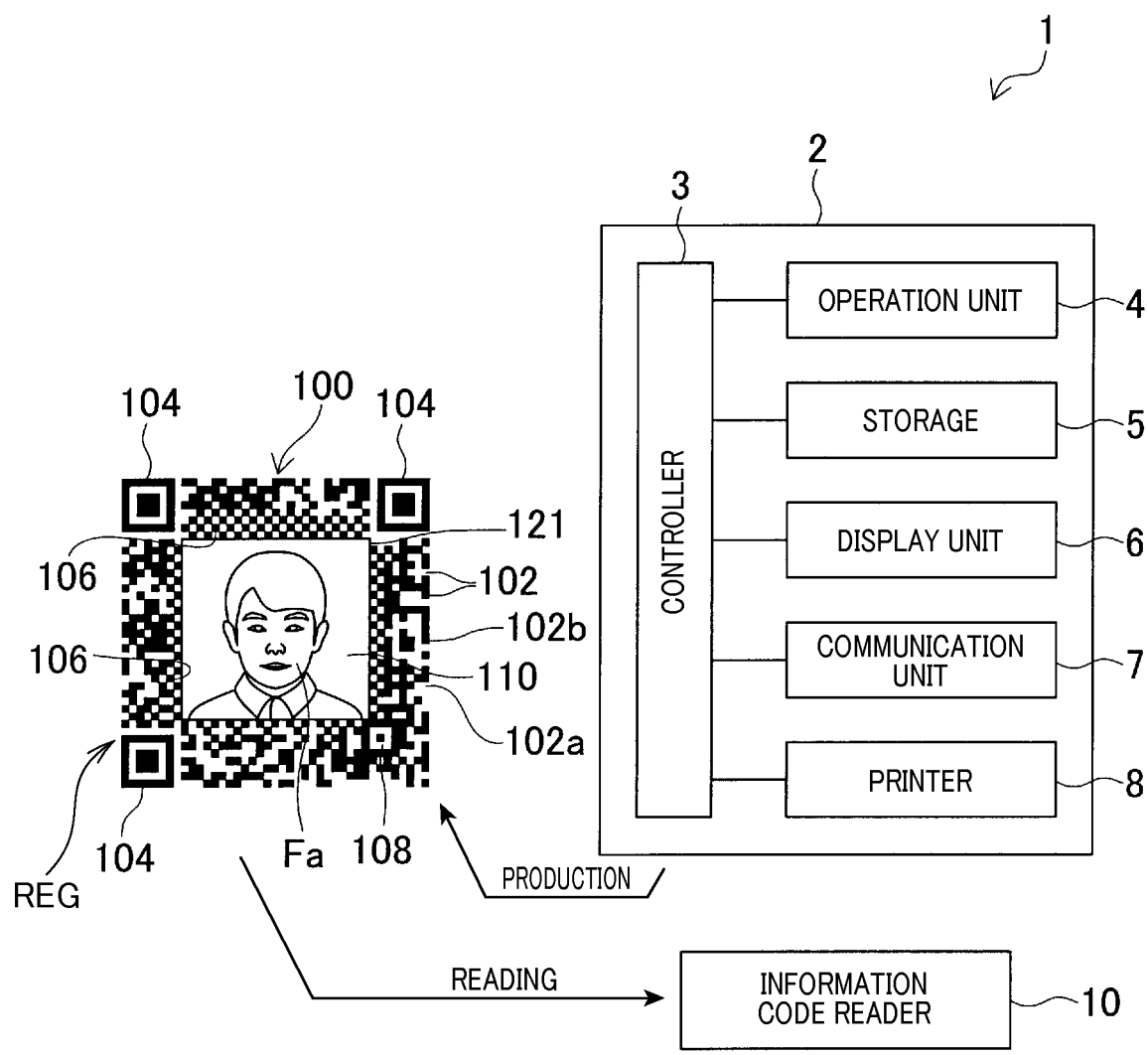
FIG. 1 is an outlined view exemplifying part of an outlined system which uses an information code, according to a first embodiment of the present invention.

Referring to the drawings, a first embodiment of the present invention will now be described.

FIG. 1 shows a system 1 which uses an information code. This system 1 includes an information code producing apparatus 2 and an information code reader 10. The information code producing apparatus 2 produces an information code 100 provided with a predetermined code area in which cells are arranged, the cells being units composing information. The information code reader 10 reads the information code 100 produced by the information code producing apparatus 2.

Figure 10:
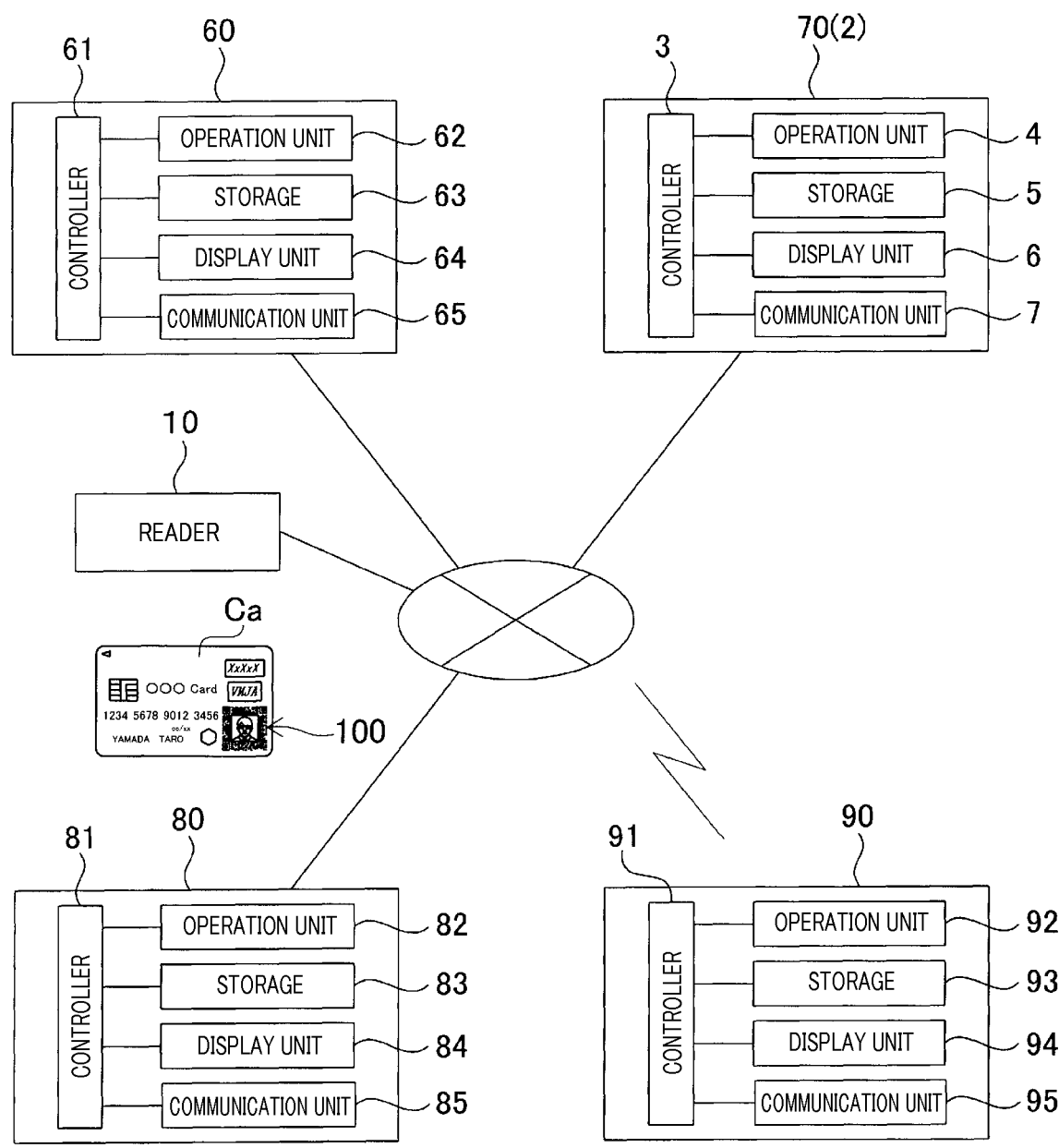
FIG. 10 is a block diagram conceptually illustrating an electrical configuration and the like of devices exemplified in FIG. 9.

In addition, as shown in FIG. 10, the system 1 is provided with a check server 60 and an administration server 70 and connectable with a commuter 80 and a terminal 90. The configuration shown in FIG. 10 will be detailed later, so that the basic configurations of the information code producing apparatus 2, the information code reader 10, and the information code 100 will now be described first.

(Information Code Producing Apparatus)

The information code producing apparatus 2 is configured by an information processing apparatus, which is a personal computer for example. This apparatus 2 is provided with a controller 3 including a CPU, an operation unit 4 including a key board, a mouse and other input devices, and a storage 5 including memory devices such as a ROM, a RAM, a HDD, and nonvolatile memories. The apparatus 2 further includes a display unit 6 equipped with known display devices (such as a liquid crystal display and/or other types of display devices), a communication unit 7 functioning as a communication interface to and from external devices via wire or wireless communication, and a printer 8 (printing device). The printer 8 is similar in hardware to known printers and is capable of printing the information code 100 and necessary information in reply to printing data sent from the controller 3.

(Information Code Reader)

Figure 2:
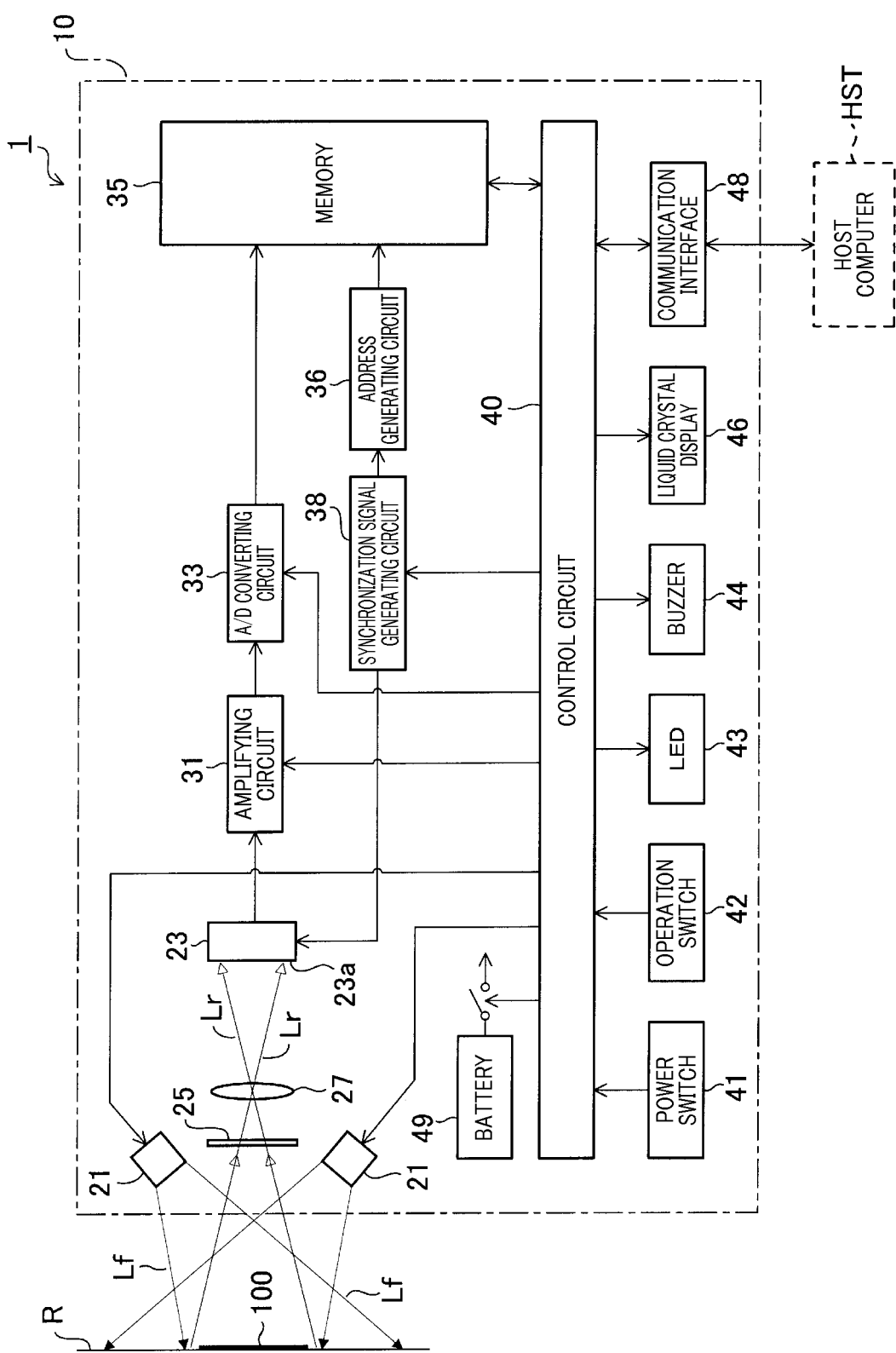
FIG. 2 is a block diagram exemplifying an outlined electronic configuration of an information code reader composing part of the system shown in FIG. 1.

The overall configuration of the information code reader 10 will now be explained. As shown in FIG. 2, in terms as hardware configuration, the information code reader 10 is configured as a code reader capable of reading two-dimensional codes. The reader 10 has a not-shown outer casing, in which various kinds of electronic components are accommodated.

The information code reader 10 includes, as its main components, an optical system provided with illuminating sources 21, a light receiving sensor 23, a filer 25 and an imaging lens 27; a microcomputer system (hereinafter called "a microcomputer") provided with memories 35, a control circuit 40, an operation switch 42, and a liquid crystal display 46; and a power supply system provided with a power switch 41 and a battery 49. These components are mounted on not-shown printed boards and/or implemented in the case (not shown).

The optical system is configured to include the illuminating sources 21, light receiving sensor 23, filter 25 and imaging lens 27. The illuminating sources 21 function as light sources capable of emitting illuminating light Lf, and, for example, include red LEDs and lens systems disposed on the output side of the LEDs, in which the lens system include diffusing lenses and collecting lenses. In the present embodiment, the illuminating sources 21 are arranged on both sides of the light receiving sensor 23 and are able to emit the illuminating light Lf towards an object R being read via a reading opening (not shown) of the case. The object R being read is a medium carrying an information code or a medium in or on which an information code is arranged or mapped. The object R being read may be various objects such as resin materials or metal materials, and an information code 100 (later described), which are as shown in FIG. 1 for example, is produced on the object R being read, by known image forming methods, such as printing.

The light receiving sensor 23 is provided as one example of an imaging unit capable of imaging the information code 100 (which will be described later) and is able to receive reflected light Lr coming from the object R being read and the information code 100 which reflect the illuminating light. This light receiving sensor 23 is for example an area sensor in which light-receiving elements are arranged two-dimensionally, such elements being solid-state image sensing devices such as C-MOSs or CCDs. The light receiving sensor 23 is mounted on a not-shown printed circuit board and has a light receiving window 23a through which incident light coming through the imaging lens 27, so that the sensor is able to receive the incident light.

The filter 25 is an optical low-pass filter disposed between the reading opening (not shown) of the case and the imaging lens 27. The filter 25 is able to, for example, make it pass therethrough light whose wavelengths is equal to or less than a designated wavelength corresponding to the reflected light Lf and, in contrast, make it cut off light whose wavelength is over the designated wavelength. Hence unnecessary light components whose wavelengths are over that of the reflected light Lr are suppressed from incoming into the light receiving sensor 23. The imaging lens 27 is, by way of example, configured to include a lens barrel and a plurality of collecting lenses accommodated in the lens barrel. In the present embodiment, the imaging lens is configured to collect the reflected light Lr incoming through the reading opening (not shown) of the case, and form a code image of the information code 100 on the light receiving window 23a of the light receiving sensor 23.

The microcomputer system includes an amplifying circuit 31, an A/D converting circuit 33, a memory 35, an address generating circuit 36, a synchronization signal generating circuit 38, a control circuit 40, a power switch 42, an LED 43, a buzzer 44, a liquid crystal display 46, a communication interface 48, and other necessary components. In the microcomputer system, the control circuit 40 functioning as a microcomputer (i.e., information processing unit) and the memory 35 are key components in the function thereof, and image signals of the information code 100 imaged by the foregoing optical system can be processed.

An image signal (which is an analogue signal) outputted from the light receiving sensor 23 of the optical system is provided to the amplifying circuit 31 to be amplified there with a predetermined gain, and the amplified signal is then provided to the A/D converting circuit 33 to be converted to a digital signal from the analogue signal. The digitalized image signal, that is, image data (i.e., image information) is provided to the memory 35 so that the image data is stored in an image data storage area of the memory 35. The synchronization signal generating circuit 38 is configured to generate a synchronization signal sent to both the light receiving sensor 23 and the address generating circuit 36. The address generating circuit 36 is configured to generate addresses at which the image data are stored at the designated addresses in the memory 35, in response to the synchronization signal coming from the synchronization signal generating circuit 38.

The memory 35 is composed of memory devices such as semiconductor memory devices, which include RAMs (DRAMs, SRAMs, etc.) and ROMs (EPROMs, EEROMs, etc.). The RAMs of the memory 35 are arranged to provide not only the image data storage area, described above, but also an operation area and a reading condition table which are used during processing for arithmetic calculations and logic calculations performed by the control circuit 40. In the ROMs, system programs are stored in advance, which include predetermined programs assigned to a later-described reading process and other necessary programs, and which are used to control hardware components including the illuminating light sources 21 and the light receiving sensor 23.

The control circuit 40 is provided with a microcomputer configured to be able to control the information code reader 10, and the microcomputer includes a CPU, a system bus, and an input/output interface, whereby the microcomputer provides an information processing function. In the control circuit 40, the input/output interface is communicably connected to various input/output devices (called peripheral devices) which include, in the present embodiment, the power switch 41, the operation switch 42, the LED 43, the buzzer 44, the liquid crystal display 46 and the communication interface 48. The communication interface 48 is communicably connectable to the host computer HST and/or other systems which are provided as host systems of the information code reader 10.

The power system includes the power switch 41 and the battery 49, in which the power switch 41 can be turn on/off to control connection/disconnection of paths for drive voltage from the battery 49 to the foregoing devices and circuits, which is under control of the control circuit 40. The battery 49 is composed of a secondary battery capable of generating a predetermined DC voltage, and this battery is for example a lithium-ion battery.

(Information Code)

Figure 5:
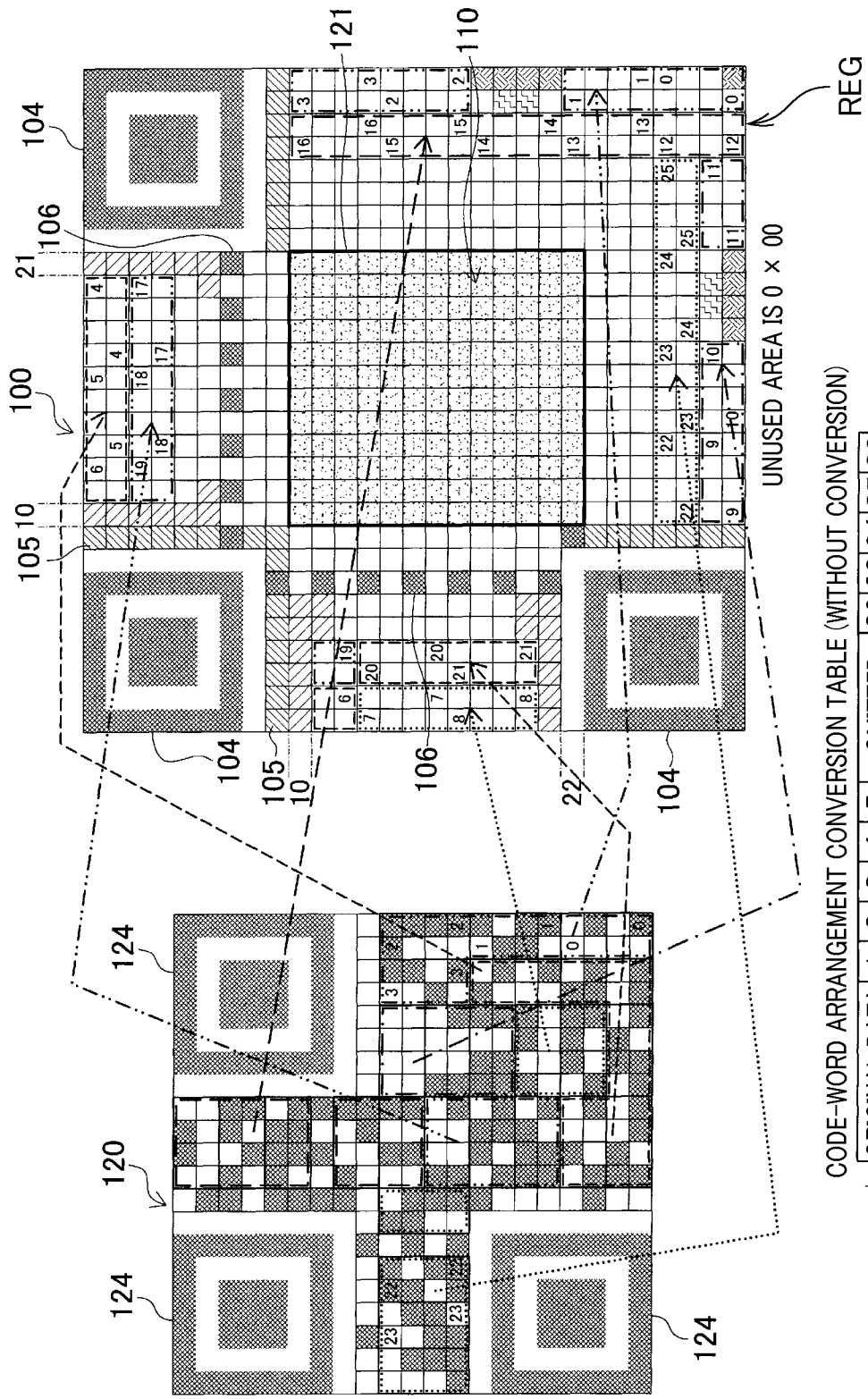
FIG. 5 is an illustration explaining a correspondence relationship between arrangement of respective data words in the information code produced by an information code producing apparatus composing part of the system shown in FIG. 1.

With reference to FIGS. 1, 5, and other drawings, an information code 100 used in the system shown in FIG. 1 will now be described. Two codes exemplified in FIGS. 1 and 5 are configured based on the same basic scheme for configuring the codes and have similar characteristics, although arrangement of cells and the sizes of specification patterns are different from each other in the two codes. An information code 100 shown in FIGS. 1, 5 and other drawings is produced by the foregoing information code producing apparatus 2, for example, and has a predetermined code area REG in which cells 102, each corresponding to a unit for displaying pieces of information, are arranged. In the information code 100 shown in FIGS. 1, 5 and other drawings, the "code area" is a rectangular region REG which can contain all of a plurality of dark cells (refer to FIGS. 1 and 5), and practically, is a minimum square or rectangular region which contains all of three position detecting patterns (finder patterns) 104.

Specifically the plurality of cells 102 are arranged or mapped according to a predetermined rule, so that the outer contours of some cells among those cells produce series of those contours which draw a square, rectangular, or other-shape area on or in a medium R differentiablly from the background. This area becomes the code area REG.

In the example shown in FIGS. 1, 5 and other drawings, each of the plurality of cells 102 is composed of a rectangular (e.g., square) light (e.g., white) cell 102a or a rectangular dark (e.g., black) cell 102b. Inside the code area, there is a free space (or called a canvas area) 110, which will be detailed later, and some of the cells 102 are located around the free space 110 in a matrix form. By the way, the light cell 102a and the dark cell 102b will not limited to the white cell and the black cell, and provided that the dark cell 102b has a predetermined luminance level, it is sufficient that the light cell 102a presents a luminance higher than the predetermined luminance level of the dark cell. In the information code 100, a light-color or dark-color margin zone is formed as a quiet zone to surround the code area. In the example shown in FIGS. 1, 5 and other drawings, a light-color margin zone (whose light color is for example white or higher in luminance than that of the dark cell) is adjacent to surround the code area.

Definitions of the light and dark colors are explained in detail by references such as "International Standard ISO/IEC18004, second edition 2006-09-01, page 109, Annex M, "M1 Symbol contrast"".

In the information code 100, there are provided a specification pattern region, a data recording region, and an error correction code recording region in its rectangular code (e.g., square, rectangular or any other shapes) code area. In the specification pattern region, predetermined-shaped specification patterns (practically, fixed-figure region wider in area than a single cell) are arranged. In the data recording region, data are recorded by the various types of cells 102 and in the error correction code recording region, error correction codes are recorded by the various types of cells 102. As shown in FIGS. 1, 5 and other drawings, by way of example, the specification patterns arranged in the information code 100 are the same in their shapes and positions as those of known predetermined models of a QR code (registered trademark) (in the example shown in FIG. 5, the predetermined models of the QR code standardized by JIS or other standards). In the example shown in FIGS. 1, 5 etc., three position detecting patterns (finder patterns) 104 are arranged at three corners of the code area respectively and, at predetermined positions, timing patterns 106 and alignment patterns 108 are arranged. The patterns 104, 106 and 108 serve as the specification patterns. The timing patterns and/or alignment patterns are not always necessary to be provided.

In this way, at the predetermined positions in the code area of the information code 100, there are arranged the fixed-shaped specification patterns (i.e., the position detecting patterns 104, timing patterns 106 and alignment patterns 108 (omitted from FIG. 5). Inside the code area, a space other than the later-described free space 110 is used for arrangement of such specification patterns, recording regions (each of which is the recording region or the error correction code recording region), and other necessary regions.

The reader 10 may use many methods to interpret the number of lines and the number of columns, which are composed of cells, of the information code 100, the shapes and positions of the specification patterns, the position of format information, candidate positions of code words (i.e., addresses specifying the arrangement order of code words), and others. For example, a plurality of versions may be set depending on types of the information code 100, where, for each of the versions, the number of lines of cells and the number of columns of cells, the shapes and positions of the specification patterns, the positions of format information, and candidate positions (addresses)) of code words may be predetermined. When version information is arranged at predetermined positions (reserved regions) in the code area, the reader, 10 can read the version information at the predetermined positions. Based on this version information, the reader 10 can understand the number of lines of cells and the number of columns of cells, the shapes and positions of the specification patterns, the position of the format information, the candidate positions (addresses) of code words in the information code 100. The reader may use alternative approach to obtain the foregoing pieces of information.

In addition, inside the code area, the free space 110 is formed to have a size larger than the size of the single cell 102. This free space 110 is located at a region other than the specification pattern regions, data recording regions, and error correction code recording regions. In the free space 110, cells showing data being interpreted as output data for reading are not recorded. In other words, the free space 110 can be set as a region in which data on the cells 102 are not recorded and to which error correction on error correction codes are not applied.

In FIGS. 1, 5 and other drawings, the data recording regions and the error-correction-code recording regions are arranged along the outer edges of the code region REG in a circular and rectangular shape (that is, in a rectangular frame shape). This produces a free space 110 in a central part of the code region REG. This central part is a predetermined field containing the center of the code region. "The region in which the cells 102 are not recorded" means a region in which not only code words such as data code words or error correction code words but also format information will not be recorded. Further, "the region regions to which the error correction based on error correction codes will not be applied" means a region which will not subjected to error correction performed using error correction codes recorded in the error-correction-code recording regions. Hence, even if there is some sort of presentation in the free space 110, the error correction codes in the error-correction-code recording regions which are present around the free space 110 will not be applied to the presentation in the free space 110.

In the following, a representative example will be explained in which a code configuration assigned to a predetermined version drawn as the right figure in FIG. 5 is made to correspond to a code configuration assigned to a further version (i.e., version number) smaller than the predetermined version as the left figure in FIG. 5. Moreover, the positions of respective code words of the information code 100 drawn on the right side of FIG. 5 are made to correspond to the positions of respective code words of another type of code 120 drawn on the left side of FIG. 5 by an arrangement conversion table shown in the lower part of FIG. 5. In this example, as long as an amount of data can be stored in the other type of code 120 shown on the left side in FIG. 5, such data can expressed in a region which remains after formation of the free space 110 the information code 100 on the right side in FIG. 5. When the information code 100 on the right side of FIG. 5 is read, the code words of this information code 100 can be read such that they are code words of the other type of code 120 on the left side in FIG. 5.

On the right figure of FIG. 5, the regions of the respective code words, which are mapped around the free space 110, are conceptually shown by dashed line frames. The right figure in FIG. 5 conceptually shows only a region for part of the code words, thereby omitting the remaining code word regions from being drawn, but other code words may be arranged to map the soundings of the free space 110. Regions in which the format information (i.e., the cells at the predetermined positions 105) are conceptually shown by a predetermined type of hatched lines. The regions in which the format information or the code words are recorded are shown by only squares, omitting practical cell arrangements from being drawn. In addition, although the example shown on the right side in FIG. 5 provides the free space 110 located at the central part of the code area has squares drawn therein, the free space 110 can be configured freely, so that the free space 110 may be formed as shown in FIG. 1 or in another configuration.

Figure 6:
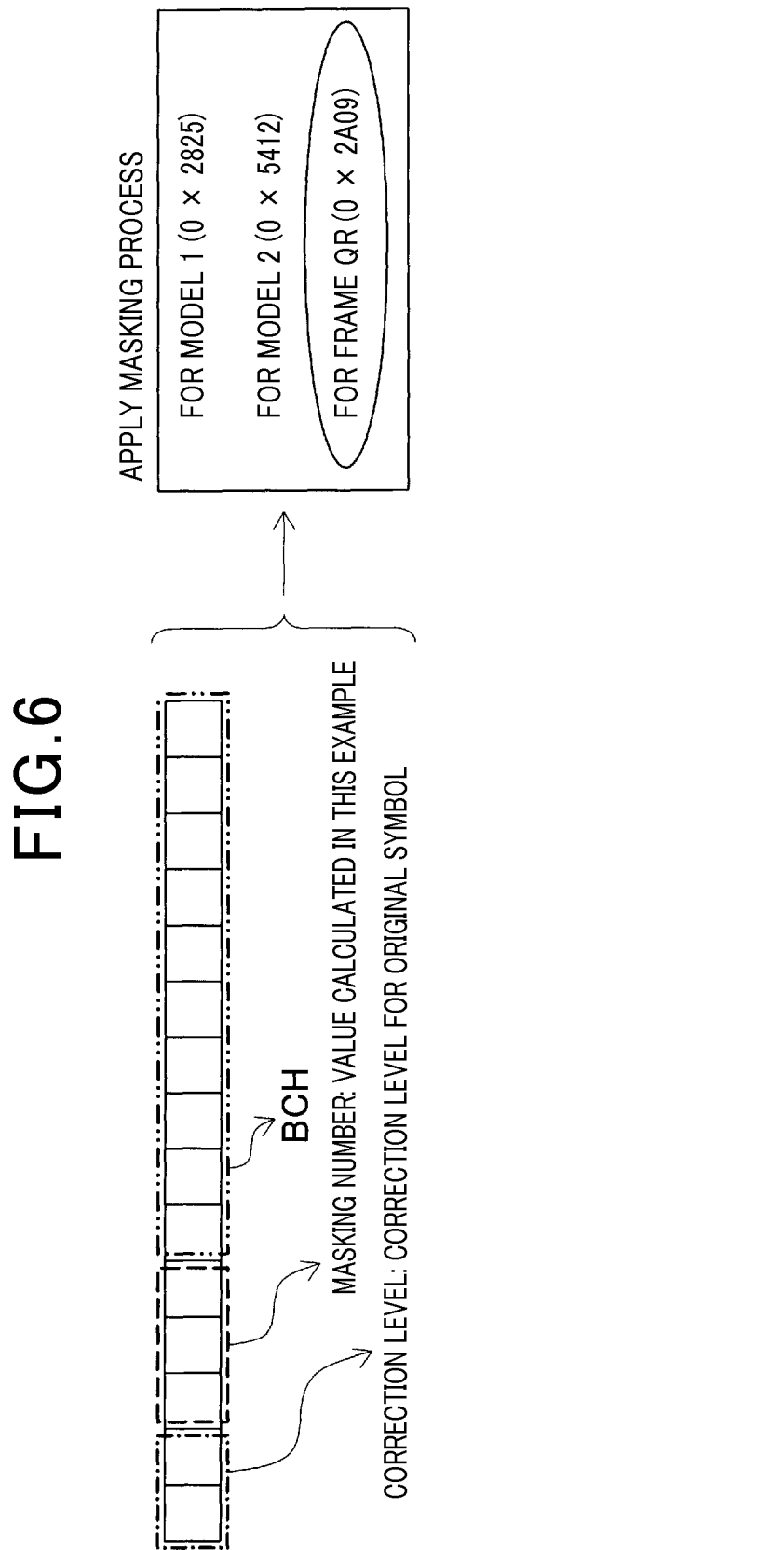
FIG. 6 is an illustration conceptually explaining the data format of the information code used in the system shown in FIG. 1.

The format information (type information) is configured as shown in FIG. 6 for example, and recorded at the predetermined positions 105 (portions with a predetermined type of hatched lines) in the information code 100. This recording is performed on a specified format configuration. This format information includes correction level information for specifying an error correction level and mask number information for specifying a mask number. The correction level information is to specify an error correction level used by the information code 100 and corresponds to an error correction level used by the other type of information code 120 when the information code 100 is converted to the other type of code 120 for reading thereof. The mask number is used to specify what type of masking has been applied to the code word region of the information code 100, where code words of data and an error correction are recorded in the code word region.

The format information shown in FIG. 6 is recorded so that a predetermined type of mask pattern (a specified mask) is reflected in the format information. That is, using a known masking method, the predetermined type of mask pattern is applied to arrangements of light and dark cells showing data corresponding to the format information. The type of mask indicated by the format information is identified by a method similar to a known QR code, thus making it possible to detect a specified code type as shown on the right side in FIG. 5 (i.e., a code type with the free space 110).

In the QR code (registered trademark) according to a known standard, when the QR code is configured on a model 1 for example, a mask for the model 1 is applied to the format information shown in FIG. 6, so that data (i.e., a cell arrangement) are produced by the masking and the produced data are recorded at predetermined positions. Similarly, in configuring the QR code on a model 2, a mask for the model 2 is applied to the format information shown in FIG. 6, so that data (i.e., a cell arrangement) are produced by the masking and the produced data are recorded at predetermined positions.

Meanwhile, in the information code 100 shown in FIG. 5 of the present embodiment (that is, in the special type of code with the free space 110), a specified mask which is different in type from the models 1 and 2 is applied to the format information shown in FIG. 6. This application produces an expression of data (i.e., an arrangement of cells), and the data are recorded in predetermined positions 105. In this example, the specified mask is exemplified as being for a casing trim QR (quick response) (or frame QR) in FIG. 6 and the frame QR is one kind of the two-dimensional code. This QR code is one kind of two dimensional information codes.

For any type selected from the models 1 and 2 on a known standard and the information code 100, the formal information is configured such that check digits for a correction level (correction level information) for recording and a mask number are included in the format information, and making for the selected type is then applied to the format information. Practically, the mask pattern for each type is used to be subjected to the format information using a known masking process, resulting in that an arrangement of light cells and dark cells, corresponding to a masked bit pattern, is recorded at the predetermined positions 105.

Accordingly, when the format information is masked by a specified mask (in FIG. 6, this specified mask is exemplified as being for the fame QR) and recorded at the predetermined positions 105, the cell information recorded at the predetermined positions 105 is released from being masked by using the specified mask and then interpreted for revealing the same check digits. Thus it can be determined that the type is for the information code 100.

In contrast, if the cell data at the predetermined positions in the information code 100 are subjected to making release based on the masks for the model 1 or 2, the check digits are produced differently from the originally added check digits. It can thus be determined that an information code is not according to the known models 1 and 2.

In this information code 100, the specification patterns (such as the position detecting patterns 104) are detected, and the same method as that for known QR codes is used to specify the direction of the code and the positions of the respective cells, before the format information recorded at the predestined positions 105 are interpreted using the same method as that for the known QR codes. The type of a mask which has been disclosed through the interpretation provides the type of the information code 100, i.e., the type of this code is a special type with the free space 110. The interpreted format information results in determining both an error correction level used in the information code 100 and the type of a mask applied to the code word region (i.e., a region in which data code words and error correction code words are recorded).

Additionally, inside the free space 110, as shown in FIG. 1, an image can be displayed. In the example shown in FIGS. 1 and 5, the free space 110 (i.e., a region where images can be provided) has a boundary shown by a reference 121, where the inner space enclosed by this boundary 121 is the free space 110. The free space 110 (which can be an image region) will now be explained later about its practical configuration and how to use it.

Figure 3:
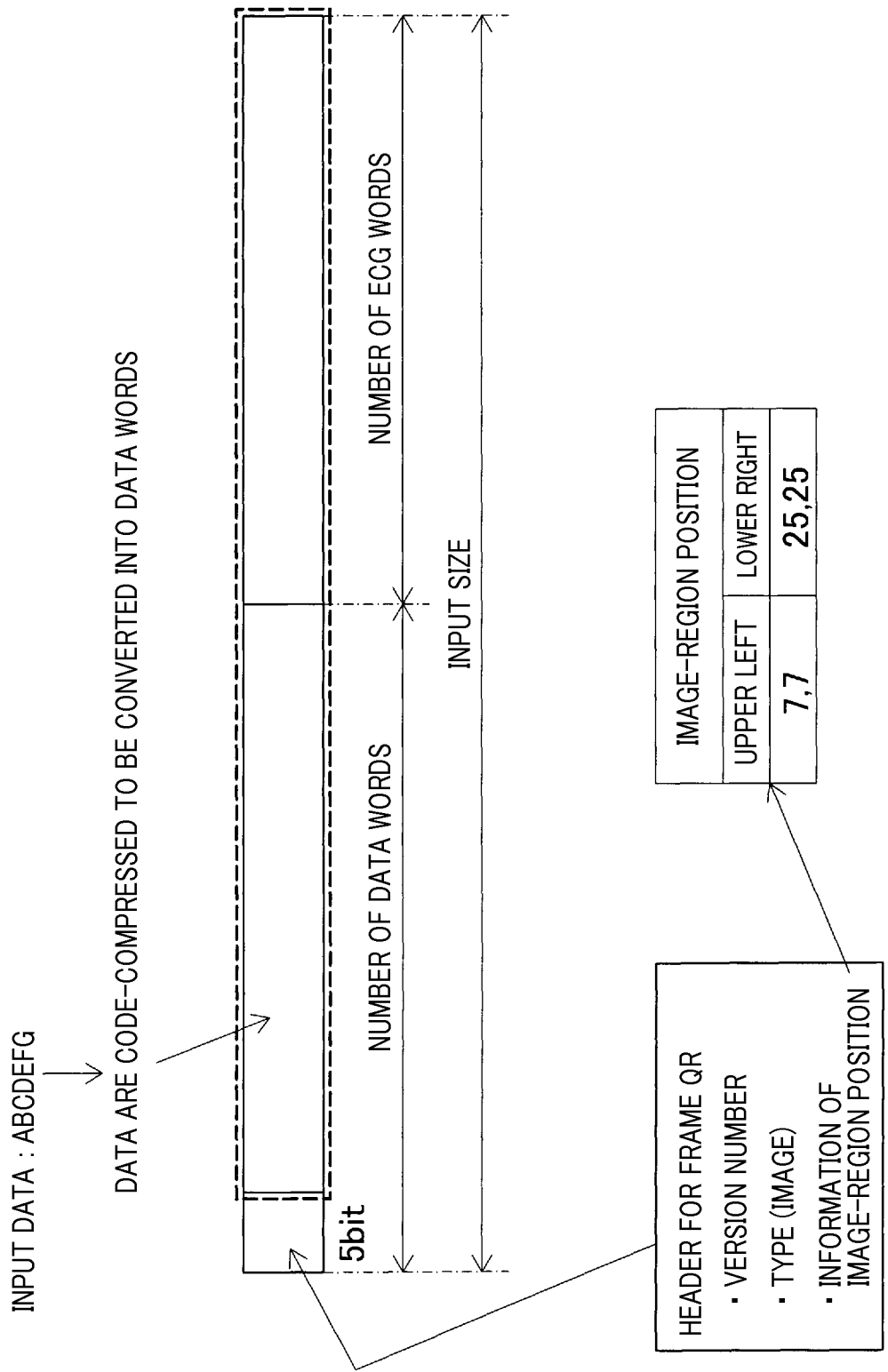
FIG. 3 is an illustration conceptually explaining the data configuration of an information code used in the system shown in FIG. 1.

Contents recorded in the information code 100 are formatted into a data arrangement as shown in FIG. 3, for example. Header data are put at the head of the data arrangement, which are followed by input data (i.e., data to be interpreted). In the example shown in FIG. 3, the input data (data to be interpreted) are compressed using a known compressing technique so that the input data are converted into data words (or data code words). This compression may be omitted, if it is unnecessary. The header data used in this information code 100 are also called "header for frame QR" in the following explanation. Further, in the present disclosure, the data recording region is composed of regions in which the data words (data code words) of the header data and the input data as well as regions in which the forgoing format information is recorded. In the example shown in FIG. 3, there are recorded, as the header data (the header for the fame QR), not only specifying information but also identifying information are recorded. The specifying information, which is exemplified as being the version number in FIG. 3, is able to specify the type (version) of the other type of code 120 later described. This other type of code 120 is a code type for interpreting the information code 100 and made to correspond to the information code 100 via the arrangement conversion table (shown in FIG. 5). The identifying information is used to identify a format in the free space.

In the header data shown in the example of FIG. 3, there are recorded information (corresponding to first information) and information (corresponding to second information) as well as the other type (version number) of code. The information corresponding to the first information shows that the format of the free space 110 is written as an image format shown in FIGS. 1, 5 and other drawings, while the information, which is image-region position information corresponding to the second information, shows the position (i.e., an image region position) of the free space 110 (i.e., an image region). Of these two types of information, the former (i.e., the first information) is one example of "identification information" showing that the image region is present. The latter (i.e., the second information) is one example of "positional data" showing a position of the image region in the code area.

Additionally, in the example shown in FIGS. 3 and 5, the image-region position information (i.e., positional data) is recorded as information which makes it possible to specify both a column position and a line position of the free space 110 provided as the image region. To be specific, when the rectangular information code 100 shown in FIG. 5 is divided into a grid form by plural lines and plural columns, a combination of the line and column positions at the upper left corner of the free space 110 and a combination of the line and column positions at the lower right corner of the free space 110 are recorded as the image-region position information (i.e., positional data). In addition, the width of between two lines and the width of between two columns of the grid on the information code 100 are equal to the vertical and lateral widths of the single cell.

Furthermore, in the data configuration shown in FIG. 3, the input data (i.e., data words being interpreted) are followed by error correction code words (ECC words) which are error correction codes. In the information code 100, a region in which the error correction codes are recorded functions as an error correction code recording region. As a method of producing error correction codes (i.e., error correction code words) based on the data words (i.e., the header data and the input data (which are data to be interpreted) in the example shown in FIG. 3), methods based on known two-dimensional codes (such as QR codes) can be employed. By way of example, as a method of producing the error correction code words based on the data words (i.e., data code words), a production method for error correction code words regulated by JISX0510:2004 (which is JISX0510:2004, 8.5 error correction) can be used as one of the known methods. This production method for the error correction code words is not limited to the foregoing, and this production may be performed using various other methods.

Moreover, in the information code 100, the respective data words (data code words) expressing data being interpreted and the error correction code words are arranged or mapped within the code area on the basis of predetermined arrangement position information. In this configuration, as shown in FIG. 5, arrangement candidate positions for respective code words are defined previously in the code area of the information code 100, and the numbers (addresses) are assigned to the respective arrangement candidate positions. The arrangement position information specifies arrangement of the code words such that the respective code words composing the recording contents shown in FIG. 3 should be arranged at which of the arrangement candidate positions. In the example shown on the right figure in FIG. 5, the arrangement candidate positions Nos. 1-25 are outlined by way of example, in which the head and last bit portions are numbered for explicit showing in each of the arrangement candidate positions and arrangement candidate positions of Nos. 26 or higher are omitted from being drawn.

Specifically, in the case of the version of the other type of code 120 (in this case, a known QR code) where the version is specified by the header data shown in FIG. 3, known regulations or rules are applied to determine that each of the code words having an arrangement order should be arranged or mapped at which position in the other type of code 120. In interpreting the other type of code 120, the arrangements defined in this way are used to interpret the code words in the arrangement order. For instance, in the other type of code 120 shown on the left side in FIG. 5, the zero-th code word is arranged at the lower right, the first code word is arranged next to the upper edge of the zero-th code word, and the second code word is arranged next to the upper edge of the first code word. In this way, the arrangement positions of the respective code words are decided previously. The other type of code 120 is thus interpreted in sequence based on the predetermined arrangements, like the order starting from the zero-th code word, the first code word, the second code word, the third code word, . . . , and to the last one.

The arrangement position information (the arrangement conversion table) shown in FIG. 5 is provided to make the numbers of the respective arrangement positions (i.e., arrangement positions of the code words according to the arrangement order) previously decided in the other type of code 120 correspond to the numbers of the candidate positions (i.e., the arrangement candidate positions of the code words) previously decided in the information code 100, respectively. To be more precise, in the arrangement position information, correspondence information showing "the arrangement position of the first code word in the other type of code 120 corresponds to the first arrangement candidate position in the information code 100", "the arrangement position of the second code word in the other type of code 120 corresponds to the second arrangement candidate position in the information code 100", "the arrangement position of the third code word in the other type of code 120 corresponds to the third arrangement candidate position in the information code 100", and so on, is recorded as, for example, table data. As a result, the arrangement positions of the code words numbered in the other type of code 120 are made to respectively correspond to the arrangement candidate positions of the information code 100.

Thus, in interpreting the information code 100, the code words at the arrangement candidate positions in the code area, i.e., the addressed code wards in the code area, are re-arranged to arrangement positions in the other type of code 120 which arrangement positions are specified by the arrangement position information (i.e., the arrangement conversion table). The other type of code 120 thus re-arranged is then subjected to interpretation based on a known interpretation method (e.g., a known decoding method for the QR code).

For example, by using the arrangement conversion table shown FIG. 5 to interpret the information code 100, the code word at the first arrangement candidate position in the information code 100 is arranged at an arrangement position assigned to the first code word in the other type of code 120; the code word at the second arrangement candidate position in the information code 100 is arranged at an arrangement position assigned to the second code word in the other type of code 120; and the code word at the N-th arrangement candidate position in the information code 100 is arranged at an arrangement position assigned to the M-th code word made to correspond to the N-th arrangement candidate position in the other type of code 120. As exemplified above, the re-arrangement is performed for every code word, and the other type of code (e.g., QR code) whose code words are re-arranged is subject to a known interpretation method.

It is preferable that the arrangement position information (the arrangement conversion table) is owned, as common data (a common arrangement conversion table), by both the information code producing apparatus 2 producing the information code 100 and the information code reader 10 reading the information code 100.

(Production Process of Information Code)

Figure 8:
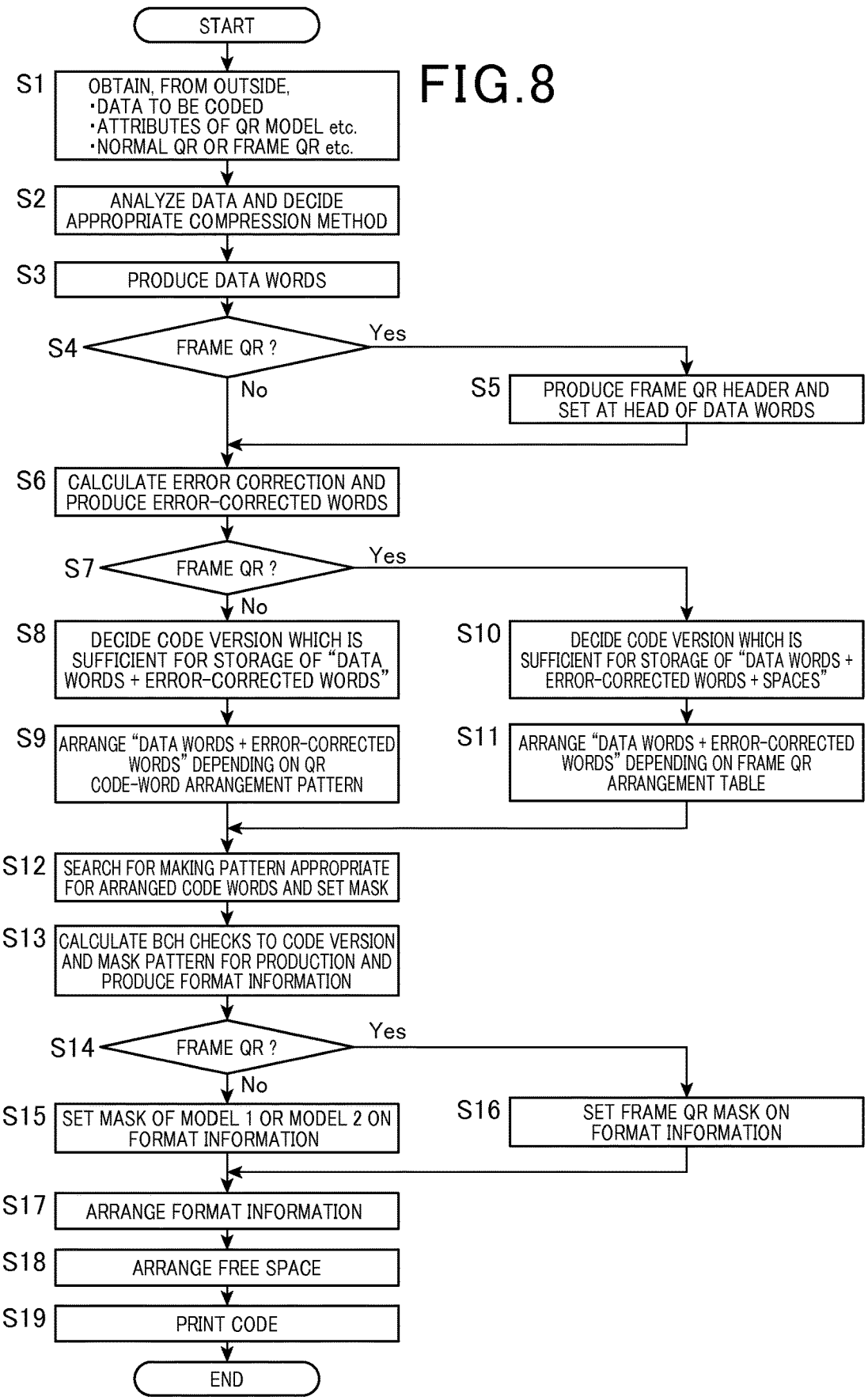
FIG. 8 is a flowchart exemplifying a flow of production of the information code produced by the information code producing apparatus composing the part of the system shown in FIG. 1.

Referring to FIG. 8 and other drawings, an information code producing process and an information code producing method will now be described.

The following description is directed to a QR code (registered trademark) exemplified as the other type of code 120 and the information code 100 has the specification patterns which are the same as those of the QR code, as shown in FIG. 5. In this example, the information code 100 with the free space 110 is also referred to as a "frame QR (or frame QR code)". Steps composing a process for the production are shown by adding a reference numeral "S". This expression technique will also be applied processes which will be described later.

An information code producing process is shown in FIG. 8, which is performed by the information code producing apparatus 2. This process is started, for example, by a predetermined operation performed at the operation unit 4. This process starts by obtaining from the outside data to be coded (i.e., object data being interpreted), attribute data, and code type data (showing data used for determining whether the information code 100 (frame QR (or frame QR code)) according to the present invention is produced or a general two-dimensional code (e.g., a general QR code) is produced) (S1). In the present configuration, the controller 3 and the operation unit 4 functionally correspond to one example of a data acquisition section which acquires object data to be interpreted (i.e., data inputted from the outside). Besides this example, another example is that the controller 3 and the communication unit 7 may be configured functionally as a data acquisition section which acquires, as object data being interpreted, input data from the outside via communication After acquisition of the object data at S1, a method for compressing the acquired object data is decided from known methods (S2). Data (i.e., object data to be interpreted, which are inputted data which have been compressed, are then expressed as a plurality of data wards (data code words) (S3). It is then determined whether or not the code type data acquired at S1 is the type of the information code 100 with the free space 110 (frame QR) (S4). If the code type data acquired at S1 is the type of the information code 100 (frame QR) with the free space 110, the processing proceeds to a step S5 from Yes from S4. At step S5, header data inherently used by the type of information code 100 with the free space 110 (frame QR) is produced as described, and set at the head of data arrangement including a plurality of code words as shown in FIG. 3. Therefore, in the header data of FIG. 3, information (such as information of a version number) which is capable of specifying the type (version and format) of the other type of code 120 is recorded. Meanwhile, when the code type data acquired S1 does not show the type of the information code 100 with the free space 110 (frame QR), that is, the code type data are data indicating a known two-dimensional code assigned to, for example, the model 1 or the model 2, the processing proceeds along No from step S4.

In the case of No at step S4, error correction codes are produced by applying a known method to the data words (data code words) produced at S3, so that a plurality of error correction words (error correction code words) expressing error correction codes are produced (S6). When the processing has proceeded via steps S4 and S5, the configuration of the data words (i.e., plural data code words expressing the header data and the input data) produced at S3 and S5 is subjected to a known method to produce error correction codes, and a plurality of error correction words (error correction code words) expressing the error correction codes are produced (S6).

After step S6, it is again determined whether or not the code type data acquired at S1 is the type of the information code 100 with the free space 110 (frame QR) (S7). If the code type data does not show such information code 100, the processing proceeds to S8 from No at S7. In this case, the version of a two-dimensional code whose size is sufficient for storing both the data words (data code words) produced at S3 and the error correction codes (error correction code words) produced at S6 is decided. The version decided at this step should be a version selected among standardized plural versions of known QR codes and formed to have a storage size sufficient for the data words produced at S3 and the error correction words produced at S6. According to an arrangement pattern specified by the decided version, the data words produced at S3 and the error correction words produced at S6 are then arranged (or mapped) (S9).

On the other hand, when the code type data show the type of the information code 100 with the free space 110 (i.e., QR code), the processing proceeds S10 via Yes at S7. The version of a two-dimensional code (in the example shown in FIGS. 5 and 8, a QR code) is decided. This version should be a version providing a storage size sufficiently storing the data words (data code words) produced at S3 and S5 and the error correction words (error correction code words) produced at S6, and a free space. The free space may have a predetermined certain size or a size specified by a user's input or any other means at a stage provided before the step S10. The size of the free space may be designated by the numbers of lines and columns or may be given by data which is set to correspond to the number of words.

In the example shown in FIGS. 5 and 8, the version is decided among the plural versions (sizes) decided depending on the type of the information code 100. This version has a size capable of storing the data words (data code words) produced at S3 and S5, the error correction words (error correction code words) produced at S6, and the free space. By way of example, if there are a plurality of such versions which enable storage such data words and the free space, the system may select a version having the smallest storage size, or alternatively, the system may allow a user to designate any one version among the candidate versions.

In producing the information code 100, the specified size (the number of lines and the number of columns), arrangement of specification patterns, and candidate positions for the code words, which are decided by the version, are used. A practical code-word arrangement order of the code words is decided according to the foregoing arrangement conversion table. In the following, an example is explained in detail, in which the version showing the right figure in FIG. 5 is decided through the process at step S10.

At step S11 following S10, the data words (data code words) produced at S3 and S5 and the error correction words (error correction code words) produced at S6 are arranged in accordance with the foregoing arrangement position information (i.e., the arrangement conversion table). This arrangement conversion table is stored in the storage 5 of the information code producing apparatus 2 and set such that arrangement positions (arrangement positions of code words having an arrangement order) specified by the other type of code 120 correspond respectively to predetermined candidate positions (arrangement candidate positions of the respective code words) in the information code 100. At step S11, the arrangement positions of the code words to be recorded (i.e., the data words produced at S3 and S5 and the error correction words produced at S6) are specified as arrangement positions of respective code words having an arrangement order and being expressed in the other type of code 120 shown in FIG. 4 and the left figure in FIG. 5. This other type of code 120 is a two-dimensional code having a size smaller in area than the information code 100 but sufficient for storing the data wards produced at S3 and S5 and the error correction words produced at S6. After specifying the arrangement positions, those code words are arranged or mapped at the respective arrangement candidate positions in the information code 100, which positions are made by the arrangement position information (the arrangement conversion table) to correspond to the respective code words having the arrangement order.

For example, in the arrangement position information (the arrangement conversion table shown in FIG. 5, the arrangement position of the first code word in the other type of code 120 and the first arrangement candidate position of the information code 100 are made to correspond to each other. Hence, the first code word among all the code words (i.e., the data words produced at S3 and S5 and the error correction words produced at S6) is arranged at the first arrangement candidate position in the information code 100. Similarly, the arrangement position of the second code word in the other type of code 120 and the second arrangement candidate position in the information code 100 are made to correspond to each other, whereby the second code word is arranged at the second arrangement candidate position in the information code 100. The arrangement position of the N-th code word in the other type of code 120 is made to correspond to the M-th arrangement candidate position of the information code 100. Accordingly, the N-th code word is arranged at the M-th arrangement candidate position in the information code 100.

In a case where only code words composed of the data words produced at S3 and S5 and the error correction words produced at S6 are arranged, the other type of code 120 (a known QR code) whose size is smaller than that of the information code 100 can still afford the expression of such code words. However, when storing the data words produced at S3 and S5, the error correction words produced at S6, and the free space 110, the information code 100 is necessary which has a larger size. Hence, in the present embodiment, he data words produced at S3 and S5, the error correction words produced at S6, and the free space 110 are expressed by the information code 100, in which arrangement positions of the data words produced at S3 and S6 and the error correction words produced at S6 are decided between the arrangement positions of code words in the other type or code 120 (a known QR code) and those in the information code 100 using the arrangement conversion table.

In the present configuration, the arrangement conversion table shown in FIG. 5 exemplifies arrangement position information used to specify arrangement positions in the code area, at which plural data words expressing object data being interpreted are arranged the arrangement positions. This arrangement conversion table (i.e., the arrangement position information) is configured to provide correspondence information between the order of plural data words expressing object data to be interpreted and arrangement positions of data words to be arranged in the order in the code area. The storage 5 exemplifies an arrangement position information storage in which data of the arrangement conversion table (arrangement position information) are recorded.

After steps S9 or S11, a mask pattern which should be applied to the code words of which arrangement positions are decided at S9 or S11 is designated by a known predetermined method (e.g., a known method used by the QR code) and the designated mask pattern is applied to the code words (S12). Hence the mask pattern is reflected in the code words of which arrangement positions are decided at S9 or S11. Based on information (mask number) showing the mask pattern which has been set step S12 and information showing the error correction level, check digits are calculated, and format information including the error correction level, the mask number, and the check digits is produced (S13).

When the code type data acquired at S1 shows the information code 100 with the free space 110 (i.e., the frame QR), the process proceeds along a route Yes at step S14. Hence, a masking process is performed so that the foregoing designated mask (a mask for the frame QR) is reflected in the format information produced at S13 (refer to FIG. 6) (S16). Meanwhile when the code type data acquired at S1 does not show the information code 100 with the free space 110 (i.e., the frame QR), the process proceeds along a route No at step S14. In this case, a mask (e.g., a mask for the model 1 or 2), whose mask pattern is different from the mask pattern set S16, is set and applied to the format information (S15). After masking the format information at S15 or S16, the masked format information is arranged at the predetermined positions in the code area (for example, the predetermined positions 105 of the information code 100 as shown in FIG. 5) (S17).

Figure 9:
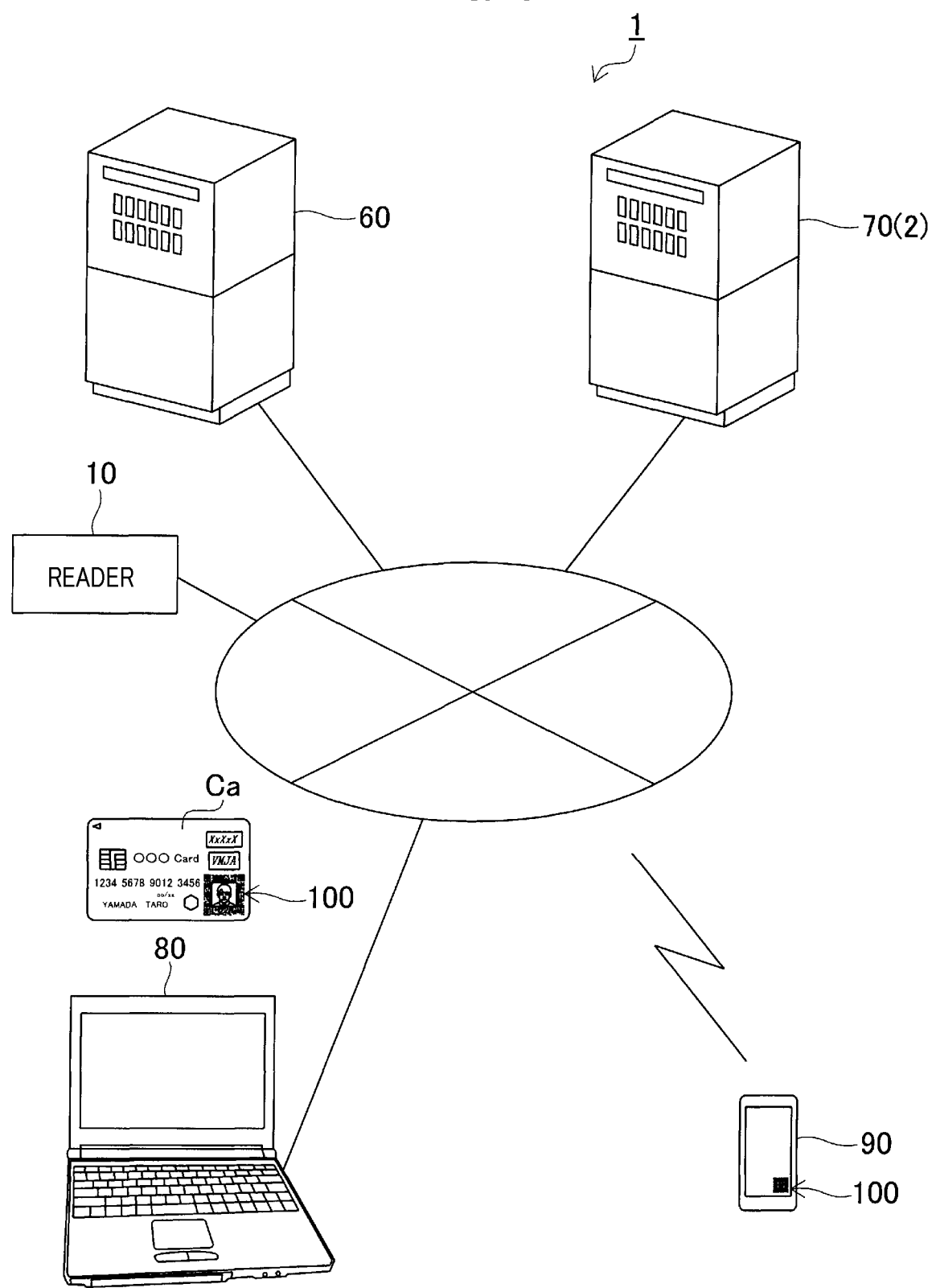
FIG. 9 is an illustration explaining a more specific configuration of the system according to the first embodiment.

After configuring the specification pattern regions, the data recording region, and the error correcting region, the components of the free space 110 (i.e., the image region) are arranged (S18). In the example shown in FIGS. 3, 5 and others, the outer edge of the free space 110 (i.e., the image region) are previously defined as a quadrangle. Hence, at step S18, the free space 110 (i.e., the image region) is set such that the upper-left and lower-right positions of the outer edge of the free space are located at positions designated by the header data. An image (i.e., an image inherent to a user, which will described later) is also arranged to be located within a space designated by the header data The foregoing production of the information code 100 or another two-dimensional code, the code is printed by the printing unit 8 (S19). At step S19, instead of the printing, the information code may be displayed by the display unit 6. By way of example, the data of the information code 100 produced through the steps up to step S18 may be transmitted to an external devices (such as a mobile phone or an external computer). Alternatively, an application with an information code 100 produced as shown in FIG. 9 can be downloaded so that the information code can be used as an icon.

Figure 4:
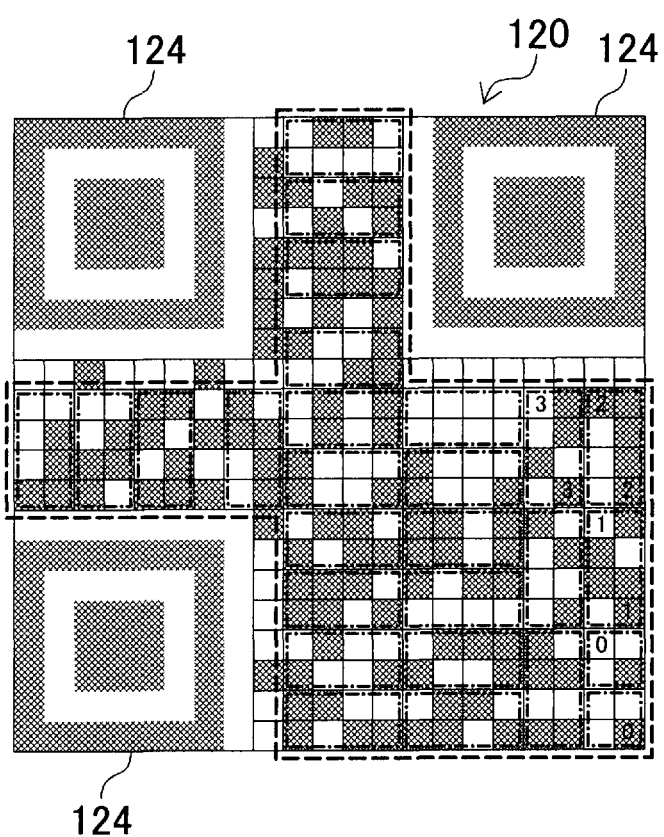
FIG. 4 is an illustration explaining another type of code corresponding to the information code used in the system shown in FIG. 1.

In FIGS. 4 and 5, the other type of code 120 has, at its three corners, position detecting patterns 124 functionally corresponding to the position detecting patterns 104 of the information code 100 and being produced automatically.

(Outline of Operation Example)

Hereinafter is described an operation example that uses the information code 100 prepared in this way.

The present system 1 functions as an administrative system that produces the information code 100 and administers the information code 100 as an object to be administered. The system 1 thus includes a check server 60, an administrative server 70, and the like, in addition to the producing apparatus 2 and the reader 10 explained referring to FIG. 1. Further, the system 1 is ensured to have access such as to a computer 80 or a mobile terminal 90 as an external unit, and is ensured to acquire the information inputted from the computer 80 or the mobile terminal 90 through the check server or the administrative server 70. Through such a system configuration, use of the information code 100 described above (i.e. the information code configured by being provided, in the code area, with the specification pattern regions where specification patterns of predetermined shapes are arranged, the data recording regions where data are recorded with various types of cells 102, and the free space 110 (image region) that is configured as a region for showing an image different from the image in cells and is configured with a size larger than that of a single cell).

The following is a description on hardware configuration, such as the check server 60, the administrative server 70, the computer 80 and the mobile terminal 90.

The check server 60 is a server that performs, for example, various checks in registering an information code, and has a function, for example, of matching an image in an image region of the produced information code 100 with a unique image that is a source of the image in the image region. The check server may have a function of checking whether or not a new unique image to be registered is analogous to a readily registered unique image that has already been registered. The check server 60 is configured, for example, as an information processer, such as a personal computer, and includes: a controller 61 configured such as by a CPU; an operation unit 62 configured by a keyboard, mouse and other input devices; a storage 63 configured by storage devices, such as a ROM, RAM, hard disk drive, and nonvolatile memory; a display unit 64 configured such as by a known display unit (liquid crystal display, or other display devices); and a communication unit 65 that functions as a communication interface for performing wire communication or wireless communication with an external unit. The check server 60 may be configured as a single information processor or may be configured by a plurality of information processors.

The administrative server 70 is a server that administers registered information and has a function of registering personal information (subjective or objective personal information) and a unique image (subjective or objective unique image) provided by a user, with the personal information and the unique image being correlated to each other. The administrative server 70 is configured by the information code producing apparatus 2 described above, and includes the controller 3, the operation unit 4, the storage 5, the display unit 6, the communication unit 7 and the printer 8 (omitted in FIG. 10) described above. The administrative server 70 may also be configured as a single information processor or may be configured by a plurality of information processors. Further, the check server 60 and the administrative server 70 may be realized by a single information processor.

The computer 80 or the mobile terminal 90 is a device which can be used, for example, by a person or a corporate body who desires to make a registration. The computer 80 is configured as an information processor, such as a personal computer, and includes: a controller 81 configured such as by a CPU; an operation unit 82 configured by a keyboard, mouse and other input devices; a storage 83 configured by storage devices, such as a ROM, RAM, hard disk drive, and nonvolatile memory; a display unit 84 configured such as by a known display unit (liquid crystal display, or other display devices); and a communication unit 85 that functions as a communication interface for performing wire communication or wireless communication with an external unit. The mobile terminal 90 is configured by a mobile phone or a smartphone, or other mobile-type information processors, and includes: a controller 91 configured such as by a CPU; an operation unit 92 configured by operation buttons, a touch panel, and other input devices; a storage 93 configured by storage devices, such as a ROM, RAM and nonvolatile memory; a display unit 94 configured such as by a known display unit (liquid crystal display, or other display devices); and a communication unit 95 that functions as a communication interface for performing wire communication or wireless communication with an external unit.

(Registration Process)

The following is a description on a registration process for an information code in the operation example.

Figure 11:
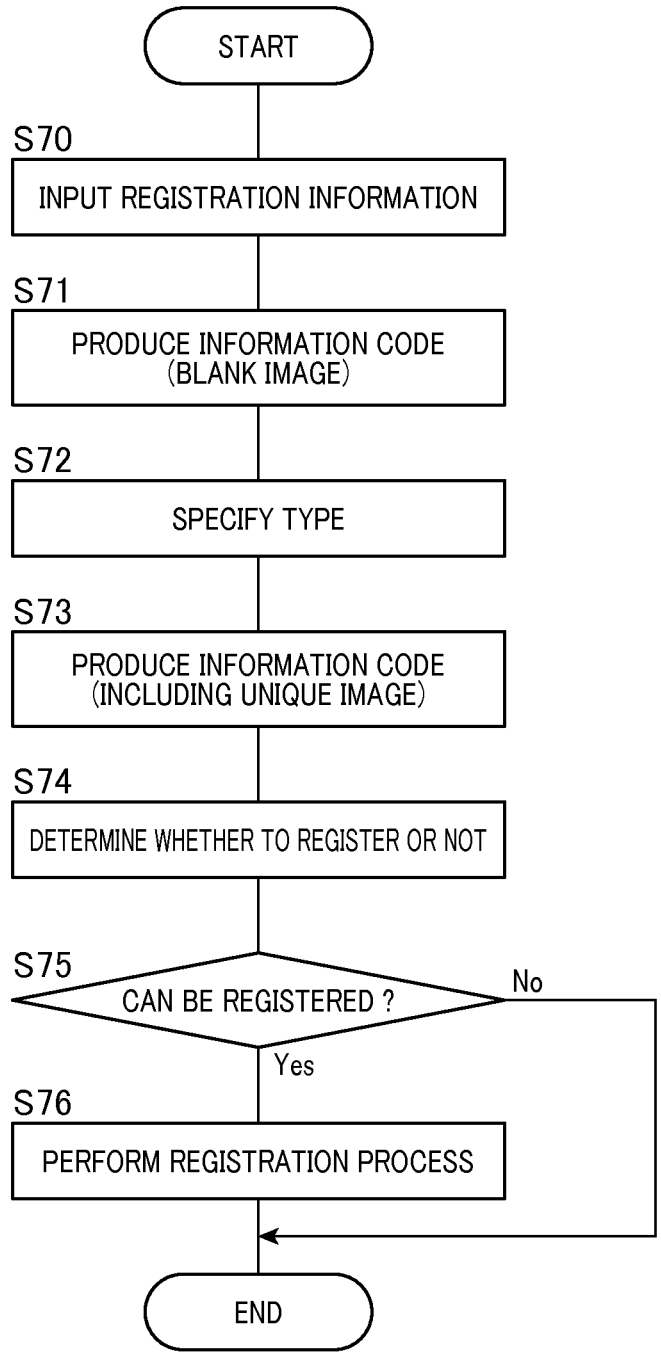
FIG. 11 is a flowchart exemplifying a flow of registration process performed by an administrative server in the system of FIG. 9.

It should be noted that the registration process is performed when a predetermined operation is performed in the administrative server 70. For example, when a predetermined operation for personal registration process is performed, a registration program for personal registration is ensured to be executed, and when a predetermined operation for corporative registration is performed, a registration program for corporative registration is ensured to be executed. The registration program for personal registration and the registration program for corporative registration have a basic flow as shown in FIG. 11, with only a partial difference in a specific processing. Accordingly, both of the registration processes are described referring to FIG. 11.

First, a registration process for an information code allocated to a person is described. When a predetermined operation for personal registration is performed in the administrative server 70, a registration program for personal registration is executed. In the registration process, an input process for registration information is performed (S70). In inputting the registration information, a person to be registered records personal information on a personal information registration sheet in which items shown in FIG. 12, for example, are described, and submits the sheet to the subject (commercial entity, public office, etc.) which administers/operates the administrative server 70. In submitting such a personal information registration sheet, an original or a copy of a personal identification medium, such as a driver's license or a Basic Resident Register card, which can identify the person is also submitted. Further, together with such a personal information registration sheet, the person to be registered also submits a photograph of the face of the person in the form of a paper medium or electronic data. Submission of the photograph of the face may be replaced by submission of an original or a copy of a personal identification medium, such as a driver's license or a Basic Resident Register card, or the photograph of the face may be submitted separately from the submission of a personal identification medium. Further, such a sheet and the photograph of the face may be submitted through a service window of the subject that administers the server 70, or may be submitted through a postal mail, or may be submitted online, such as mail transmission or data transmission to a specific address. When submitted through a service window, the photograph of the face of the person to be registered may be taken by a camera provided at the service window, and the electronic data of the photograph of the face may be acquired. In this case, the electronic data of the photograph of the face may be transmitted to the administrative server 70 from the camera.

Thus, when a personal information registration sheet and the photograph of the face are submitted to the administrator subject side from a person to be registered, a worker, such as an employee, of the administrator subject side, for example, operates the operation unit 4 to input the information recorded on the submitted personal information registration sheet as personal information of the person to be registered and to thereby store the personal information in the storage 5 of the administrative server 70. Further, the submitted photograph of the face or data of the photograph of the face, or the photograph of the face taken at the service window is inputted as electronic data. For example, when the photograph of the face of a person to be registered is taken at the service window, the electronic data of the photograph of the face is stored, being correlated to the personal information mentioned above. Further, when the photograph of the face of a person to be registered is submitted through postal mail or the like, the photograph of the face is imaged such as by a known scanner and stored as electronic data of the photograph of the face, being correlated to the personal information. Thus, as shown in FIG. 13(A), the personal information of a person to be registered and a registration image (electronic data of the photograph of the face) of the person to be registered are obtained and temporarily stored in the storage 5 of the administrative server 70.

In the example provided above, a person to be registered fills out a personal information registration sheet as shown in FIG. 12 and submits the sheet to provide the personal information to the administrator subject side. However, the personal information may be inputted online via the computer 80, the mobile terminal 90 or the like. In this case, the person to be registered can operate the computer 80 or the mobile terminal 90 to input the pieces of information as shown in FIG. 12 and transmit these pieces of information to the administrative server 70. Further, together with the transmission of such personal information, the electronic data of the photograph of the face of the person to be registered can be transmitted as electronic data in a predetermined image file format.

In the present configuration, the controller 3 and the operation unit 4 of the administrative server 70, or the controller 3 and the communication unit 7 correspond to an example of the specific information acquisition section. The specific information acquisition section functions so as to acquire personal specific information of a person (personal information unique to the person), that is a subject, as information to be recorded in a data recording region, or as information to be correlated to the information to be recorded in the data recording region. Further, the controller 3 and the operation unit 4 of the administrative server 70, or the controller 3 and the communication unit 7 correspond to an example of the unique image acquisition section. The unique image acquisition section functions so as to acquire an image unique to a person (specifically, an image of the photograph of the face of the person), that is a subject, as information to be indicated in an image region of the information code 100. Further, the controller 3 and the operation unit 4 of the administrative server 70, or the controller 3 and the communication unit 7 correspond to an example of the registration information input section. The registration information input section functions so as to receive input information and an image of predetermined input items (the input items shown such as in FIG. 12, or the input items shown such as in FIG. 16).

Further, when data of personal information of a person to be registered (specific information) and data of the photograph of the face (photograph of the face as a unique image) are inputted in this way, the administrative server 70 allocates a code number corresponding to these data. For example, as conceptually shown in FIG. 13(B), personal information of the person to be registered (specific information) and the registration image (photograph of the face as a unique image) are connected to a code number and temporally stored. Thus, the personal information and the registration image can be grasped as being allocated with a unique code number. The code number corresponds to the correspondence information which is registered in a registration section, being correlated to personal information. For example, the code number is a unique number individually allocated to each information code. For example, the code number is allocated such that information codes are numbered in the order of registration.

Figure 14:
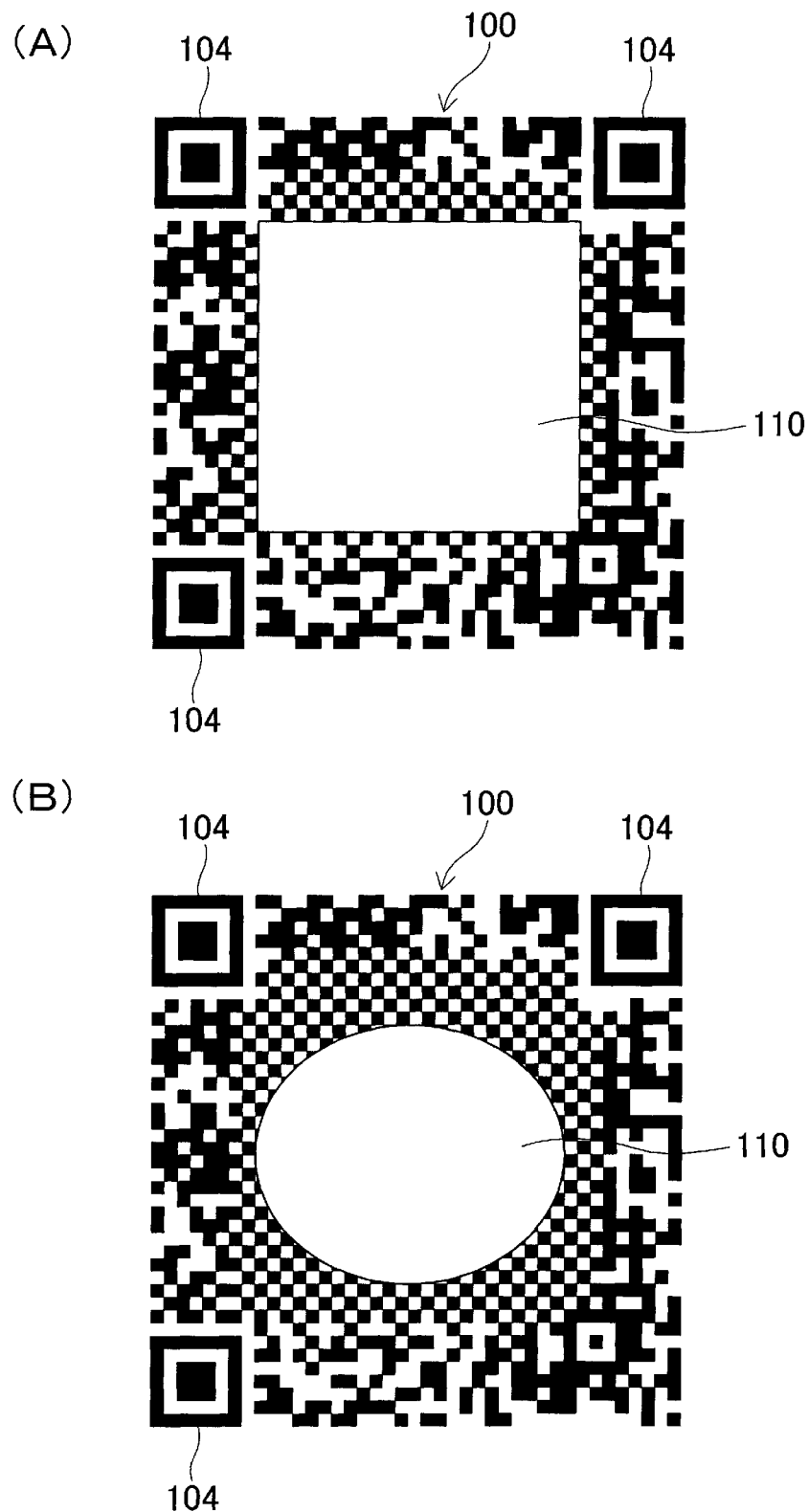
FIG. 14(A) is an illustration showing a configuration example of an information code that is a candidate to be produced.
FIG. 14(B) is an illustration explaining a configuration example different from the one shown in FIG. 14(A)

After the input of the registration information in this way, an information code 100 is produced so that at least a part of the inputted personal information (specific information), or a code number allocated to the personal information, or both of the personal information and the code number are recorded in the data recording region (S71). Herein, the information code 100 having the free space 110 is produced through, for example, the producing process (FIG. 8) described above. However, in the information code 100 produced herein, the free space 110 is blanked as shown in FIG. 14. Further, in the present configuration, for example, models of the free space 110 of a plurality types having different configurations are prepared. Thus, at S71, the information codes 100 of the respective models are produced on the basis of the information inputted at S70. For example, FIG. 14(A) shows an example of the information code 100 produced as a model in which the free space 110 is configured into a square shape at a predetermined position. FIG. 14(B) shows an example of the information code 100 produced as a model in which the free space 110 is configured into a laterally oblong elliptic shape at a predetermined position. In the present configuration, an array of code words is preset for each model. If a model can be specified by reading the model from the preset position in the code area, the array of the code words is ensured to be specified. Further, since the position information of the free space is ensured to be recorded in the data recording region, reading of the data recording region is ensured to specify the position of the free space.

Then, it is specified which is used from among information codes of a plurality of models generated at S71. There are various specifying methods. For example, the information codes of the plurality of models produced at S71 are displayed on the display unit 6, followed by selecting an information code to b used. In this case, information for specifying an information code to be used is inputted from the operation unit 4 to thereby select an information code to be used. Specifically, in a method that can be used, it is ensured that a person to be registered can specify a desired shape of the free space in the input sheet as shown in FIG. 12, and a worker operates the operation unit 4 to select a model of the desired shape. Further, seeing the information codes of the plurality of models produced at S71, a worker may specify a model of a free space, e.g. FIGS. 14(A) and 14(B), suitable for a photograph to be incorporated. Whichever of the methods may be used, an information code of a specified model is selected at S72.

When data to be decoded (personal information, a code number, etc.) is recorded in the data recording region of the information code 100, the data may all be encrypted before being recorded, or the data to be decoded may be partially encrypted while the rest may be recorded without being encrypted. Alternatively, all may be recorded without being encrypted. As a method of partial encryption, mention may be made of a method in which the information, such as name and address, among provided data as shown in FIG. 12 is published without being encrypted, while data related to a credit number and a place of work (name, postal code, address, telephone, email address, company member number, and the like of a place of work) is encrypted and not published. Thus, when at least a part is encrypted for recordation in the data recording region, an encryption key used for encryption in the administrative server 70 is recorded the normal reader 10. Then, in the reader 10, on the other hand, the encryption key (decoding key) can be used to decode the code in the data recording region on the basis of a predetermined decoding algorithm (decoding algorithm for decoding the code that has been encrypted with an encryption algorithm used for encryption in the administrative server 70).

After specifying a type at S72, the information code 100 of the specified type is reproduced (S73). In reproducing the information code 100, the unique image acquired at S70 is displayed inside the free space 110 that has been blank in the information code 100. For example, when the information code of FIG. 14(A) is selected from among the two types of information codes of FIGS. 14(A) and (B), the information code 100 is produced in the form of indicating the unique image acquired at S70 (photograph of the face of the person to be registered) in the free space 110 of the information code 100 of FIG. 14(A). FIG. 15(A) shows an example of the information code 100 reproduced in this way.

In the present configuration, the administrative server 70 has a function as an information producing section. That is, the administrative server 70 has a function of producing the information code 100 with a configuration of recording in the data recording region at least either the specific information acquired by the specific information acquisition section, or a code number (correspondence information) registered in the registration section, being correlated to the specific information, and indicating the unique image acquired by the unique image acquisition section in the free space 110 (image region). Specifically, the administrative server 70 has a function of using at least a part of the input items received by the registration information input section, by means of a predetermined using method (e.g., a using method of directly recording a part of the input items, or a using method of recording the correspondence information (code numbers) allocated to the data of the input items) to produce the data recording region, and of putting all or a part of the images received by the registration information input section into the image region to produce information codes. More specifically, the administrative server 70 is configured to produce the information code 100 through a configuration of recording code data in the data recording region, the code data being the specific information, at least a part of which is encrypted, acquired by the specific information acquisition section.

Then, it is determined whether to register the information code produced at S74. The determination herein is made using a known face authentication method of matching face images, by comparing the unique image of the driver's license or the Basic Resident Register obtained at S70 by the check server 60, with the facial image of the person to be registered acquired by the administrative server 70 and placed in the free space 110 of the information code 100 produced at S73. The method of determining match between two facial images may be any of known face authentication methods. For example, the following method may be used.

Specifically, feature points are extracted, by means of a predetermined method, from each of two images (the unique image (original image) of the driver's license or the Basic Resident Register acquired by the administrative server 70 at S70 and the face image in the free space 110 of the information code 100 produced at S73). Then, it is determined whether or not the feature points of both of the images match. In the example shown in FIG. 15, the extracted feature points are, for example, the coordinates of the inner and outer corners in the contours of the right and left eyes, the coordinates of the center points of the right and left eyes' pupils, the right and left ends in the contour of the nose, and the coordinates of the right and left ends in the contour of the mouth. It should be noted that various methods known in the art of face authentication may be used as the method of automatically extracting the coordinates of these feature points from a picked-up image of a face. By way of example, the method of JP-B-4640416, JP-G-4730812 or JP-B-4351982 may be used. Further, a worker may specify the positions of the above feature points while seeing the picked-up images of the faces. Such extraction of feature points is carried out in respect of the unique image obtained at S70 and the face image in the information code 100 produced at S73 to determine whether or not there is a match in the feature points between the data. It should be noted that various methods known in the art of face authentication or fingerprint authentication may be used as the method of determining match between two face images by comparing feature points obtained from the images. By way of example, the method of JP-B-4640416, JP-B-4730812 or JP-B-4351982 may be used.

In the determination process at S74, if it is determined that there is no match between the unique image obtained at S70 (face image of the person to be registered in the driver's license or the Basic Resident Register acquired by the administrative server 70) and the face image in the information code 100 produced at S73, control proceeds to No at S75 to terminate the registration process shown in FIG. 11. In this case, no registration is made. On the other hand, if it is determined that there is a match, control proceeds to Yes at S75 to correlate the information code produced at S73 to the personal information (specific information) acquired at S70 and the code number allocated to the personal information, and store the information code 100 in the storage 5 for registration (S76). Through the registration process, the personal information (registration information of the person) and the information code 100 are registered, being connected by the code number. Such registration is carried out for each piece of personal information of a person to thereby register the information code 100 unique to each person, as shown in FIG. 13(C).

In the example described above, a code number has been exemplified as the correspondence information to be allocated. However, the example should not be construed as imposing a limitation. For example, the correspondence information may be a social security number or a company member number, or a number that is a combination of a country number and a social security number. Further, the information code 100 that can be registered per person is not limited to one, but a plurality of information codes 100 may be registered. For example, an information code 100 with a change of the image may be registered.

In the present configuration, the controller 3 and the storage 5 of the administrative server 70 correspond to an example of the registration section which has a function of registering specific information acquired by the specific information acquisition section, being correlated to a unique image acquired by the unique image acquisition section. The registration section also has a function of registering an information code. Specifically, the registration section has a function of registering specific information acquired by the specific information acquisition section, being correlated to the information code 100 which has been produced by the administrative server 70 (information code producing section) and is configured through the recordation of the specific information or the corresponding information correlated to the specific information in a data recording region.

(Corporative Registration)

Hereinafter is described a registration process for the information code 100 allocated to a corporate body. When a predetermined operation is performed for corporative registration in the administrative server 70, a registration program for corporative registration is executed. Since this registration process has the same flow as the one shown in FIG. 11, the following description is provided referring to FIG. 11.

First, registration information is inputted (S70). In inputting the registration information, a related person (e.g., an employee) of the corporate body as an object to be registered fills out a corporate information registration sheet in which, for example, items as shown in FIG. 16 are described, and submits the sheet to a subject (commercial entity, public office, etc.) which administers/operates the administrative server 70. In submitting such a corporate information registration sheet, a picture of a photograph of a unique image desired to be registered is also submitted through a paper medium, electronic data, or the like. In this case as well, such a sheet and an image may be submitted to the service window of the subject that administers the server 70, or may be sent via postal mail, or may be transmitted online through email transmission or data transmission to a specific address.

An image submitted in the case of corporative registration includes the corporate body or an emblem indicating the products or services provided by the corporate body (e.g., registered trademark or the like of the corporate body) as shown in the free space 110 of FIG. 14(A), an image of real property possessed by the corporate body as shown in the free space 110 of FIG. 21(A), and an image of a product treated by the corporate body as shown in the free space 110 of FIG. 21(B).

When a corporate information registration sheet and a unique image are submitted to an administrator subject side from a related person of a corporate body as an object to be registered, a worker, such as an employee, of the administrator subject side, for example, operates the operation unit 4 to input the information recorded on the submitted corporate information registration sheet as corporate information of the corporate body to be registered and to thereby store the corporate information in the storage 5 of the administrative server 70. Further, the data of the submitted image is inputted as electronic data. For example, when the photograph such as of an emblem, a building or a product of the corporate body to be registered is submitted via postal mail, the photograph of the face is imaged such as by a known scanner and stored as electronic data, being correlated to the corporate information. Thus, similar to FIG. 13(A), the corporate information of a corporate body to be registered and a registration image (electronic data such as of the emblem, building or product) of the corporate body to be registered are obtained and temporarily stored in the storage 5 of the administrative server 70.

In the example provided above, a corporate body to be registered fills out a corporate information registration sheet as shown in FIG. 16 and submits the sheet to provide the corporate information to the administrator subject side. However, the corporate information may be inputted online via the computer 80, the mobile terminal 90 or the like. In this case, the corporate body to be registered can operate the computer 80 or the mobile terminal 90 to input the pieces of information as shown in FIG. 16 and transmit these pieces of information to the administrative server 70. Further, together with the transmission of such corporate information, the electronic data of the image such as of the emblem (e.g., trademark), building or product of the corporate body to be registered can be transmitted as electronic data in a predetermined image file format.

In this case as well, the controller 3 and the operation unit 4 of the administrative server 70, or the controller 3 and the communication unit 7 correspond to an example of the specific information acquisition section. The specific information acquisition section functions so as to acquire specific information of a corporate body (corporate information unique to the corporate), that is a subject, as information to be recorded in a data recording region, or as information to be correlated to the information to be recorded in the data recording region. Further, the controller 3 and the operation unit 4 of the administrative server 70, or the controller 3 and the communication unit 7 correspond to an example of the unique image acquisition section. The unique image acquisition section functions so as to acquire a unique image that specifies a subject or a corporate body (specifically, an image of the emblem (e.g., trademark) that specifies the corporate body to be registered (subject) or the product treated by the corporate body (object), the building of the corporate body to be registered, or the product treated by the corporate body to be registered) as information to be indicated in an image region of the information code 100.

Further, when data of corporate information of a corporate body to be registered (specific information) and data of a unique image are inputted in this way, the administrative server 70 allocates a code number corresponding to these data. Specifically, similar to FIG. 13(B), corporate information of the corporate body to be registered (specific information) and the registration image (such as of an emblem (trademark, etc.), building or products of the corporate body to be registered) are connected to a code number and temporally stored. Thus, the corporate information and the registration image can be grasped as being allocated with a unique code number.

After the input of the registration information in this way, an information code 100 is produced so that at least a part of the inputted corporate information (specific information), or a code number allocated to the corporate information, or both of the corporate information and the code number are recorded in the data recording region (S71). Herein as well, the information code 100 having the free space 110 is produced through, for example, the producing process (FIG. 8) described above. In the case of a corporate body as well, the information codes 100 of the respective models are, produced on the basis of the information inputted at S70.

Then, it is specified which information code should be used from among the information codes of the plurality of models produced at S71 (S72). In the method of specification, which is similar to the case of personal registration, the information code of a specified model is selected.

In the case of corporative registration as well, when data to be decoded (corporate information, a code number, etc.) is recorded in the data recording region of the information code 100, the data may all be encrypted before being recorded, or the data to be decoded may be partially encrypted while the rest may be recorded without being encrypted. Alternatively, all may be recorded without being encrypted. As a method of partial encryption, mention may be made of a method in which the information, such as corporate name and address, among provided data as shown in FIG. 16 is published without being encrypted, while data related to a credit number and data related to a profit (e.g. amount of sales, operating income and ordinary income) is encrypted and not published.

After specifying a type at S72, the information code 100 of the specified type is reproduced (S73). In reproducing the information code 100, the unique image acquired at S70 is displayed inside the free space 110 that has been blank in the information code 100. For example, when the information code of FIG. 14(B) is selected from among the two types of information codes of FIGS. 14(A) and (B), the information code 100 is produced in the form of indicating the unique image acquired at S70 (photograph of the face of the person to be registered) in the free space 110 of the information code 100 of FIG. 14(B). FIG. 17(A) shows an example of the information code 100 reproduced in this way.

Then, it is determined whether to register the information code produced at S74. The determination herein is made using a known image authentication method of matching images, by comparing the unique image (already registered unique image) of the information code already registered in the administrative server 70, with the unique image (newly registered unique image) of the free space 110 of the information code 100 produced at S73. The method of determining match between two images may be any of known image authentication methods. For example, the following method may be used.

Specifically, it is determined whether or not there is a match between the two images by comparing each unique image (already registered unique image) of the free space of the information code already registered in the administrative server 70, with the unique image (newly registered unique image) of the free space 110 of the information code 100 produced at S73. For example, the two images (the already registered unique image and the newly registered unique image) to be matched are subjected to a known edge extraction process to linearize the outer edges, followed by extracting endpoints and branch points, as feature points, by means of a method similar to a method used for fingerprint authentication (Minutiae method). FIG. 17(B) shows an example in which end points and branch points are extracted from a unique image Tr (trademark of a corporate body) shown in the information code of FIG. 17(A). After extracting the feature points in both of the images, it is determined whether or not there is a match in the feature points between both images. Various methods known in the art of fingerprint authentication may be used for the method of determining a match through a comparison between the feature points obtained from the two images. The method may be of JP-B-4640416, JP-B-4730812 or JP-B-4351982.

Then, if it is determined in the determination process of S74 that the unique image in the information code 100 produced at S73 is not analogous to any of the images of the already registered information codes, control proceeds to Yes at S75 to correlate the information code produced at S73 to the corporate information (specific information) acquired at S70 and the code number allocated to the corporate information, and store the information code 100 in the storage 5 for registration (S76). Through the registration process, the corporate information (registration information of the person) and the information code 100 are registered, being connected by the code number. Such registration is carried out for each piece of corporate information of a corporate body to thereby enable registration similar to the one shown in FIG. 13(C). On the other hand, if it is determined in the determination process of S74 that the unique image in the information code 100 produced at S73 is analogous to any of the images of the already registered information codes, control proceeds to No at S75 to terminate the registration process shown in FIG. 11. In this case, no registration is made.

In the present configuration, the check server 60 corresponds to an example of the determination section which has a function of determining whether or not a predetermined analogousness requirement (the analogousness requirement, in the above example, that there is a match between the feature points) is satisfied by a new unique image that is a unique image newly acquired by the unique image acquisition section at S70 and an already registered unique image that is a unique image registered in the registration section prior to the acquirement of the new unique image by the unique image acquisition section. Then, the controller 3 corresponding to the registration section carries out a function of removing, from the registered objects, the new unique image which has been determined to satisfy the predetermined analogousness requirement by the determination section together with the already registered unique image.

In the case of corporate registration, the determination as to whether or not a new unique image is analogous to an already registered unique image may be made using a known pattern matching. In other words, each unique image (already registered unique image) in the free space of an information code already registered in the administrative server 70 may be compared with a unique image (newly registered unique image) in the free space of the information code 100 produced at S73 by means of a known pattern matching method, for the determination as to whether or not there is a match between the two images.

Figure 18:
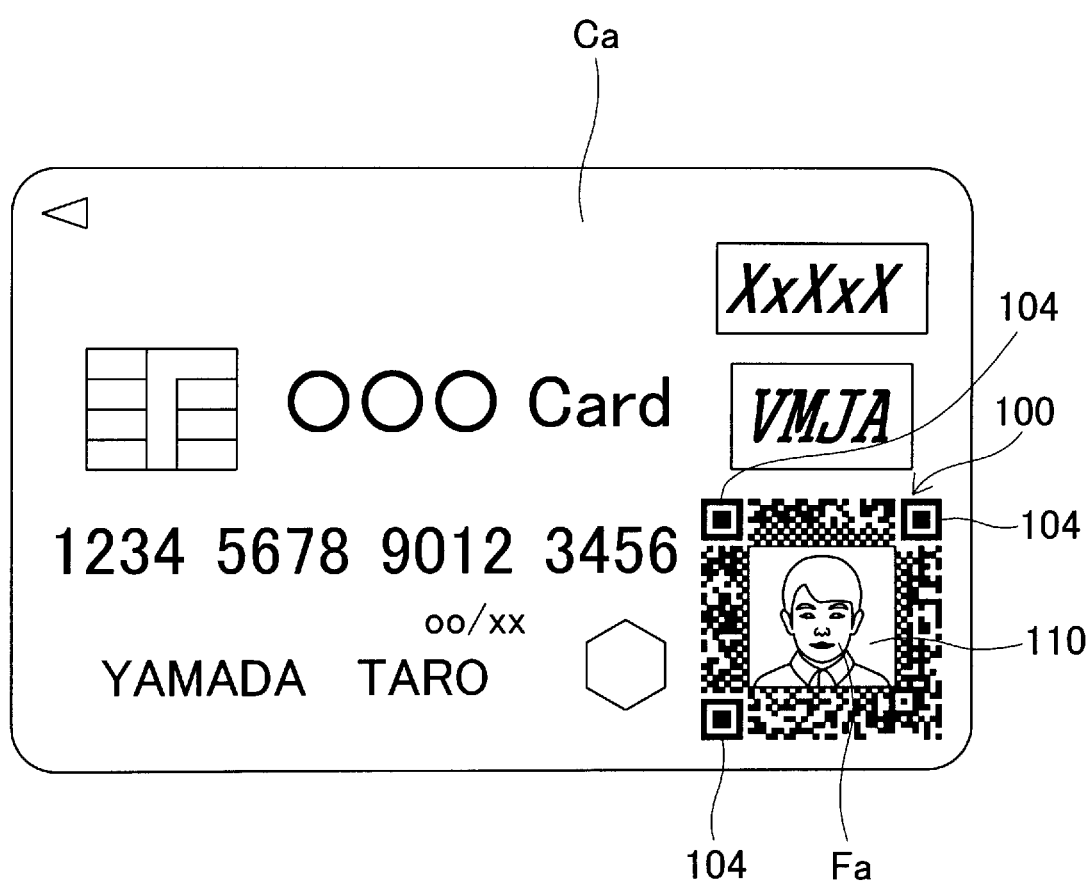
FIG. 18 is an illustration explaining a usage example of an information code of a registered person.
Figure 19:
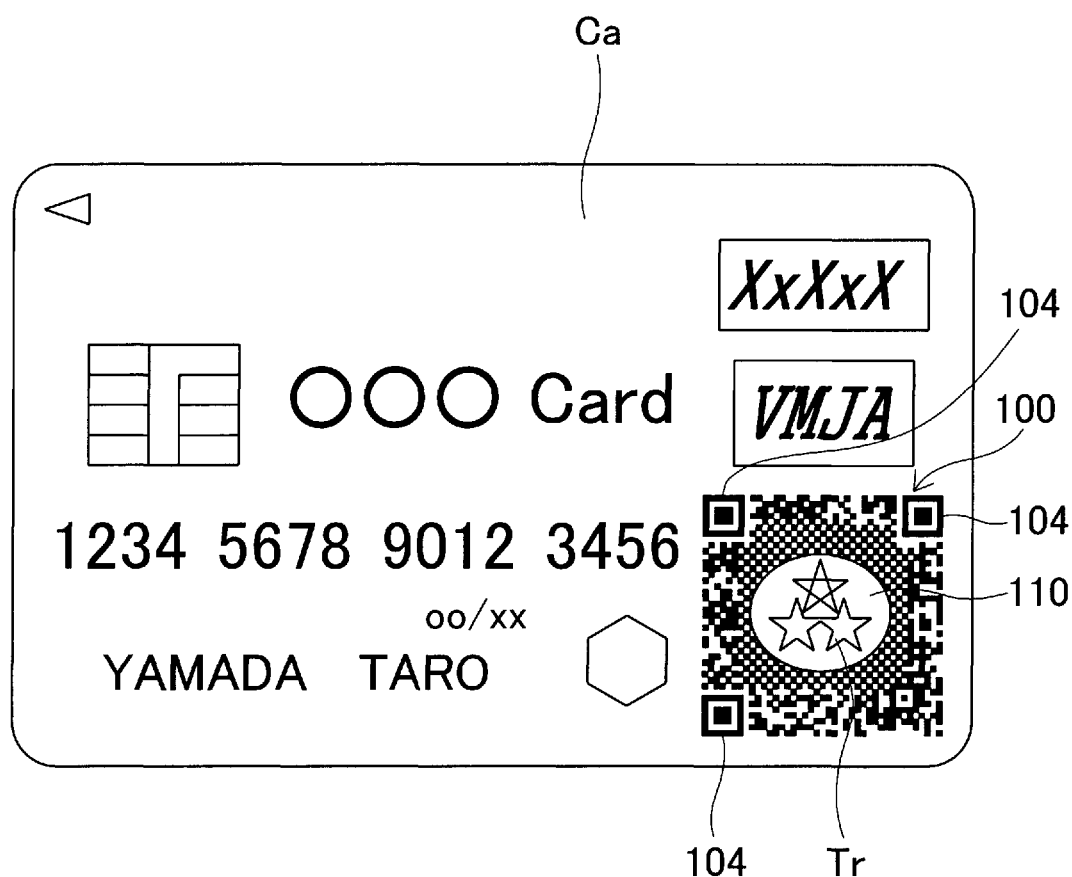
FIG. 19 is an illustration explaining a usage example of an information code of a registered corporate body.

The information code for a person (e.g., 15(A)) or the information code 100 for a corporate body (e.g., FIG. 17(A), 21(A) and 21(B)), which is registered as described above, may be used by being added to a payment medium Ca as shown in FIG. 18 or 19. FIG. 18 or 19 exemplifies a credit card as a payment medium, but the information code 100 may be added to and used with other known payment media, such as a debit card or an electronic money card. By being added to and used with the payment medium Ca, the information code 100 can be used as a means for estimating whether or not the payment medium Ca is illegally used. As necessary, the information code 100 is read to check the results of reading against the registration of the administrative server 70 so that the reliability of the information code 100 can be estimated. Accordingly, illegal use of the payment medium can be easily suppressed. Further, when the results of reading are used for client management, client information can be additionally collected to a management database without the necessity of manual input.

(Authentication Process for Information Code)

Figure 20:
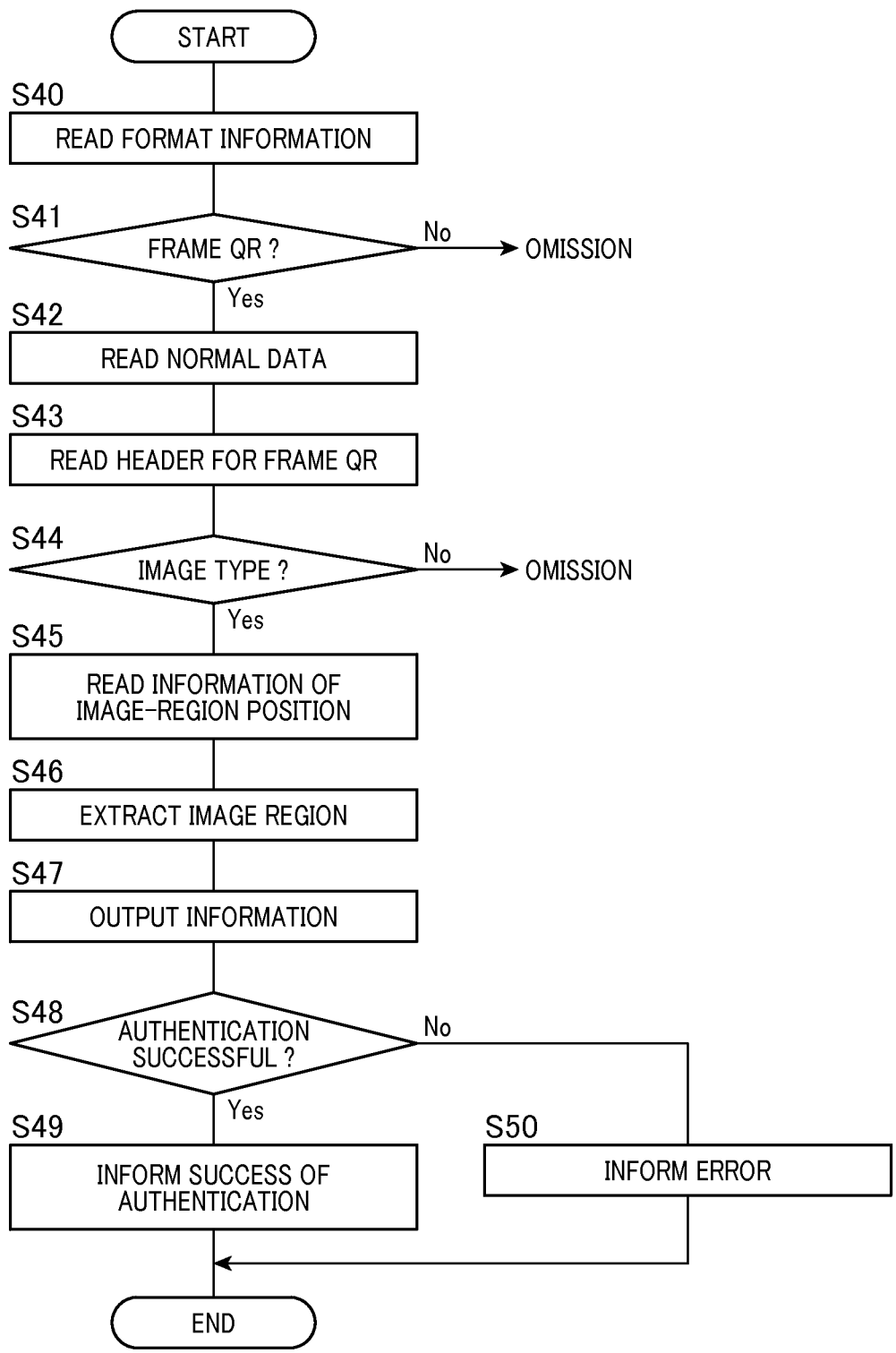
FIG. 20 is a flowchart exemplifying a flow of an authentication process for an information code performed by a reader.

The following is a description on an example in which the information code 100 used as shown in FIGS. 18 and 19 is read by the information code reader 10 shown such as in FIG. 2 to perform authentication. FIG. 20 shows a reading process which is executed when, for example, a predetermined operation (e.g., operation of the operation switch 42) is performed by a user. First, as shown in FIG. 20, at S40, a two-dimensional code in an imaging area of the light-receiving sensor 23 is imaged to acquire a picked-up image of the two-dimensional code, while the shape of the two-dimensional code is detected. Specifically, recognition of a position detecting pattern 104 and the contour of the two-dimensional code are attempted by means of a known method. For example, a known method of detecting a waveform of 1:1:3:1:1 performed in a QR code (registered trade mark) is used to detect the position detecting pattern 104, and the contour of the imaged two-dimensional code is detected by means of a known method used for a QR code (registered trade mark). In this case, when the information code 100 is imaged at S40, the contour of the information code 100 is detected. It should be noted that the processing method at S40 may be other methods as far as the method can detect the shape of a specific pattern or the contour of a two-dimensional code.

In the present configuration, the light-receiving sensor 23 corresponds to an example of the "imaging section" which carries out a function of imaging the information code 100 produced by the information code producing apparatus 2.

After S40, the information (format information) of the predestined positions 105 of the information code 100 are interpreted, followed by acquiring the type of the imaged information code and a mask correction level. Specifically, for example, the information recorded at the predestined positions 105 as mentioned above is subjected to cancellation of masking on the basis of a specific mask (mask for frame QR) to attempt interpretation. When the masking is cancelled by means of a method that can cancel the mask of the specific mask mentioned above, if there is a match in check digits (i.e. in the case where check digits calculated on the basis of the data of a correction level in interpreting the predestined positions 105 and the data of a mask number match the check digits recorded at the predestined positions 105), the information is specified to be the type of the information code 100 (the type as having the free space 110) and thus an error correction level and a mask number included in the format information can also be acquired. When masking can be cancelled on the basis of a specified mask in this way (i.e. when the information can be recognized as being a type (frame QR) of the information code 100), control proceeds to Yes at S41. On the other hand, when the masking is cancelled by a mask other than the specific mask (mask for frame QR), such as the mask for the model 1 or the mask for the model 2 shown in FIG. 6, control proceeds to No at S41. When the masking is cancelled by other masks, this corresponds to the case of the two-dimensional code imaged at S40 is a known QR code (registered trade mark), and thus, if control proceeds to No at S41, the QR code is interpreted by means of a known method to thereby output the results of the interpretation. In FIG. 9, the processing in the case where control proceeds to No at S41 is omitted.

When control proceeds to Yes at S41, data recorded in the data recording region is interpreted first (S42). Specifically, based on the mask number included in the format information acquired at S40, the mask of the entire code (specifically, the region of the code words) is cancelled. Then, based on the header data (header for frame QR) provided at the top of the data words, an original code size (model and form of other type of code 120) is specified. Then, according to an arrangement conversion table similar to FIG. 5, the arrangement of the information code 100 as shown in FIG. 5 on the right is restored to the arrangement of the original code (other type of code 120) shown in FIG. 5 on the left. Specifically, the code words (the data code words and the error correction code words) at individual arrangement candidate positions of the information code 100 are rearranged to the arrangement positions in the other type of code 120, which are correlated to the arrangement candidate positions in the arrangement conversion table. Through the arrangement conversion performed in this way, the other type of code 120 can be obtained in which the data code words and the error correction code words arranged in the information code 100 are recorded. Then, the data of the other type of code 120, which is a known QR code, is interpreted by means of a method similar to the one used for a known QR code (i.e. error correction calculation is performed using a known method on the basis of the error correction code words, while interpreting the data code words).

After interpreting the data in the data recording region at S42, type information included in the header data (header for frame QR) is read. Then, if the type information indicates an "image type", control proceeds to Yes at S44. If a different type is indicated, control proceeds to No at S44. In FIG. 9, the processing in the case where control proceeds to No at S44 is omitted.

If control proceeds to Yes at S44 (i.e. if the type information included in the header data (header for frame QR) indicates an "image type"), information of image-region position (position data) included in the header data is read (S45). Then, the position of the free space 110 (image region) in the information code 100 is specified. Then, an image of the free space 110 (mage region) specified in this way is cut out of an image of the entire code (S46). Then, information is output to thereby transmit the data interpreted at S42 (data in the data recording region) and the image cut out at S46 (image of the free space 110 (image region)) to the administrative server 70 (S47).

Then, on an administrative server 70 side that receives such output data, it is determined whether or not the data in the transmitted data recording region (e.g., code number, personal information and corporate information) are registered in the registration information as shown in FIG. 13(C). Then, when the data in the transmitted data recording region are not in the registration, the authentication is determined to be unsuccessful and the information accordingly is returned to the reader 10. In this case, in the reader 10, control proceeds to No at S48 to perform a predetermined error notification process (indication of an error message, generation of a buzzer sound, etc.). On the other hand, when the data in the transmitted data recording region are in the registration, it is determined whether or not there is a match between the image of the information code connected, in the registration section, to the data present therein and the image transmitted together with the data of the data recording region (the image in the free space 110 (image region)). The determination is made on the basis of any of the image authentication methods mentioned above (pattern matching, comparison between feature points, etc.). Then, when both of the data (data in the data recording region) and the image (image in the free space 110 (image region)) are correct (i.e. when the both are mutually connected and registered), the authentication is determined to be successful and the information accordingly is returned to the reader 10. In this case, in the reader 10, control proceeds to Yes at S48 to perform a notification process of successful authentication (indication of a message of successful authentication, generation of a predetermined speech sound, etc.)

The example described above exemplifies that the image in the free space 110 is cut out and transmitted to the administrative server 70. However, the image in the free space 110 may be analyzed and the analyzed data may be transmitted to the administrative server 70. For example, feature points may be extracted from the image in the free space 110 at S46 and the data of the feature points may be transmitted to the administrative server 70. In this case, the administrative server 70 can compare the transmitted data of the feature points, with the feature points obtained from an image registered in the registration section, being correlated to the data (code number, personal information, corporate information, etc.) transmitted together with the data of the feature points to thereby determine if there is a match.

In the present configuration, the control circuit 40 of the reader 10 corresponds to an example of the data recording region reading section which carries out a function of reading data recorded in the data recording region when the information code 100 has been imaged by the imaging section. Further, the control circuit 40 corresponds to an example of the image processing section which carries out a function of performing an extraction process for an image in the image region, or a predetermined analysis process for an image in the image region, in a code image of the information code 100 imaged by the imaging section. Further, the administrative server 70 corresponds to an example of the authentication section which carries out a function of determining whether or not the information code read by the information code reader is a predetermined valid code, on the basis of the data in the data recording region read by the data recording region reading section, the image data in the image region or the analysis data of the image in the image region processed by the image processing section, and the registration registered in the registration section.

With the configuration described above, the advantageous effects as set forth below, for example, can be obtained.

The present configuration includes the specific information acquisition section which is ensured to be able to acquire specific information of a subject or an object, as information to be recorded in the data recording region of the information code 100, or as information correlated to the information to be recorded in the data recording region. Further, the present configuration includes the unique image acquisition section which is ensured to be able to acquire a unique image of a subject or an object, or a unique image that specifies the subject or the object, as information to be indicated in the image region of the information code 100. The specific information of a subject or an object acquired in this way can be registered in the registration section, being correlated with the unique image that specifies the subject or the object. Therefore, the present configuration is able to have, as an object to be administered, the information code 100 which enables visual identification via an image, while being able to enhance reliability of the information code that is an object to be administered, owing to the presence of such registration information.

Specifically, the present configuration includes the administrative server 70 corresponding to the information code producing section. Thus, the present configuration is configured to produce the information code 100 by recording, in the data recording region, either the specific information acquired by the specific information acquisition section, or the correspondence information registered in the registration section, being correlated to the specific information, and by indicating, in the image region, the unique image registered in the registration section, being correlated to the specific information.

According to the configuration, the information registered in the registration section can be used to formulate the system 1 that is able to produce the information code 100 having high reliability. The produced information code 100 is configured to have the data recording region in which the information registered in the registration section are recorded as data, and to have the image region in which the unique image registered in the registration section is indicated. Thus, in using the information code 100, the information code 100 is imaged and analyzed and the registration in the registration section is referred to, to thereby enable estimation as to whether or not the information code 100 is a valid one already registered.

Further, the administrative server 70 corresponding to the information code producing section is configured to produce an information code by recording, in the data recording region, encrypted data that have been obtained by encrypting at least a part of the specific information by means of a known encryption method, the information being acquired by the specific information acquisition section. According to the configuration, it is difficult for a third person, who could not interpret the encryption, to figure out the specific information of a subject or an object from the recordation of the information code. Accordingly, the configuration is able to realize an information code that can use personal information, while effectively suppressing leakage of the personal information to a third person.

Further, the administrative server 70 is configured to register the specific information acquired by the specific information acquisition section, and the information code 100 in the registration section, being correlated to each other. In this case, the information code 100 is produced by the information code producing section, with the specific information or the correspondence information correlated to the specific information being recorded in the data recording region.

Thus, in the configuration, the information code 100 is registered in the registration section, being correlated to the specific information. Accordingly, the specific contents of the registered valid information code can be finely specified and hence illegal use of an analogous information code can be easily and more reliably prevented.

Further, the present configuration includes the check server 60 corresponding to the determination section. The determination section is configured to determine whether or not a predetermined analogousness requirement is satisfied by a new unique image that is the unique image newly acquired by the unique image acquisition section, and an already registered unique image that is the unique image registered in the registration section prior to the acquisition of the new unique image by the unique image acquisition section. The registration section of the administrative server 70 is configured to exclude a new unique image from an object to be registered if the new unique image is determined by the determination section to satisfy the predetermined analogousness requirement together with the already registered unique image.

The configuration can effectively prevent registration of an information code whose image is analogous to the already registered valid information code to thereby easily prevent false recognition or impersonation.

Further, the administrative server 70 functions as the authentication section which is configured to determine whether or not the information code 100 read by the information code reader 10 is a predetermined valid code, on the basis of the data in the data recording region that has been read by the data recording region reading section of the information code reader 10, the image data of the image region or the analysis data of the image of the image region processed by the image processing section, and the registration that has been registered in the registration section.

According to the configuration, the authentication section can determine whether the data recorded in the data recording region and the image in the image region of the information code 100 correspond to any specific information and unique image correlated to the specific information registered in the registration section. Thus, whether the information code 100 is a registered reliable one can be more precisely estimated. Particularly, a reliable estimation can be made targeting not only the recorded data but also the image in the image region. For example, in the event that any fraud is committed falsifying either the recorded data or the image, such a fraud can be more reliably detected.

Further, in the present configuration, the unique image acquisition section is configured to acquire a photograph of the face of a person as a unique image of a subject. According to the configuration, the information code 100, as shown in FIGS. 15(A) and 18, which enables visual identification via the photograph of the face of the person, can be an object of administration. For example, when the information code 100 is used, visual identification via the photograph of the face can be performed together with the authentication by referring to the registration section. This enables further precise determination as to whether or not the information code 100 is a reliable one and thus illegal use of the information code can be more reliably prevented.

Figure 21:
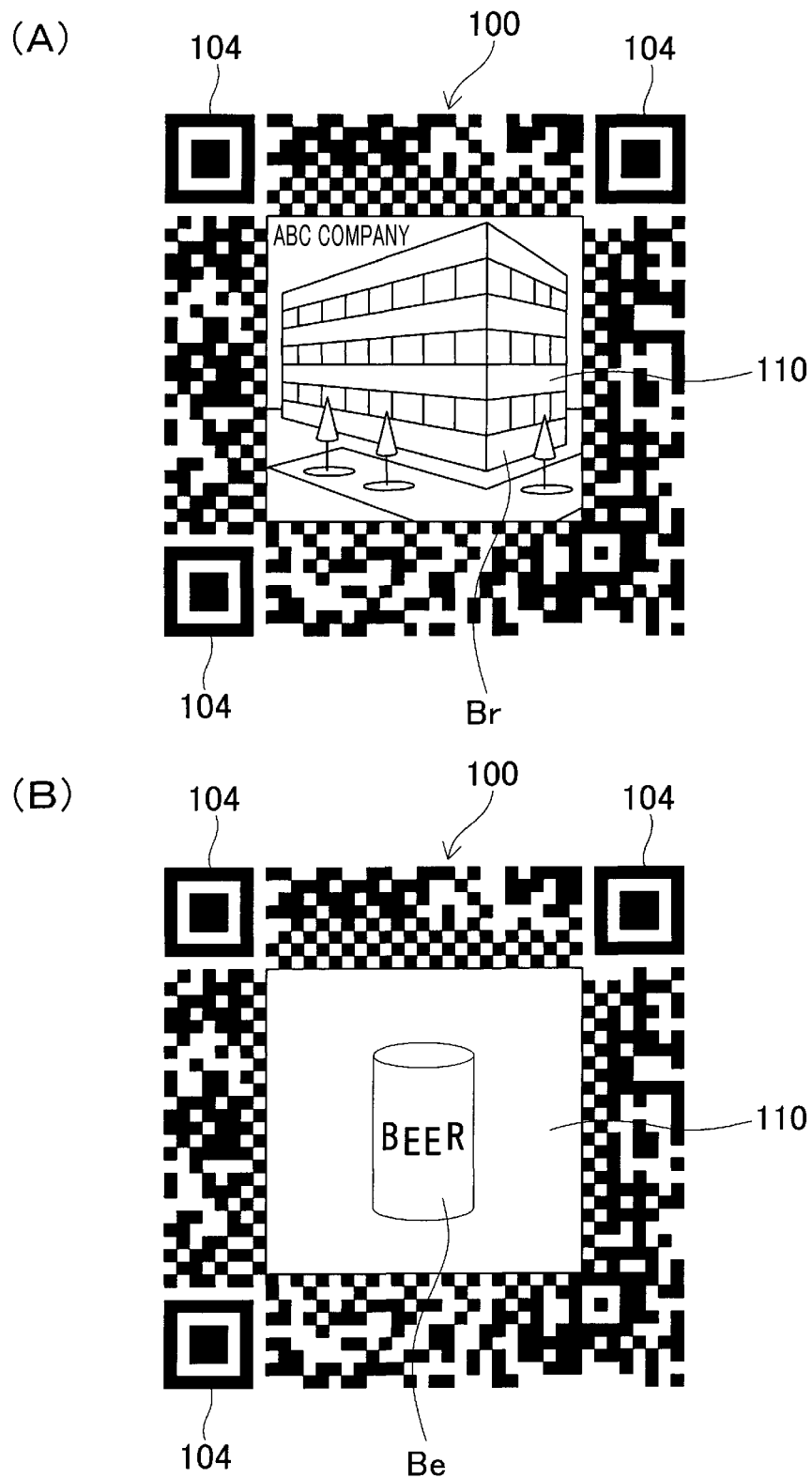
FIG. 21(A) is an illustration showing Another Example 1 of an information code produced in corporative registration.
FIG. 21(B) is an illustration showing Another Example 2 of an information code produced in corporative registration.

Further, in the present configuration, the unique image acquisition section is configured to acquire an image of an emblem that specifies a subject or an object, as a unique image for specifying the subject or the object. According to the configuration, the information code, as shown in FIGS. 17(A), 19 and 21, which enables visual identification via the image of the emblem, can be an object of administration. For example, when the information code 100 is used, visual identification via the emblem can be performed together with the authentication by referring to the registration section. This enables further precise determination as to whether or not the information code 100 is a reliable one and thus illegal use of the information code 100 can be more reliably prevented.

[Second Embodiment]

Hereinafter is described a second embodiment.

A system which uses an information code, which is according to the second embodiment, has a hardware configuration similar to the one in the first embodiment. Thus, the system of the second embodiment has a configuration as shown in FIGS. 1 and 2 described above.

The system of the second embodiment produces an information code 200 as shown in FIG. 22(B) by the information code producing apparatus 2 (see FIG. 1). With this configuration as well, a code area is provided therein with a specific pattern region in which a specific pattern 204 having a predetermined shape is arranged, and a data recording region in which data is recorded by various types of cells. The code area is provided therein with a free space 210 at a position other than the specific pattern region by using a method different from the one for recording data in the data recording region, to enable at least either recordation of data or indication of a design. The free space 210 has a size larger than that of a single cell.

In the configuration, the configuration other than that of the free space 210 is configured as a known QR code (registered trade mark). Thus, first, as shown in FIG. 22(A), the code area includes therein the specific pattern region, the data recording region, and an error correction code recording region in which error correction codes are recorded by the various types of cells. It should be noted that methods similar to the ones used for a known QR code are used as a method for recording data code words in the data recording region and a method for recording error correction code words in the error correction code recording region. For example, a method defined by JISX0510 is used to determine the location of position detection patterns (specific patterns 204) in the code area, the location of data code words in the data recording region, and the location of the error correction code words in the error correction code recording region.

However, as shown in FIG. 22(A), the code words in a part of the region are configured to be an information code 200' which is configured by the code words represented by only white cells (data code words or filler code words configured by only white cells). Such an area AR represented by white cells alone is used as the free space 210 to indicate therein, as shown in FIG. 22(B), at least one of a diagram, a pattern, a color, or a design that is a combination of these matters, or information expressed by one or more marks. When a design D is indicated in the free space 210 as shown in FIG. 22(B), the configuration becomes different from the original data indication as shown in FIG. 22(A). However, an error of data in the free space 210 can be corrected through a known error correction by using the error correction codes recorded in the error correction code recording region.

Further, in the information code 200 shown in FIG. 22(B), the position of the free space 210 is specified in advance. Therefore, when a design or information is additionally indicated in the free space 210, the position of error due to the indication can be grasped in advance. Accordingly, the error correction codes in the error correction code recording region can be configured such that disappearance correction can be performed with the position of the free space 210 as being an error position. In this case, information indicating the position of the free space 210 can be recorded in advance in the data recording region, or stored in advance in the reader 10 (FIG. 1), so that the reader 10 can specify, when performing reading, the position of the free space 210 (i.e. position of the data code words causing the error). Thus, the reader 10 is ensured to perform disappearance correction using the error correction codes recorded in the error correction code recording region, so that the error can be corrected in the data code words which are present in the free space 210 whose position has been specified.

In this configuration, of the data recorded in the data recording region, those data code words which indicate data located ahead of a terminal end that indicates an end of data to be interpreted (data to be interpreted, which are to be outputted) may be arranged outside the free space 210, while the region of the filler code words that are located after the terminal end (data not to be interpreted) may be used as the free space 210. Alternatively, the data code words may be configured such that the cells inside the free space 210 are white cells to locate the data code words in the free space 210.

Then, the unique image (e.g., FIG. 15, 17 or 21) is indicated in the free space 210 of the information code 200 configured in this way to configure the information code 200 having functions similar to those shown such as in FIG. 15, 17 or 21. It should be noted that the registration method and the administration method for the information code 200 are similar to those of the first embodiment.

[Third Embodiment]

Hereinafter is described a third embodiment.

A system which uses an information code, which is according to the third embodiment, also has a hardware configuration which is similar to that of the first embodiment. Thus, the system of the third embodiment has a configuration as shown in FIGS. 1 and 2.

The system of the third embodiment produces an information code 300 as shown in FIG. 23(B) by the information code producing apparatus 2 (e.g., see FIG. 1). In this configuration as well, a code area includes therein a specific pattern region in which a specific pattern having a predetermined shape (L-shaped alignment pattern 304a and a timing cell 304b in which light cells and darks are alternately arranged on a one-by-one basis to configure an L-shaped region along a boundary relative to the code area) and a data recording region in which data are recorded by various types of cells. The code area is provided therein with a free space 310 at a position other than the specific pattern region by using a method different from the one for recording data in the data recording region, to enable at least either recording of data or indication of a design. The free space 310 has a size larger than that of a single cell.

In this configuration, the configuration other than the free space 310 is configured as a known data matrix code. Thus, first, as shown in FIG. 23(A), the code area includes therein the specific pattern region, the data recording region, and an error correction code recording region in which error correction codes are recorded by the various types of cells. It should be noted that methods similar to the ones used for a known data matrix code are used as a method for recording data code words in the data recording region and a method for recording error correction code words in the error correction code recording region. The location of the alignment pattern 304a and the timing cell 304b, the location of the data code words in the data recording region, and the location of the error correction code words in the error correction code recording region are determined according, for example, to ECC 200 version.

However, as shown in FIG. 23(A), the code words in a part of the region are configured to be an information code 300' which is configured by the code words represented by only white cells. Such an area AR represented by white cells alone is used as the free space 310 to indicate therein, as shown in FIG. 23(B), at least any of a diagram, a pattern, a color, or a design that is a combination of these matters, or information expressed by one or more marks. When a design D is indicated in the free space 310 as shown in FIG. 23(B), the configuration becomes different from the original data indication as shown in FIG. 23(A). However, an error of data in the free space 310 can be corrected through a known error correction by using the error correction codes recorded in the error correction code recording region.

Further, in the information code 300 shown in FIG. 23(B), the position of the free space 310 is specified in advance. Therefore, when a design or information is additionally indicated in the free space 310, the position of error due to the indication can be grasped in advance. Accordingly, the error correction codes in the error correction code recording region can be configured such that disappearance correction can be performed with the position of the free space 310 as being an error position. In this case, information indicating the position of the free space 310 can be recorded in advance in the data recording region, or stored in advance in the reader 10 (FIG. 1), so that the reader 10 can specify, when performing reading, the position of the free space 310 (i.e. position of the data code words causing the error). Thus, the reader 10 is ensured to perform disappearance correction using the error correction codes recorded in the error correction code recording region, so that the error can be corrected in the data code words which are present in the free space 310 whose position has been specified.

Then, the unique image (e.g., FIG. 15, 17 or 21) is indicated in the free space 310 of the information code 300 configured in this way to configure the information code 300 having functions similar to those shown such as in FIG. 15, 17 or 21. It should be noted that the registration method and the administration method for the information code 300 are similar to those of the first embodiment.

[Fourth Embodiment]

Hereinafter is described a fourth embodiment.

The fourth embodiment has a configuration that includes a free space similar to the one in the first embodiment. The only difference from the first embodiment is the way of specifying the free space.

In the present configuration as well, a plurality of models are prepared in the types of an information code 400. Each of the models has a preset number of rows and columns of cells, a preset shape and position of a specific pattern, a preset position for format information, and preset candidate positions (addresses) of code words. When the producing apparatus 2 produces the information code 400, model information is ensured to be arranged at a predetermined position in the code area (reserved region 107 in the example of FIG. 24). Accordingly, when the reader 10 reads the information code 400, a code image of the information code 400 is analyzed, and the model information arranged at the predetermined position is read to thereby grasp the number of rows and columns of the cells, the shape and position of the specific pattern, the position for format information, and the candidate positions (addresses) of the code words.

When the information code 400 is produced, any model is selected from the plurality of models prepared in advance. This determines a basic configuration in the code area (position of the specific pattern 104, the number of rows and columns of the cells, and candidate positions of the code words). For example, in the model having a configuration shown in FIG. 24, cells of 29 rows and 29 columns are arrayed in which the specific patterns 104 each having the same structure as that of a finder pattern of a QR code (registered trade mark) are ensured to be arranged at three predetermined corners. At a predetermined position near each specific pattern 104, a region (predetermined position 105) for recording format information is provided. In the matrix region of 29 rows and 29 columns, candidate positions of code words are predetermined at positions other than those of the specific patterns 104 and the predetermined positions 105, with addresses of 0 to 67 being allocated to the candidate positions. In this way, the configuration in the code area is defined by the configuration corresponding to the model. Therefore, when a model is specified, the position where each of the code words lined up in order is located can be necessarily specified. It should be noted that the information of the determined model is recorded at a predetermined fixed position in the array of the model. For example, in the example shown in FIG. 24, the information of the model is ensured to be recorded in a region 107

Then, after the model is determined and the basic configuration in the code area is determined, the shape and position of the free space are determined. The shape of the free space may be determined by means of any method in the forgoing embodiments. For example, the shape may be determined by means of a method of selecting one from a plurality of candidate shapes prepared in advance. Alternatively, the shape may be determined by means of a method of setting a shape according to shape specifying information inputted from outside into the information code producing apparatus 2. Further, the position of the free space may be determined to be a predetermined fixed position. Alternatively, a user may input the information for specifying a position and the position may be ensured to be determined to be the position of the free space.

Figure 24:
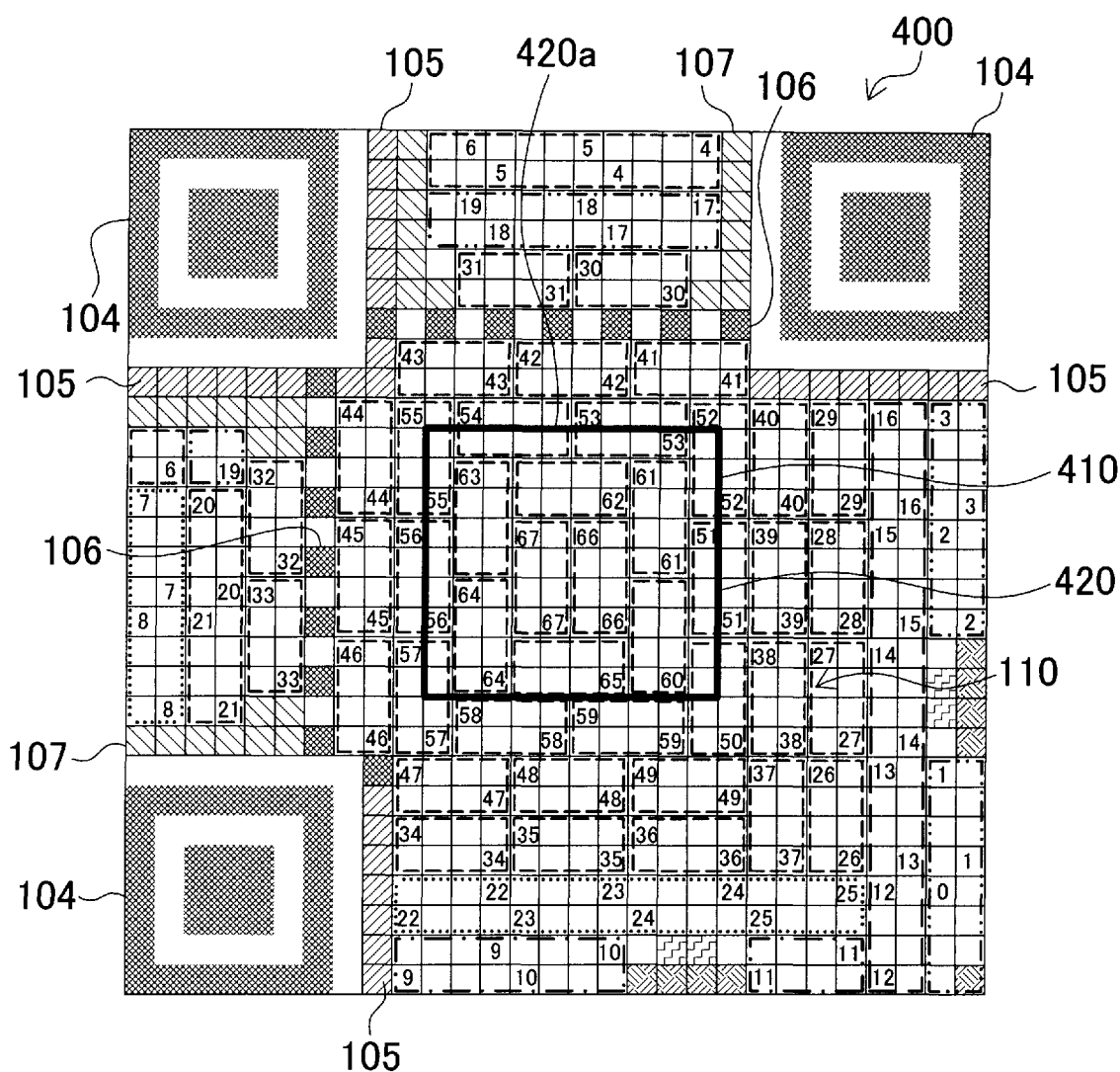
FIG. 24 is an illustration explaining an information code used in a system which uses an information code, according to a fourth embodiment.

Then, after determining the free space, the information code 400 is produced with a configuration in which the code words in the data recording region and the code words in the error correction code recording region are arranged at candidate positions of code words, which positions are out of the position of the determined free space. For example, in the model having the configuration as shown in FIG. 24, the specific patterns 104 are arranged at three corners, and the candidate positions of 68 code words with an allocation of numbers 0 to 67 are defined in advance with reference to the position of these specific patterns 104. In such a layout, when a free space 410 is determined as shown in FIG. 24, the candidate positions of the code words, which are at least partially located in the free space 410, are excluded from the positions targeted to location, and code words are sequentially arranged skipping the positions of the excluded code words. For example, in the example of FIG. 24, the free space 410 is set up entering into the candidate positions of the $50^{th}$, $51^{st}$, $53^{rd}$, $54^{th}$, and $60^{th}$ to $67^{th}$ code words. Therefore, it is ensured that no code word is arranged at the candidate positions of the $50^{th}$, $51^{st}$, $53^{rd}$, $54^{th}$, and 60th to $67^{th}$ code words. In other words, after sequentially arranging code words at $0^{th}$ to $49^{th}$ positions, code words are arranged at the $52^{nd}$ position, skipping the $50^{th}$ and $51^{st}$ positions. Then, skipping the $53^{rd}$ and $54^{th}$ positions, code words are sequentially arranged at the $55^{th}$ to $59^{th}$ positions. In this way, the data code words that are the encoded data to be interpreted, and error correction code words indicating error correction codes are reliably arranged at the candidate positions out of the free space 410.

After determining the specific pattern region (region for the specific patterns 104 and other specific patterns), the format region (predetermined positions 105), the model region 107, the code word regions, and the like in this way, specific data for the free space 410 are determined. In this configuration as well, the information code 400 having functions similar to those shown such as in FIG. 15, 17 or 21 can be configured by indicating the unique image (e.g., FIG. 15, 17 or 21) in the free space 410. It should be noted that the registration method and the administration method for the information code 400 are similar to those of the first embodiment.

[Fifth Embodiment]

Hereinafter is described a fifth embodiment.

A system 500 according to the fifth embodiment has a basic configuration similar to the one described in the items of (Information code producing apparatus), (Information code reader), (Information code) and (Information code producing process) of the foregoing first embodiment. Accordingly, details of these items are omitted, while adequately referring to FIGS. 1 to 9.

The information code producing apparatus 2 includes all the contents described in the first embodiment (Information code producing apparatus). In the present configuration, for example, a mobile terminal 90b carries out a function of the information code producing apparatus 2. Further, the information code reader 10 includes all the contents described in the first embodiment (Information code reader). In the present configuration, a mobile terminal 90a carries out a function of the information code reader 10.

An information code 100 (e.g., FIGS. 32 and 34) to be used in the present configuration includes all the contents described in the item of the first embodiment (Information code), with only difference from the first embodiment lying in a design in a region 110 or specific data recorded in a data recording region. Further, the information code 100 is ensured to be produced through a flow similar to the one described in the first embodiment (Information code producing process). The information code 100 is also configured to include, in a code area, a specific pattern region where specific patterns of a predetermined shape are arranged, a data recording region where data are recorded by various types of cells, and an image region that is configured as a region for indicating an image that is different from the image in the cells, with the region's size being larger than that of each of the cells. The data in a free space 110 (image region) in each information code 100 can include, for example, a trade mark representing an operator subject of an SNS (Social Networking Service) corresponding to the information code 100, or a character managed by the operator subject of the SNS corresponding to the information code 100.

Figure 25:
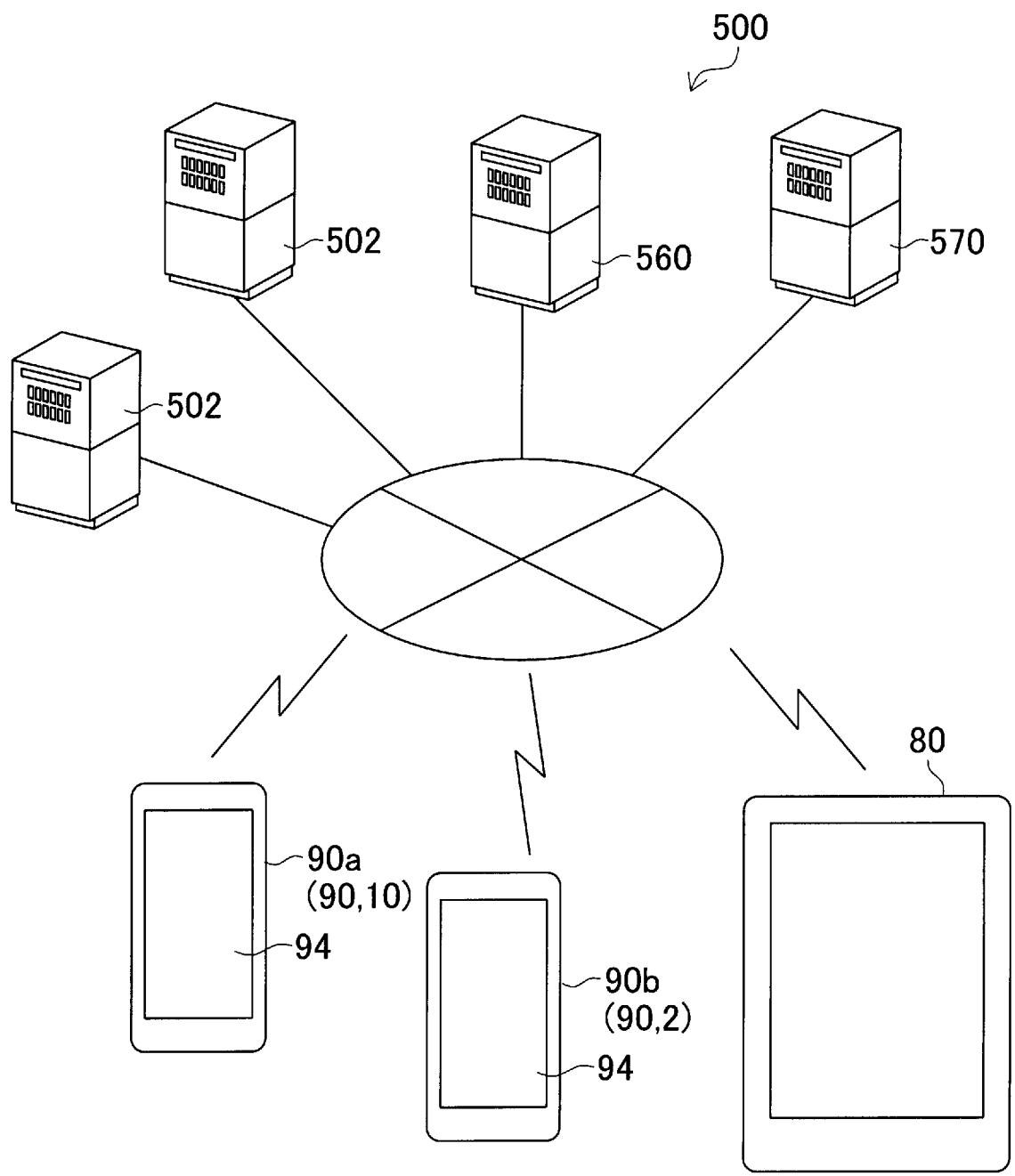
FIG. 25 is an outlined view exemplifying an outline of a system which uses an information code, according to a fifth embodiment.

As shown in FIG. 25, the system 500 includes a check server 560, an administrative server 570, and a plurality of SNS (Social networking Service) servers 502. Further, it is ensured that a computer 80, a mobile terminal 90, or the like as an external unit is able to make access to the system 500. Thus, it is ensured that the information inputted from the computer 580 or the mobile terminal 590 can be acquired by the check server 560 or the administrative server 570. Use of the information code 100 described above (i.e. the information code including, in the code area, the specific pattern region where specific patterns of a predetermined shape are arranged, the data recording region where data are recorded by various types of cells 102, and the free space 110 (image region) that is configured as a region for indicating an image that is different from the image in the cells, with the region's size being larger than that of each of the cells) is administered by such a system configuration.

The check server 560 is configured, for example, as an information processor, such as a personal computer. The check server 560 includes: a controller configured such as by a CPU; an operation unit configured by a keyboard, mouse and other input devices; a storage configured by a storage unit, such as a ROM, RAM, hard disk drive and nonvolatile memory; a display unit configured such as by a known display unit (liquid crystal display, or other display devices); and a communication unit that carries out a function as a communication interface for performing wired communication or wireless communication with an external unit. It should be noted that the check server may be configured as a single information processor, or may be configured by a plurality of information processors.

The administrative server 570 is a server that performs, for example, administration of registration information, and has a hardware configuration similar to that of the check server 560. Thus, the administrative server 570 includes a controller, an operation unit, a storage, and a communication unit, which are similar to those of the check server 560. The administrative server 570 may also be configured as a single information processor, or may be configured by a plurality of information processors. Further, a single information processor may function as both the check server 560 and the administrative server 570.

Each SNS server 502, which is handled by the operator subject, has a hardware configuration similar to that of the check server 560. Thus, the SNS server 502 includes a controller, an operation unit, a storage, and a communication unit, which are similar to those of the check server 560. The SNS server 502 may also be configured as a single information processor, or may be configured by a plurality of information processors. In the example shown in FIG. 25, two SNS servers 502 are exemplified, but the number of the SNS servers 502 may be three or more.

The computer 80 or the mobile terminal 90 is a device that can be used, for example, by a person or a corporate body, who desires registration. The computer 80 is configured as an information processor, such as a personal computer. The computer 80 includes: a controller configured such as by a CPU; an operation unit configured by a keyboard, mouse and other input devices; a storage configured by a storage unit, such as a ROM, RAM, hard disk drive and nonvolatile memory; a display unit configured such as by a known display unit (liquid crystal display, or other display devices); and a communication unit that carries out a function as a communication interface for performing wire communication or wireless communication with an external unit. Further, the mobile terminal 90 is configured by a mobile phone or a smart phone, or other mobile type information processors. The mobile terminal 90 includes: a controller configured such as by a CPU; an operation unit configured by operation buttons, a touch panel, and other input devices; a storage configured by a storage unit, such as a ROM, RAM and nonvolatile memory; a display unit configured such as by a known display unit (liquid crystal display, or other display devices); and a communication unit that carries out a function as a communication interface for performing wire communication or wireless communication with an external unit.

In the example shown in FIG. 25, two mobile terminals 90 are exemplified, but the number of the mobile terminals 90 may be three or more. Further, the number of the computers 80 may be two or more. In the example shown in FIG. 25, one mobile terminal 90a is permitted to function as the reader 10, and one mobile terminal 90b is permitted to function as a producing apparatus. However, both of the computer 80 and the mobile terminal 90 have both functions as the producing apparatus 2 and the reader 10.

In the present configuration, all of the plurality of mobile terminals 90 and the computers 80 each include an application program (hereinafter also referred to as cooperative application for frame QR, or cooperative tool) that can execute (Information code producing process) and (Information code reading process) which will be described later. The application program is stored, for example, in the administrative server 570 or the check server 560 in advance. It is ensured that the application program can be downloaded from these servers to the mobile terminal 90 or the computer 80.

The application that uses the cooperative application for frame QR as a startup trigger has an icon which is ensured to be arranged at the time of downloading the cooperative application for frame QR, by using the predetermined information code 100 (e.g., FIG. 14(A) or (B)).

(Pre-Registration Process)

Hereinafter is described a registration process of each user subject who uses the system 500.

Figure 27:
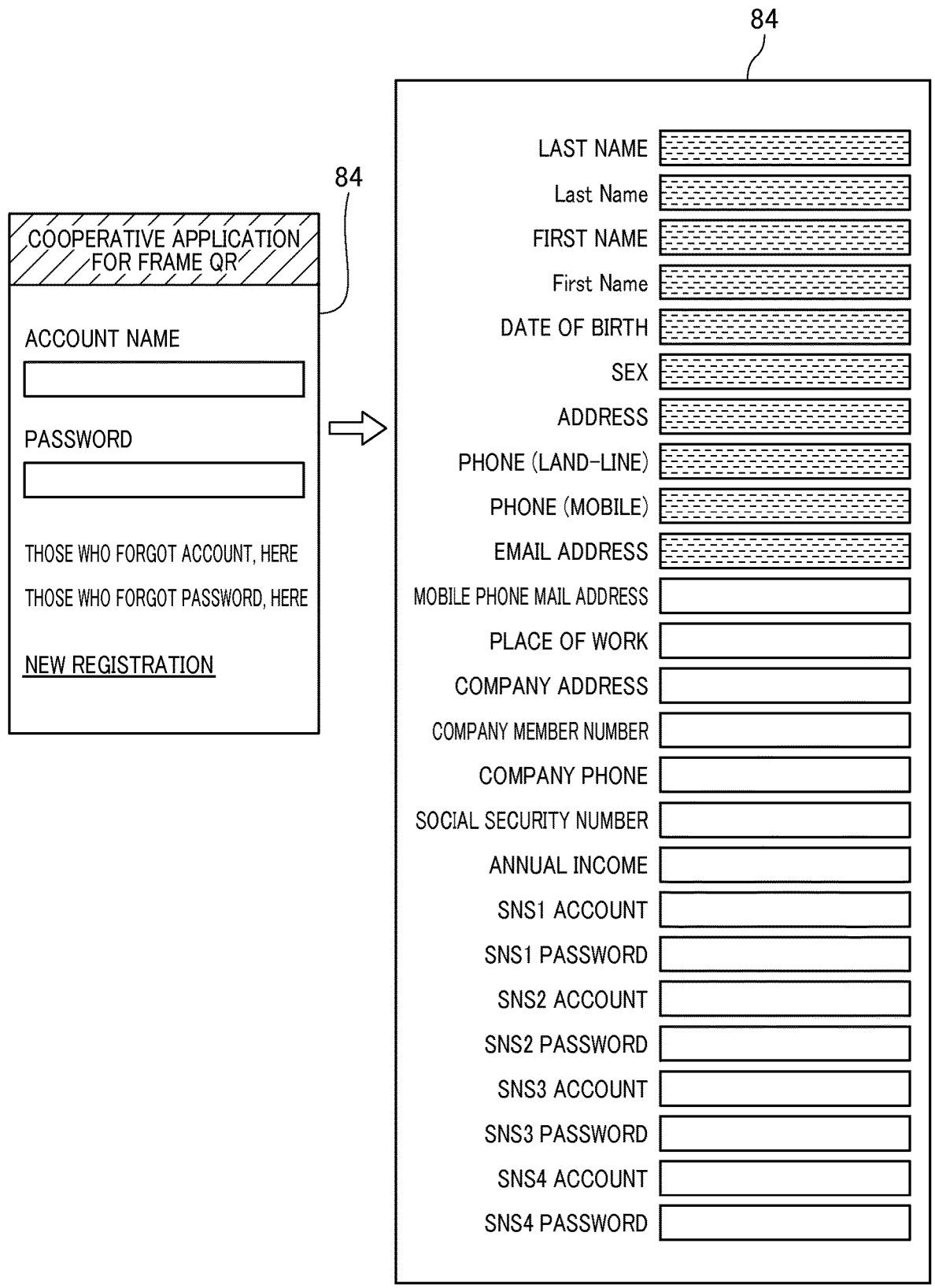
FIG. 27 is an illustration explaining an input screen for various pieces of registered information in a mobile terminal, in the system according to the fifth embodiment.

In the present configuration as well, the information similar to that in the first embodiment can be registered through a method similar to that in the first embodiment. For example, the application program (hereinafter also referred to as cooperative application for frame QR or cooperative tool) mentioned above, which is provided to the computer 80 or the mobile terminal 90 is ensured to display an input screen as shown in FIG. 27 when the computer 80 or the mobile terminal 90 is operated in a predetermined manner. When personal information as shown in FIG. 27 is inputted in the input screen, the pieces of information are ensured to be transmitted to the check server 560. When a set of input information data for the items shown in FIG. 27 is transmitted from the computer 80 or the mobile terminal 90, the check server 560 stores the set of information data in the storage of the administrative server 570 so as to be correlated to each other. When new registration is conducted as shown in FIG. 27, it may be so configured that electronic data of the photograph of the face of the person who desires the registration can be transmitted in a predetermined image file format from the computer 80 or the mobile terminal 90 to the administrative server 570, together with the transmission of the personal information shown in FIG. 27.

In the example shown herein, the personal information of each person to be registered is registered online from the computer 80 or the mobile terminal 90. However, as described in the first embodiment, registration may be conducted through a method in which a person to be registered fills out a personal information registration sheet for the personal information and submits the sheet to a subject (commercial entity, public office, etc.) who administers/operates the administrative server 570, while submitting an original or a copy of a personal identification medium, such as a driver's license or a Basic Resident Card (in the case of abroad, a personal ID card or a social number card), which can identify the person. In this case, for example, a worker, such as an employee, of the administrator subject side can operate the operation unit of the administrative server 570 to input, as personal information of the person to be registered, the information recorded on the submitted personal information registration sheet, to thereby store the information in the storage of the administrative server 570.

Further, in addition to the registration items of the first embodiment, the present configuration ensures registration, as shown in FIG. 28, of an account and a password (account 1 and password 1 in the example of FIG. 28) used for the authentication in the check server 560, and an account and a password (account 2 and password 2, and account 3 and password 3 in the example of FIG. 28) used for the authentication in each SNS server 502. For example, in the application program mentioned above, upon input of an account and a password through an initial screen as shown on the left in FIG. 27, they are ensured to be encrypted and transmitted as an account and a password (basic account and basic password) used for the authentication in the check server 560. Further, in the application program, upon input of an account and a password corresponding to each SNS server through a details input screen as shown on the right in FIG. 27, they are ensured to be transmitted to the check server 560, being correlated to the basic account and the basic password mentioned above. Every time an account and a password corresponding to an SNS server are newly transmitted from the computer 80 or the mobile terminal 90, the check server 560 stores the account and the password in the storage of the administrative server 570, being correlated to the basic account and the basic password. In this way, as shown in FIG. 28, one or more types of accounts and passwords can be registered in an SNS server, being correlated to a person who is specified by the basic account and the basic password (account 1 and password 1).

In the present configuration, the controller of the check server 560 or the administrative server 570 corresponds to an example of the personal information acquisition section which acquires personal information of a subject. Further, the storage of the administrative server 570 corresponds to an example of the registration section that registers personal information acquired by the personal information acquisition section, thereby ensuring registration of an account and a password of each subject, as personal information of the subject.

(Information Code Producing Process)

Figure 26:
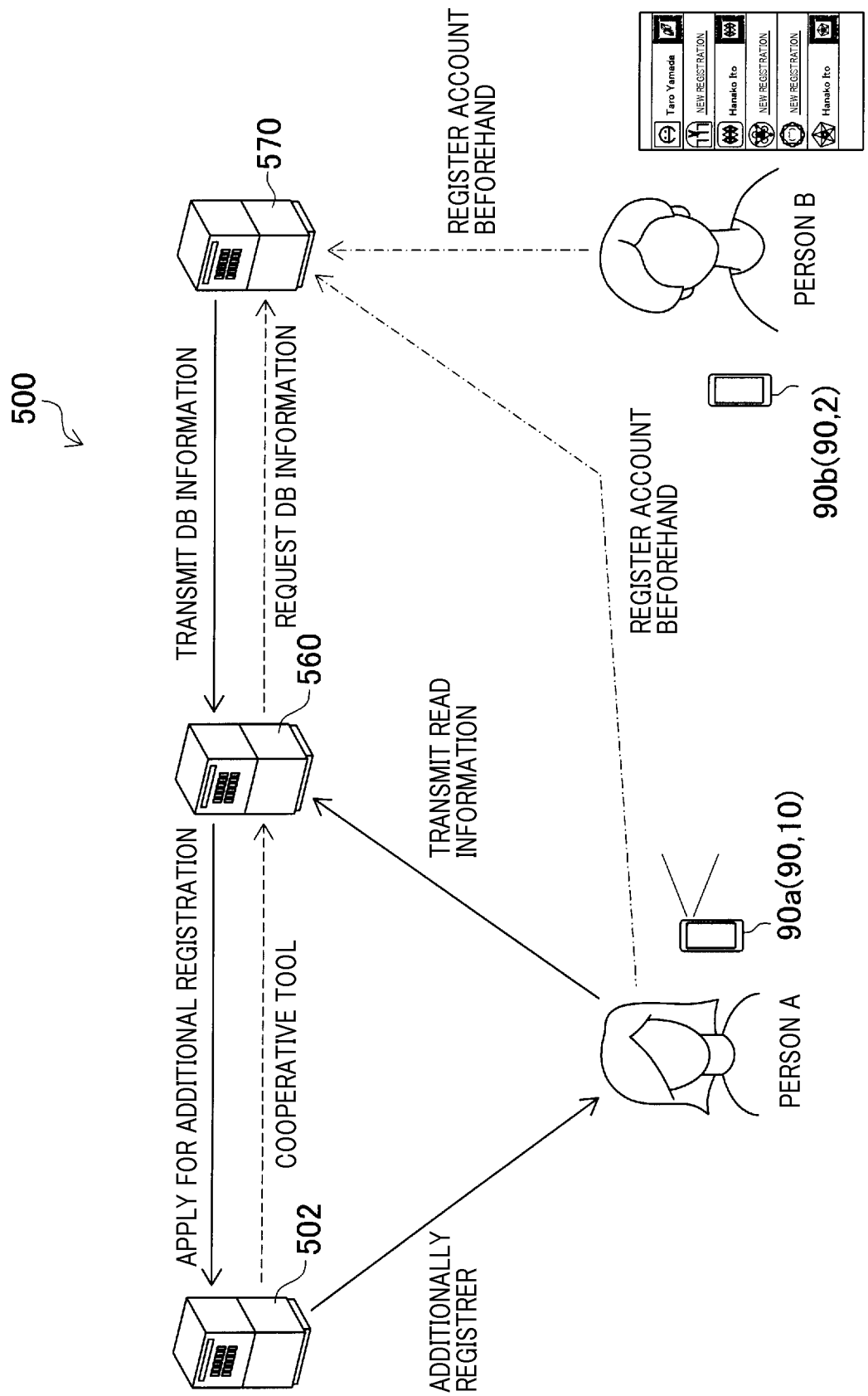
FIG. 26 is an illustration explaining an operation example of the system according to the fifth embodiment.

By way of an example, hereinafter is described a setting made in an SNS server 502. In the setting, one person (first subject) is correlated to another person (second subject). In the example provided below, a person B shown in FIG. 26 is the first subject, while a person A is the second subject.

Figure 30:
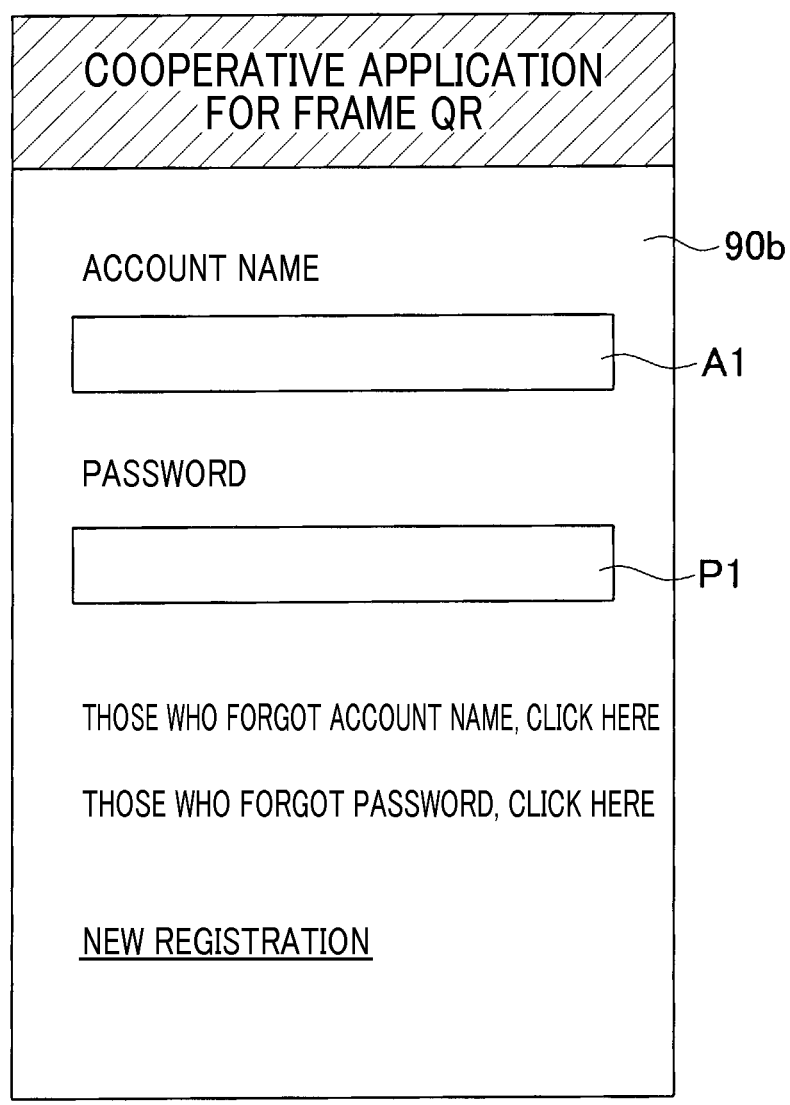
FIG. 30 is an illustration explaining an input screen for an account and a password, in the system according to the fifth embodiment.

First, the person B operates the own mobile terminal 90b to execute the application program mentioned above provided to the mobile terminal 90b. Upon execution, the application program displays an initial screen as shown in FIG. 30 on a display unit 94b of the mobile terminal 90b. Then, when the person B inputs the own basic account and basic password in entry fields A1 and P1 while the initial screen is displayed, the inputted account information (basic account and basic password) is promptly encrypted and stored as a temporary file. When the basic account and basic password are in putted via the initial screen shown in FIG. 30, the application program displays a selection screen, shown in FIG. 31, in a display unit 94b of the mobile terminal 90b. The selection screen is used for selecting a detailed program. When any of selection items 94c to 94f is specified, the application program is ensured to run the detailed program corresponding to the selection item as specified.

Figure 32:
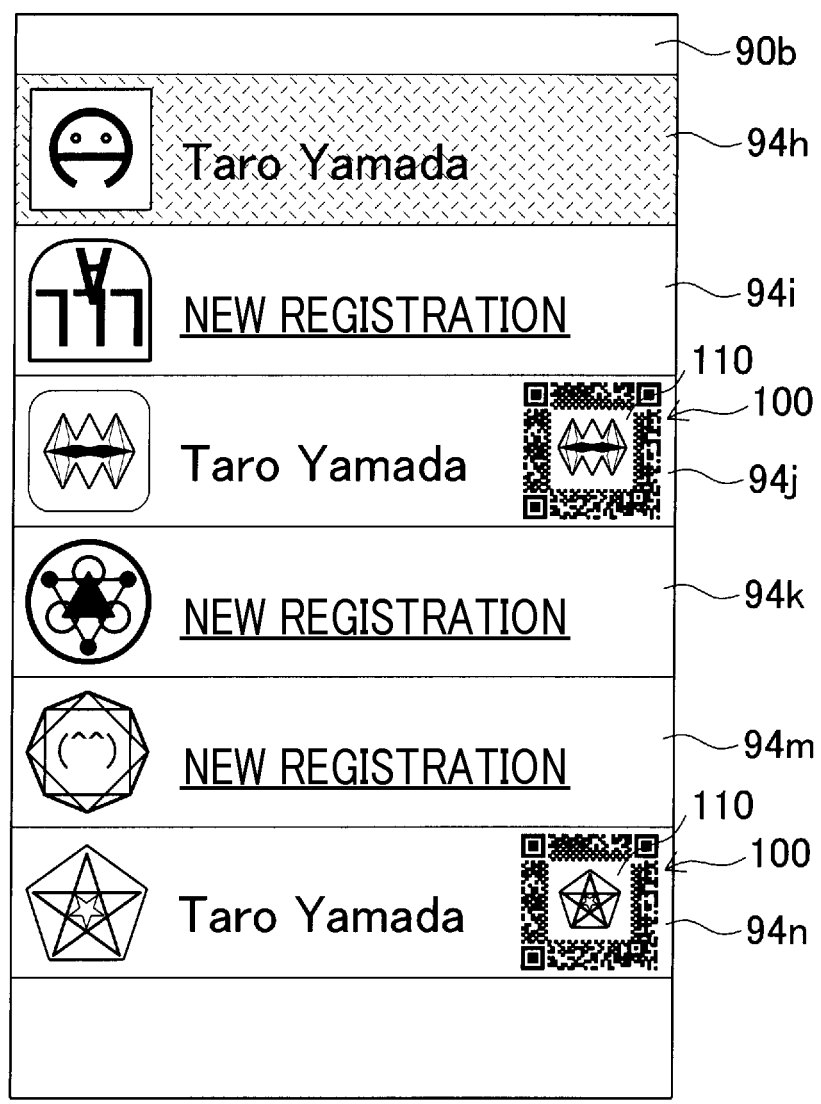
FIG. 32 is an illustration explaining a display screen displayed by an application program provided to a mobile terminal, the display screen being a screen subsequent to the display screen of FIG. 31.

If the item 94d of "list of frames QR" is selected in the selection screen, the information codes 100 (frames QR) that have been prepared up to then are displayed in a list as shown in FIG. 32. The mobile terminal 90b of the present configuration is able to produce an information code 100 (frame QR) corresponding to each SNS through a producing process described above. When the information code 100 (frame QR) corresponding to one SNS is produced, the produced information code 100 is ensured to be displayed in the display unit of the SNS corresponding to the information code 100.

Figure 33:
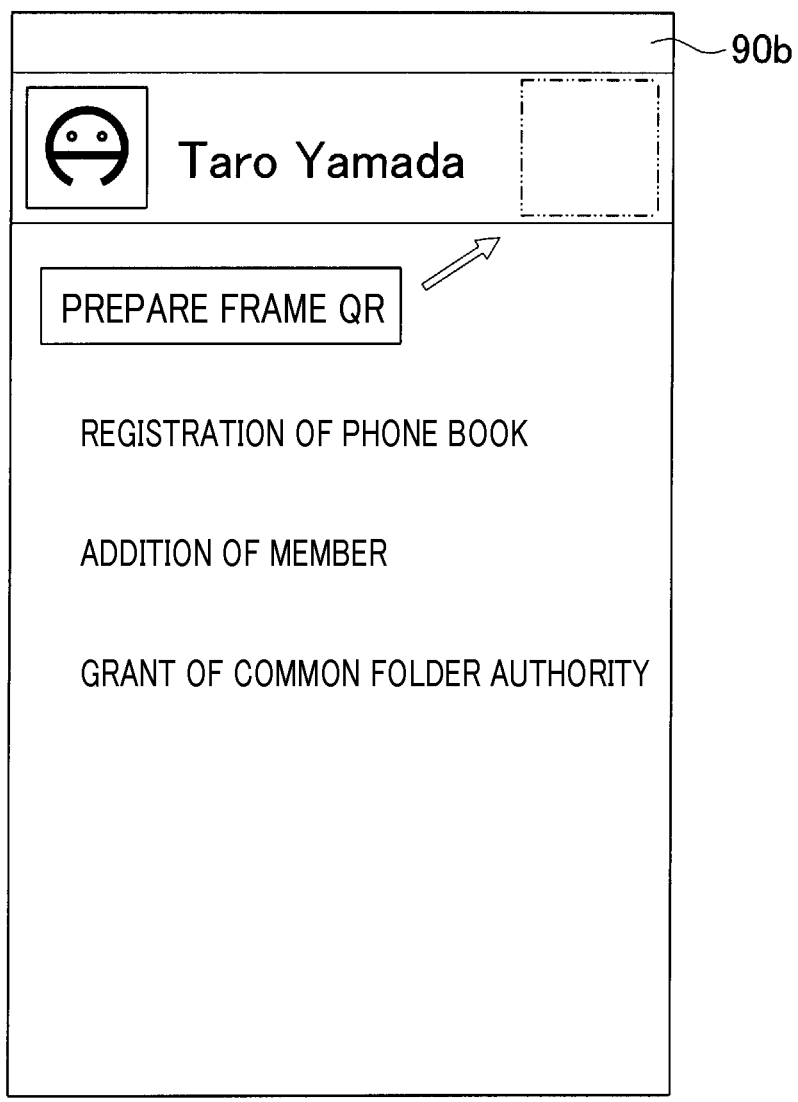
FIG. 33 is an illustration exemplifying a screen configuration in producing an information code in an output terminal.

When a new information code 100 is produced/registered for an SNS for which an information code has not yet been produced, the operator selects a desired SNS from the SNS list in the screen shown in FIG. 32. For example, of the SNSs displayed in the list in the screen of FIG. 32, if the information code 100 of the SNS corresponding to an item 94h is to be produced, the item 94h is specified as shown in FIG. 32 to start production of the information code 100. When any of the SNSs has been specified as shown in FIG. 32, the application program of the mobile terminal 90b displays, as shown in FIG. 33, a screen for inputting an setting purpose in the SNS. In the example shown in FIG. 33, a plurality of setting purposes are ensured to be displayed. When the operator specifies any of the setting purposes via the screen shown in FIG. 33, the information code 100 is produced such that specific information that specifies the specified setting purpose is recorded in the data recording region. After making a series of selections as described above, the information code 100 is produced in a manner similar to the first embodiment.

Figure 35:
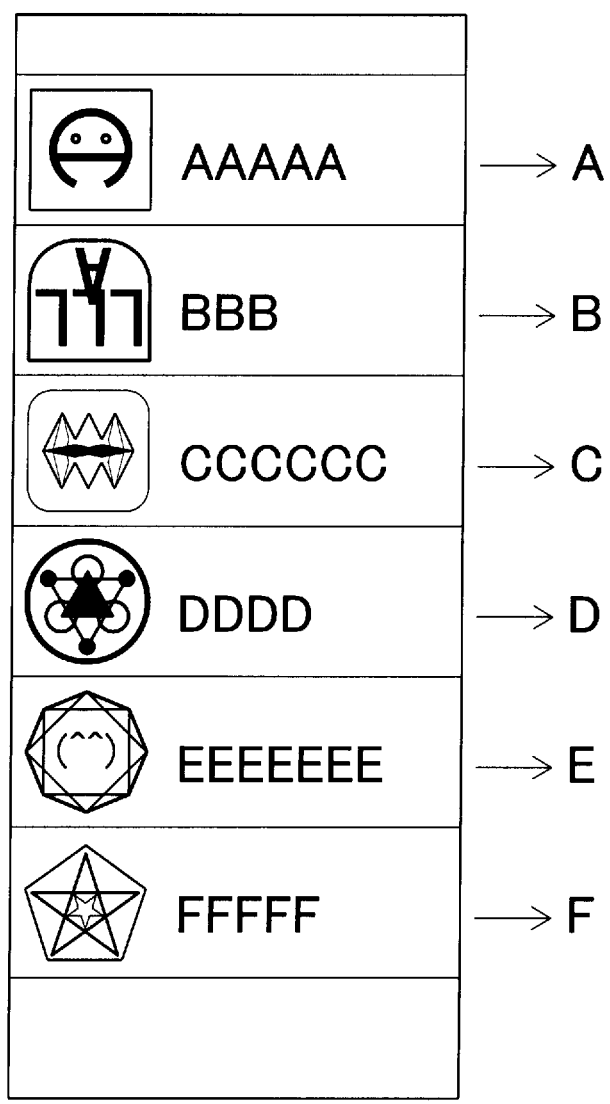
FIG. 35 is an illustration explaining information allocated to each SNS (, which is information specifying each SNS)

The information recorded in the data recording region of the information code 100 includes any of pieces of information described in an action code table (information for specifying an SNS and a requested setting in the SNS), and information that is the encrypted basic account and basic password of the first subject (person B). It should be noted that the mobile terminal 90 and the check server 560 are registered in advance with a common encryption key, and thus the information encrypted by the application program of the mobile terminal 90 is ensured to be interpreted by the check server 560. In the present configuration, as shown in FIG. 35, information data A to F are allocated to the respective SNSs, with information data 1 to 3 being allocated to respective setting purposes (execution purposes). Accordingly, when any of A1 to F3 shown in FIG. 36 is included in the specific information, the specific information can specify an SNS server 502 and a requested setting in the SNS 502.

In the present configuration, the information code producing section of the mobile terminal 90b corresponds to an example of the output terminal, while the display unit 94b corresponds to an example of the output section. Further, the operation unit of the mobile terminal 90b corresponds to an example of the first input section which enables input of at least a part of the personal information of any first subject (specifically, the account and password of the first subject) registered in the registration section. Thus, when the personal information of the first subject is inputted by the first input section, the mobile terminal 90b corresponding to the information code producing section carries out a function of producing the information code 100 with a configuration in which the inputted personal information is recorded in the data recording region. Specifically, the mobile terminal 90b carries out a function of producing the information code 100 with a configuration in which the account and password of the first subject inputted by the first input section are recorded in the data recording region.

(Icon QR Arranging Process)

Hereinafter is described an arranging process for the information code 100 (icon QR).

In an example provided below, the mobile terminal 90b owned by the person B is described with reference to FIGS. 31 and 9.

Figure 31:
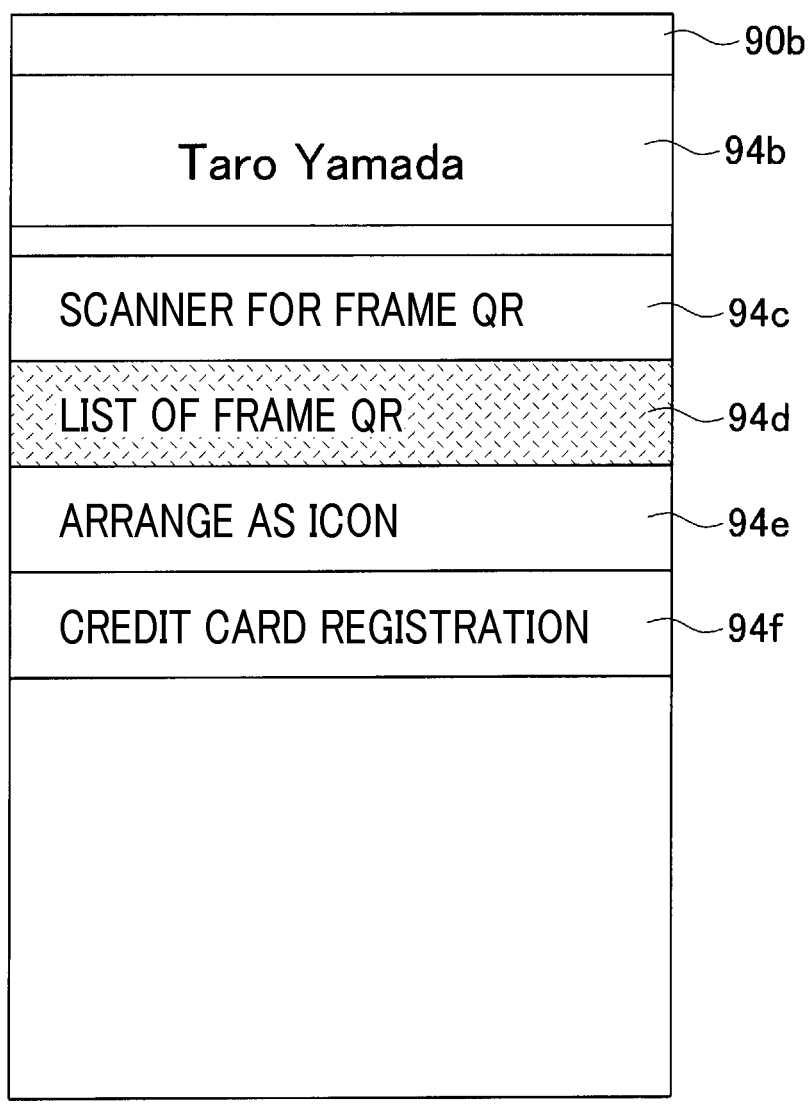
FIG. 31 is an illustration explaining a display screen displayed by an application program provided to a mobile terminal, the display screen being a screen subsequent to the display screen of FIG. 30.

The arrange as icon 94e of the application program shown in FIG. 31 carries out a function of replacing an icon arranged in downloading the cooperative application for frame QR (e.g. FIG. 14(A) or (B)) or an icon already arranged on a top screen of the mobile terminal 90b as a startup trigger of another application program, with an image of an icon QU (e.g., FIG. 15(A) or FIG. 17(B)), and arranging the replaced icon.

(Information Code Reading Process)

A reading process for the information code 100 is described below. In an example described below, the mobile terminal 90a owned by the person A reads the information code 100 displayed on the mobile terminal 90b of the person B.

Figure 29:
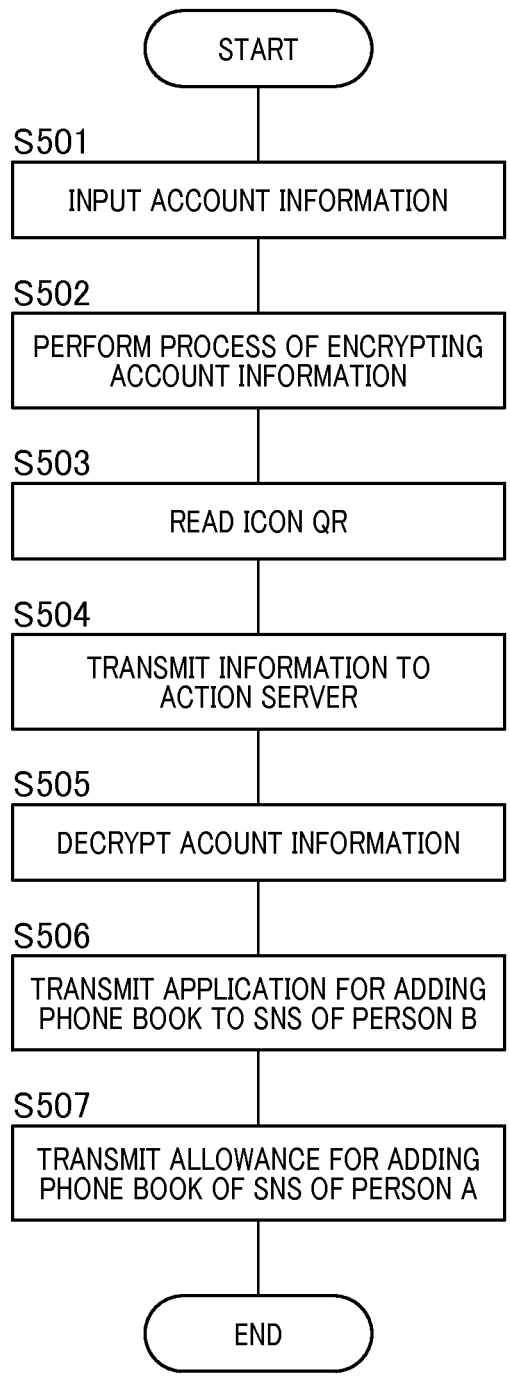
FIG. 29 is a flowchart exemplifying a flow a setting request process performed by a reading terminal and an administration unit, in the system according to the fifth embodiment.
Figure 34:
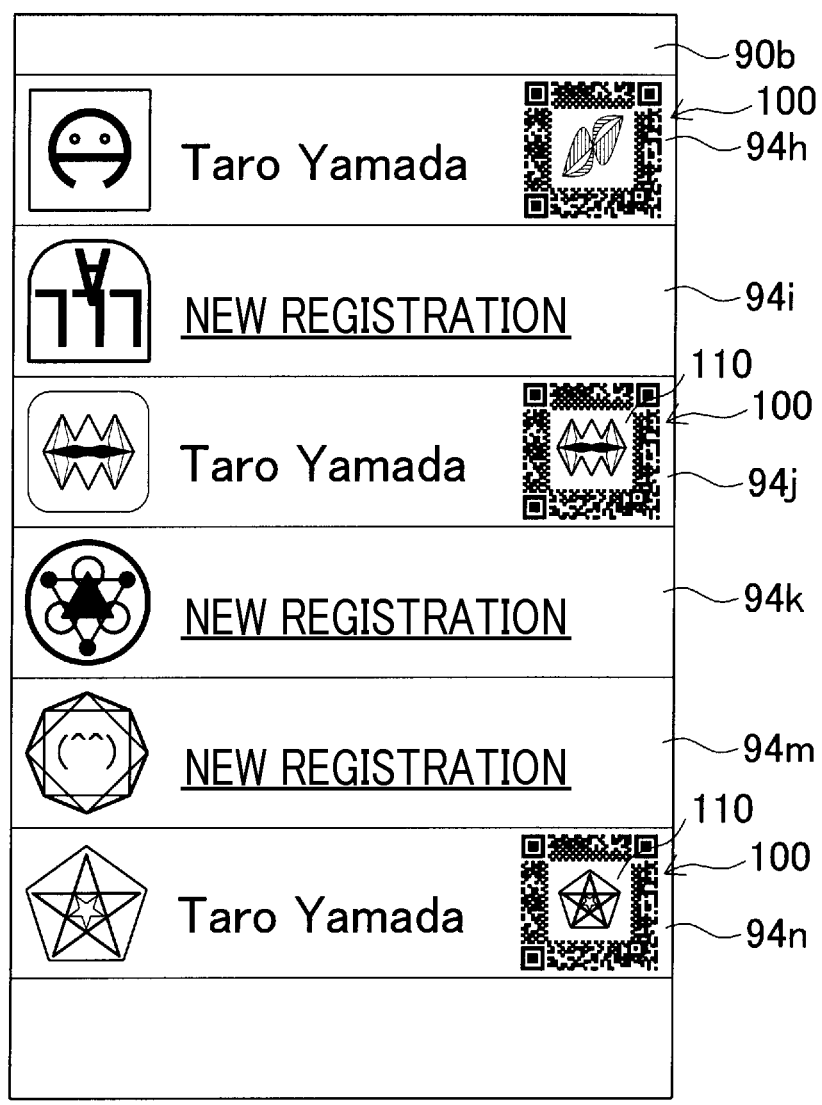
FIG. 34 is an illustration explaining a screen with an addition of an information code through the preparation in the screen of FIG. 33.

For example, the person A can make a registration concerning the person B in an SNS server 502, such as when the personal information (phone number, etc.) of the person B is registered in a list stored in the SNS server 502, being correlated to the person A. In such a case, the information is registered through a flow shown in FIG. 29. First, in an initial screen similar to the one shown in FIG. 30, the basic account and basic password of the person A are inputted (S501). Upon input of the basic account and basic password of the person A, they are encrypted using the common encryption key mentioned above (S502). Then, the person A permits the own mobile terminal 90a to read the information code 100 displayed on the mobile terminal 90b of the person B (S502). As shown in FIG. 34, the mobile terminal 90b of the person B is ensured to display the information codes 100 corresponding to respective SNSs that can conduct registration. Therefore, the person A reads the information code 100 of a desired SNS through the mobile terminal 90a. When reading is performed in this way, the basic account and basic password of the person B recorded in the information code 100, as well as the basic account and basic password of the person A inputted by the mobile terminal 90a, are transmitted to the check server (administration unit). Together with these pieces of information, a setting purpose and information for specifying an SNS server (any of the information data in the table of FIG. 36) are also transmitted to the check server (administration unit).

Upon reception of these pieces of information, the check server 560 (administration unit) interprets the code included in the transmission to confirm whether or not the transmitted basic account and basic password of the person B and the basic account and basic password of the person A are valid pieces of information (S505). In the case of valid information, according to the setting purpose and the information for setting an SNS server included the transmitted data, the setting specified by the setting purpose is requested to the SNS server specified by the information. For example, if the specified setting purpose is a phone book addition request, a request for addition to the phone book of the person B is transmitted to the specified SNS server 502 on behalf of the person B (S506). In this case, the account and password of the person B for the SNS server 502 are also transmitted. Thus, the SNS server 502 receives the phone book addition request for the person B. Then, phone book addition allowance information of the person A (information for allowing addition of the person A to the phone book of the person B) is transmitted in turn (S506). In this case, the account and password of the person A for the SNS server 502 are also transmitted. Thus, the SNS server 502 received the addition allowance of the person A. In this way, an addition request and an addition allowance can be synchronously carried out in a flow. It should be noted that the setting purpose may be a setting for the both to use a common folder, or may be a setting for the both to be added to the same group as members.

In the present configuration, the mobile terminal 90a corresponds to an example of the reading terminal which carries out a function of reading the information code 100 outputted from the display unit 94b (output section) of the mobile terminal 90b (output terminal). Further, the control circuit of the mobile terminal 90a corresponds to an example of the reading section, while the operation unit of the mobile terminal 90a corresponds to an example of the second input section. Further, the controller and the communication unit of the mobile terminal 90a correspond to an example of the transmission section.

According to the present configuration, when at least a part of the personal information of any of the first subjects registered in the administrative server 570 (registration section) is inputted by the first input section, the information code 100 is produced with a configuration in which the inputted personal information is recorded in the data recording region, and the produced information code 100 can be outputted to the display unit 94b (output section) of the mobile terminal 90b (output terminal). Accordingly, a person who uses the mobile terminal 90b (output terminal) can transmit the personal information of the first subject (person B) to the outside via the information code 100 as a medium.

On the other hand, in the mobile terminal 90a (reading terminal) of the second subject (person A), the reading section can read the personal information of the first subject (person B) from the information code 100 outputted from the display unit 94b (output section) of the mobile terminal 90b (output terminal). Then, when the personal information of the second subject (person A) is inputted from the mobile terminal 90a (reading terminal), both of the data of the personal information of the first and second subjects can be transmitted to the check server 560 (administration unit), for authentication.

Then, the check server 560 (administration unit) carries out an authentication process for authenticating the information from the mobile terminal 90a (reading terminal), on the basis of the registration in the administrative server 570 (registration section). If the authentication is successful in the authentication process, the check server 560 is ensured to output predetermined request information that can specify the first and second subjects, to the SNS server 502 (information processor). On the other hand, in response to the request information from the check server 560 (administration unit), the SNS server 502 (information processor) is configured to perform a predetermined setting process in respect of the first and second subjects.

In this way, a check server 560 (administration unit) side can attempt authentication on the basis of the personal information of both of the first and second subjects transmitted from the mobile terminal 90a (reading terminal). Thus, when the authentication is successful, a request that is specified to the first and second subjects can be made to the SNS server 502 (information processor). With this configuration, when a setting that is associated with the first and second subjects is requested to the SNS server 502 (information processor), it is no longer necessary to individually access the SNS server 502 (information processor) from a plurality of terminals. Thus, this can easily suppress the increase of work time and trouble ascribed to such individual access.

For example, according to conventional art, it is unavoidable to take trouble in filling out similar information, such as address and email address, every time a new account is registered in an SNS, whereas, according to the present configuration, such trouble can be reduced as easily as possible. Further, according to conventional art, additional registration (such as phone book addition registration) in an SNS is accompanied by a series of tasks that take significant trouble and time, the works including that a person who is subjected to the additional registration makes access to the SNS, prepares/issues as necessary a QR code (registered trade mark) in which the address of a personal account is described, and displays the QR code, while a person who subsequently conducts additional registration reads the displayed QR code (registered trade mark), displays an account page, requests addition, and then the other side who is desired to be registered conducts authentication allowance. In this regard, according to the present configuration, such trouble and time can be greatly reduced.

Further, the check server 560 (administration unit) that acts over a request process refers to the administrative server 570 (registration section) to conduct authentication. Thus, this can make a confirmation as to the reliability of not only the specific information of the second subject inputted by the mobile terminal 90a (reading terminal), but also the specific information of the first subject which is transmitted together with the specific information of the second subject. In other words, the check server 560 (administration unit) indirectly confirms whether or not the highly reliable information code 100 that includes registered information has been used, in transmitting information from the mobile terminal 90b (output terminal) to the mobile terminal 90a (reading terminal). Upon the indirect confirmation, the check server 560 can request setting regarding the first and second subjects to the SNS server 502 (information processor). Therefore, in the event that any fraud is attempted, such a fraud can be effectively and easily eliminated, the fraud being that, for example, a person who could not know the personal information of the first subject operates the mobile terminal 90a (reading terminal) to make a setting request regarding the first subject without permission.

Further, the check server 560 (administration unit) that acts over a request process refers to the administrative server 570 (registration section) to conduct authentication. Thus, this can make a confirmation of not only the account and password of the second subject inputted by the mobile terminal 90a (reading terminal), but also of the validity of the information on the account and password of the first subject, which are transmitted together with the account and password of the second subject. Therefore, in the event that any fraud is committed that a person who could not know the personal information of the first subject operates the mobile terminal 90a (reading terminal) to make a setting request regarding the first subject without permission, such a fraud can be effectively and easily eliminated.

In the present configuration, the information code producing section includes a target information acquisition section. The information code 100 is produced with a configuration in which target information acquired by the target information acquisition section is recorded in the data recording region. Further, when authentication is successful in the authentication process, the check server 560 (administration unit) outputs request information corresponding to target information to the SNS server 502 (information processor). Based on the request information from the check server 560 (administration unit), the SNS server 502 (information processor) is configured to perform a setting process according to the target information.

When the information code 100 is produced with this configuration, the information code 100 can be produced with a configuration in which the target information is included. Accordingly, when the authentication in the check server 560 (administration unit) is successful and a request from the SNS server 502 (information processor) is made to the check server 560 (administration unit), a setting process according to the target information can be performed in the SNS server 502 (information processor). In other words, an information code 100 producing and outputting side comes to be able to allow setting by limiting target. Thus, setting can be easily prevented from being made without permission with a purpose not intended.

Further, the present configuration includes a plurality of SNS servers 502 (information processors). The information code producing section includes the specific information acquisition section that acquires information (specific information) for specifying any of the plurality of SNS servers 502 (information processors). The information code 100 is produced with a configuration in which the specific information acquired by the specific information acquisition section is recorded in the data recording region. Further, when authentication in the authentication process is successful, the check server 560 (administration unit) is configured to output request information to an SNS server 502 (information processor) corresponding to the specific information, among the plurality of SNS servers 502 (information processors).

With this configuration, the administration unit is able to collectively act over the setting request with respect to the plurality of SNS servers 502 (information processors). Further, the SNS server 502 (information processor) to which setting is requested can be easily specified, depending on the information processor for which the mobile terminal 90a (reading terminal) reads the information code corresponding thereto.

[Other Embodiments]

The present invention should not be construed as being limited to the foregoing embodiments described referring to the drawings. For example, the following embodiments should also be encompassed in the technical scope of the present invention.

The configuration shown such as in FIG. 1 exemplifies that the information code reading apparatus 2 and the information code reader 10 are independently provided. However, the information code producing apparatus 2 may be configured as the information code reader 10.

The foregoing embodiments exemplify that the free space 110 is provided in a center portion of the code area. However, the arrangement of the free space 110 is not limited to this example. For example, the free space may be provided near the peripheral edge of the code area.

In the first embodiment, a QR code is provided as an example of another type code, while a specific pattern of the QR code is provided as an example of the specific pattern used in the information code 100. However, a two-dimensional code other than this may be used. For example, a data matrix code may be used as another type code, while the specific pattern used in the information code 100 may be used as a specific pattern of the data matrix code.

Figure 7:
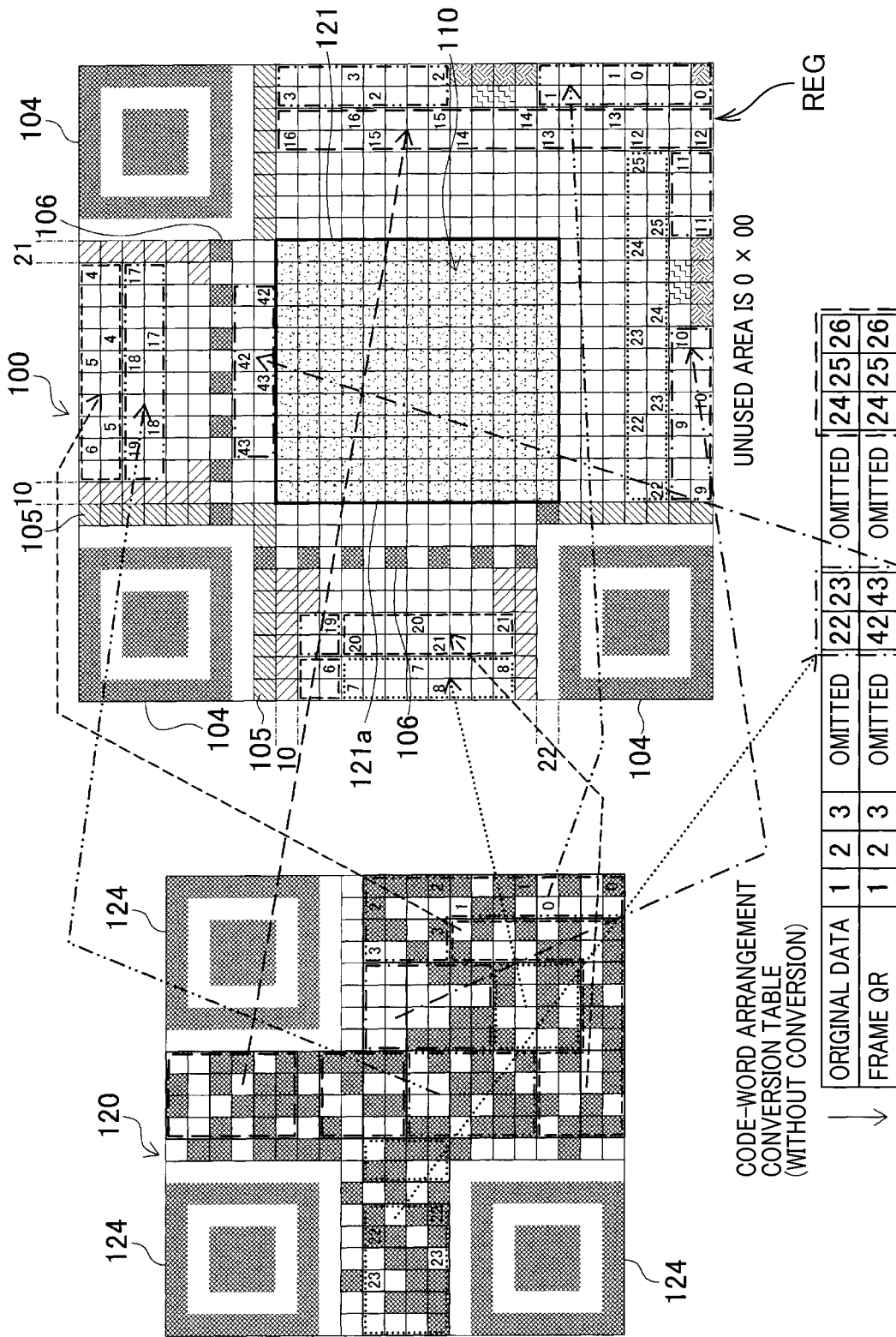
FIG. 7 is an illustration explaining a correspondence relationship between arrangement of respective data words in the information code produced by an information code producing apparatus composing part of the system shown in FIG. 1, the correspondence relationship being different from that shown in FIG. 5.

The correlation in the arrangement conversion table set as shown in FIG. 5 can be optionally changed as shown in FIG. 7. For example, the arrangement conversion table that has been set as shown in FIG. 5 in the information code producing apparatus 2 and the information code reader 10 can be changed as shown in FIG. 7. In this case, in the produced information code 100, the arrangement of the $22^{nd}$ to $26^{th}$ code words is changed from the arrangement (arrangement that recordation is made at $22^{nd}$ to $26^{th}$ arrangement candidate positions) shown in FIG. 5 on the right to the arrangement (arrangement that recordation is made at $42^{nd}$ to $46^{th}$ arrangement candidate positions) shown in FIG. 7 on the right. This change leads to the change in the position and shape of the free space 110. In other words, this configuration enables adjustment in the position and shape of the free space 110 by adjusting the arrangement conversion table. Thus, the degree of freedom can be more enhanced in configuring the free space.

Figure 37:
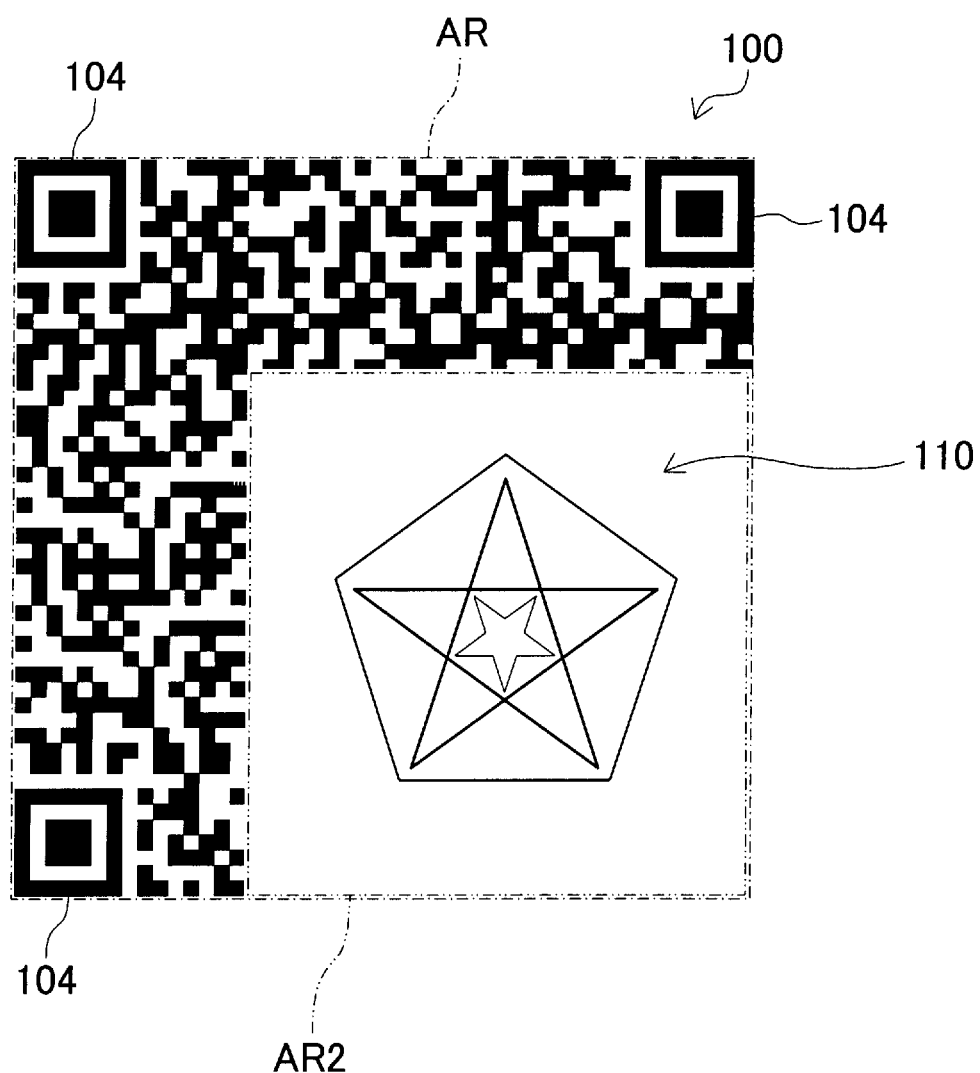
FIG. 37 is an illustration explaining an information code used in a system which uses an information code, according to another embodiment.
Figure 38:
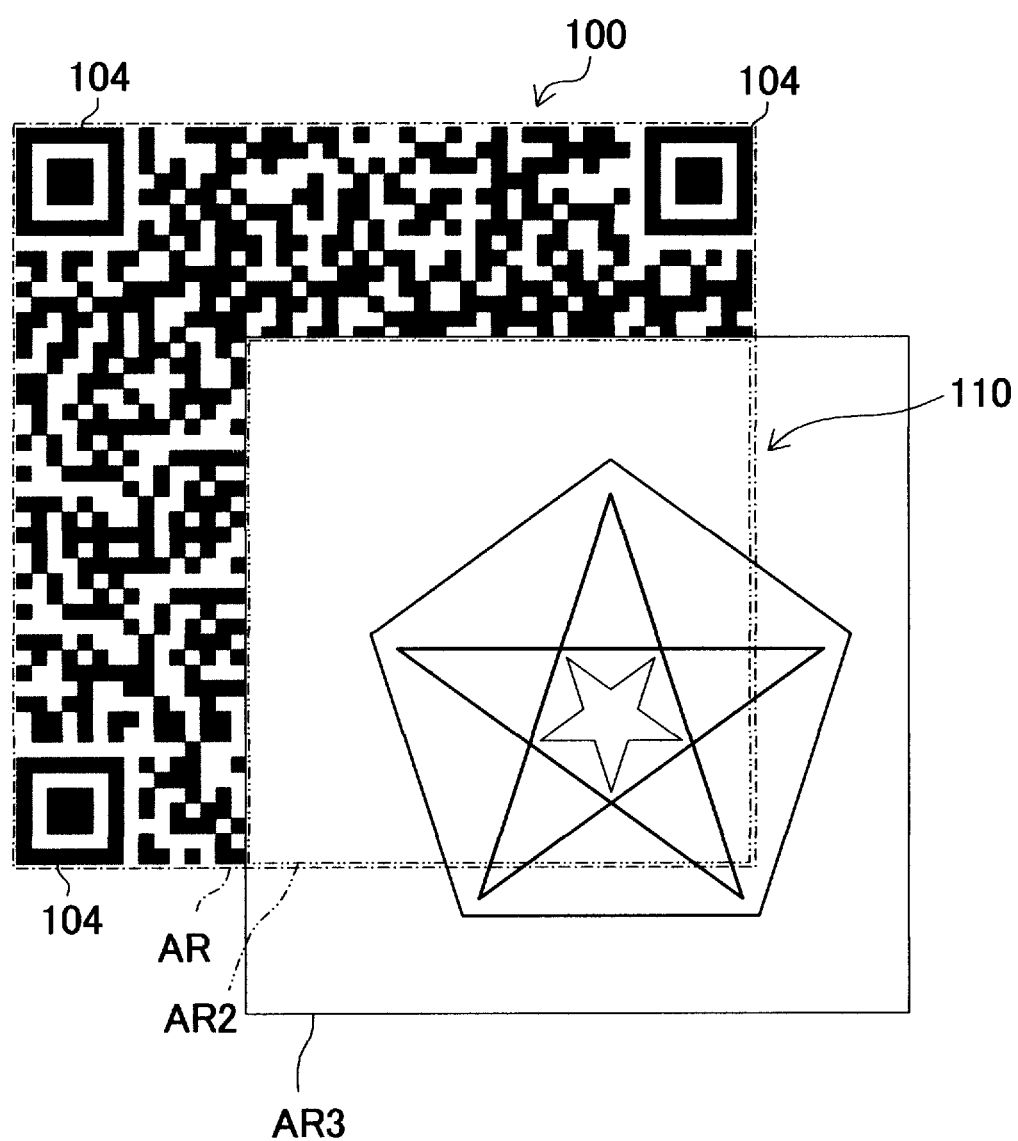
FIG. 38 is an illustration explaining another example of an information code used in a system which uses an information code, according to still another embodiment.

The foregoing embodiments each show an example of the "code area". However, the "code area" may only have to be a minimum square or rectangular region that includes all the various types of cells that configure the information code. Thus, the code area may have an inner peripheral portion in a part of which cells are not arrayed. For example, as in the information code 100 shown in FIG. 37, the free space 110 may be formed being adjacent to the peripheral edge portion of the code area. In this case, the minimum square or rectangular region that includes all the various types of cells configuring the information code 100 is as indicated by a dash-dot line AR, while the outer edge of the free space 110 is as indicated, for example, by a dash-dot-dot line AR2. Further, the image region may only have to have at least a part residing in the code area. As indicated by an image region AR3 in FIG. 38, the rest of the part may be configured to reside outside the code area. In the example as shown in FIG. 38, the data recording region may only have to be recorded, in advance, with information that specifies the range of the image region AR3.

In the first embodiment, as shown in FIG. 13(C), the specific information (personal information) acquired by the specific information acquisition section is registered, being correlated to the unique image (information code image including an image of a person or a corporate body) acquired by the unique image acquisition section, for each person or for each corporate body. Then, a unique code number is allocated to the correlated information so that the specific information and the unique image of each person or each corporate body can be selected when the information is read out through a predetermined reading process (process of specifying a code number and reading the personal information and the unique image (specifically, the information code including the unique image) correlated to the code number). However, the method of storing the specific information and the unique image for each person or for each corporate body is not limited to the example described above, as far as the method enables selection of the specific information and the unique image of each person when the information is read out through the predetermined reading process. For example, in registering the personal information and the unique image of a person or a corporate body, it may be ensured that the recorded time of the specific information and the recorded time of the unique image can be specified. With this configuration, reading may be conducted through "a process of reading the unique image whose recorded time is most approximate to the recording time of the specific information". This enables selective reading of the specific information and the unique image corresponding to any of the persons or any of the corporate bodies. Without being limited to such an example, other storing methods may be used as far as the methods enable selective reading of the specific information and the unique image corresponding to any of the persons or any of the corporate bodies, when the information is read out through the predetermined process.

The foregoing embodiments each exemplify light-color cells, such as white cells, and dark-color cells, such as black cells, as the various types of cells configuring the interior of the code area. As a matter of course, cells are not necessarily limited to such binarized two types of cells. For example, the specific pattern region, the data recording region and the error correction code recording region in the code area may be configured by first-type cells having a predetermined density, brightness and color, and second-type cells having a predetermined density, brightness and color, which are different from those of the first-type cells. Alternatively, the specific pattern region, the data recording region and the error correction code recording region in the code area may be configured as three or more types of cells each of which is different from others in any of the density, brightness and color.

REFERENCE SIGNS LIST 1, 500 . . . System which uses an information code
2 . . . Information code producing apparatus (information code producing section)
3 . . . Controller (specific information acquisition section, unique image acquisition section, registration section, authentication section)
5 . . . Storage (registration section)
10 . . . Information code reader
23 . . . Light-receiving sensor (imaging section)
40 . . . Control circuit (data recording region reading section, image processor)
60 . . . Check server (determination section)
90a . . . Mobile terminal (reading terminal, second input section, transmission section)
80b . . . Mobile terminal (output terminal, first input section, information code producing section, output section, target information acquisition section, specific information acquisition section)
100, 200, 300, 400 . . . Information code
102, 202, 302 . . . Cell
104, 204 . . . Position detection pattern (specific pattern)
304a . . . Alignment pattern (specific pattern)
304b . . . Timing cell (specific pattern)
110, 210, 310 . . . Free space (image region)
502 . . . SNS server (information processor)
560 . . . Check server (administration unit)
570 . . . Administrative server (registration section, specific information acquisition section)
Ca . . . Credit card (payment medium)
REG . . . Code area
R . . . Medium carrying an information code

What is claimed is:

1. A system comprising:
an information code reader which reads an information code, and
an information code producing apparatus communicably connected to the information code reader, the information code producing apparatus having at least one processor and a memory storing instructions causing the at least one processor to function as:
a producing section that produces the information code having a code area on a medium, the code area being provided therein with (i) a specific pattern region where a specific pattern of a predetermined shape, including a pattern indicating a position of the code area, is arranged, (ii) a data recording region where data that is decoded is recorded in a plurality of types of cells, and (iii) an image region configured at a position other than the specific pattern region and the data recording region as a region for indicating therein an image different from an image composed of the cells recorded in the data recording region and having a size larger than a size of each of the cells, wherein a location of the image region as defined based on position information showing a position of the image region in the code area is recorded in the data recording region;
a specific information acquisition section that acquires specific information of a subject or an object, as information recorded in the data recording region, or as information to be correlated to the information recorded in the data recording region;
a unique image acquisition section that acquires a unique image of the subject or the object, or a unique image for specifying the subject or the object, as information which is indicated in the image region; and
a registration section that: (a) registers the specific information acquired by the specific information acquisition section and the unique image acquired by the unique image acquisition section such that the specific information and the unique image are correlated to each other in the registration section and are selectively readable by a predetermined reading process, and (b) checks the mutually-correlated and registered information with a result provided by the information code reader when the information code reader reads the information code; and a first server communicably connected to the information code reader, the first server having at least one processor and a memory storing instructions causing the at least one processor to function as:

a determination section that determines whether or not a predetermined analogousness requirement is satisfied by a new unique image that is the unique image newly acquired by the unique image acquisition section and by an already registered unique image that is the unique image registered in the registration prior to the acquisition of the new unique image by the unique image acquisition section, wherein the registration section excludes, from registration thereof, the new unique image that is determined by the determination section to satisfy the predetermined analogousness requirement together with the already registered unique image.

2. The system according to claim 1, wherein the information code producing apparatus is configured to produce the information code with a configuration in which at least either the specific information acquired by the specific information acquisition section, or correspondence information registered in the registration section, being correlated to the specific information, is recorded in the data recording region, and the unique image acquired by the unique image acquisition section is indicated in the image region.

3. The system according to claim 2, wherein the information code producing apparatus is configured to produce the information code with a configuration in which encrypted data are recorded in the data recording region, the encrypted data being obtained by encrypting at least a part of the specific information acquired by the specific information acquisition section.

4. The system according to claim 2, wherein the registration section registers the specific information acquired by the specific information acquisition section, being correlated to the information code that is produced by the information code producing section, with the data recording region being recorded with the specific information or the correspondence information correlated to the specific information.

5. The system according to claim 1, wherein the information code reader is provided with: (i) an imaging section that is able to pick up an image of the information code, (ii) a data recording region reading section that reads data recorded in the data recording region when an image of the information code is picked up by the imaging section, and (iii) an image processor that performs an extraction process for an image in the image region or a predetermined analysis process for an image in the image region, in a code image of the information code picked up by the imaging section; and the system comprises a second server communicable with the information code reader, the second server having at least one processor programmed to:

determine whether or not the information code read by the information code reader is a predetermined valid code, on the basis of data in the data recording region read by the data recording region reading section, image data in the image region or analysis data of an image in the image region processed by the image processor, and registration data registered in the registration section.

6. The system according to claim 1, wherein the unique image acquisition section acquires an image of a face of a person as the unique image of the subject.

7. The system according to claim 1, wherein the unique image acquisition section acquires an image of the subject or an image of an emblem that specifies the subject, as the unique image for specifying the subject or the object.

8. The system according to claim 1, wherein the information code is used by being attached to a payment medium used for payment.

9. The system according to claim 1, wherein the code area comprises an error correction code recording region in which error correction codes are recorded, the error correction codes being used by the information code reader to correct an error of the data recorded in the data recording region, error correction based on the error correction codes being not applied to the image indicated in the image region whose position in the code region is decided by the position information.

10. The system according to claim 9, wherein the information code producing apparatus is configured to produce the information code with a configuration in which at least either the specific information acquired by the specific information acquisition section, or correspondence information registered in the registration section, being correlated to the specific information, is recorded in the data recording region, and the unique image acquired by the unique image acquisition section is indicated in the image region.

11. The system according to claim 10, wherein the information code producing apparatus is configured to produce the information code with a configuration in which encrypted data are recorded in the data recording region, the encrypted data being obtained by encrypting at least a part of the specific information acquired by the specific information acquisition section.

12. The system according to claim 10, wherein the registration section registers the specific information acquired by the specific information acquisition section, being correlated to the information code that is produced by the information code producing section, with the data recording region being recorded with the specific information or the correspondence information correlated to the specific information.

13. The system according to claim 9, wherein the information code reader provided with an imaging section that is able to pick up an image of the information code, a data recording region reading section that reads data recorded in the data recording region when an image of the information code is picked up by the imaging section, and an image processor that performs an extraction process for an image in the image region or a predetermined analysis process for an image in the image region, in a code image of the information code picked up by the imaging section; and the system comprises a second server communicable with the information code reader, the second server having at least one processor programmed to:

determine whether or not the information code read by the information code reader is a predetermined valid code, on the basis of data in the data recording region read by the data recording region reading section, image data in the image region or analysis data of an image in the image region processed by the image processor, and registration data registered in the registration section.

14. The system according to claim 9, wherein the unique image acquisition section acquires an image of a face of a person as the unique image of the subject.

15. The system according to claim 9, wherein the unique image acquisition section acquires an image of the subject or an image of an emblem that specifies the subject, as the unique image for specifying the subject or the object.

16. A system comprising:
an information code reader which reads an information code, and an information code producing apparatus communicably connected to the information code reader, the information code producing apparatus having at least one processor and a memory storing instructions causing the at least one processor to function as:
producing means for producing the information code having a code area on a medium, the code area being provided therein with (i) a specific pattern region where a specific pattern of a predetermined shape, including a pattern indicating a position of the code area, is arranged, (ii) a data recording region where data that is decoded is recorded in a plurality of types of cells, and (iii) an image region configured at a position other than the specific pattern region and the data recording region as a region for indicating therein an image different from an image composed of the cells recorded in the data recording region and having a size larger than a size of each of the cells, wherein a location of the image region as defined based on position information showing a position of the image region in the code area is recorded in the data recording region;
specific information acquisition means for acquiring specific information of a subject or an object, as information recorded in the data recording region, or as information to be correlated to the information recorded in the data recording region;
unique image acquisition means for acquiring a unique image of the subject or the object, or a unique image for specifying the subject or the object, as information which is indicated in the image region; and
registration means for (a) registering the specific information acquired by the specific information acquisition means and the unique image acquired by the unique image acquisition means such that the specific information and the unique image are correlated to each other in the registration means and are selectively readable by a predetermined reading process, and (b) checking the mutually-correlated and registered information with a result provided by the information code reader when the information code reader reads the information code; and
a first server communicably connected to the information code reader, and the first server having at least one processor and a memory storing instructions causing the at least one processor to function as:
determination means for determining whether or not a predetermined analogousness requirement is satisfied by a new unique image that is the unique image newly acquired by the unique image acquisition means and by an already registered unique image that is the unique image registered in the registration prior to the acquisition of the new unique image by the unique image acquisition means,
wherein the registration means excludes, from registration thereof, the new unique image that is determined by the determination means to satisfy the predetermined analogousness requirement together with the already registered unique image.

* * * * *